US012592750B2

(12) United States Patent (10) Patent No.: US 12,592,750 B2
Bai et al. (45) Date of Patent: Mar. 31, 2026

(54) REPORTING MULTIPLE REPLACEMENT BEAMS IN BEAM FAILURE RECOVERY REQUESTS

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 18/064,097

(22) Filed: Dec. 9, 2022

(65) Prior Publication Data

US 2023/0223993 A1 Jul. 13, 2023

Related U.S. Application Data

(60) Provisional application No. 63/297,688, filed on Jan. 7, 2022.

(51) Int. Cl.
 *H04B 7/0408* (2017.01)
 *H04B 7/06* (2006.01)
 *H04B 7/08* (2006.01)
(52) U.S. Cl.
 CPC ......... *H04B 7/0408* (2013.01); *H04B 7/0695* (2013.01); *H04B 7/088* (2013.01)
(58) Field of Classification Search
 CPC .... H04B 7/0408; H04B 7/0695; H04B 7/088; H04B 7/06964
 See application file for complete search history.

(56) References Cited

U.S. PATENT DOCUMENTS 11,804,888 B2 * 10/2023 Xu ........................ H04W 24/04
2021/0153040 A1 5/2021 Zhou et al.
(Continued)

OTHER PUBLICATIONS

Huawei et al., "Discussion on Multi-Panel Reception for Multi-TRP in Rel-17", 3GPP TSG RAN WG1 #105-e, R1-2104268, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021 May 12, 2021, XP052010722, p. 5, paragraph section 3.3.
(Continued)

*Primary Examiner* — Harry H Kim
(74) *Attorney, Agent, or Firm* — Holland & Hart LLP/QUALCOMM Incorporated

(57) ABSTRACT

Methods, systems, and devices for wireless communications are described. A user equipment (UE) may communicate with a wireless network using multiple beams. For example, the UE may communicate with different transmission/reception points (TRPs) using different beams, communicate using different downlink and uplink beams, communicate using different beams in different component carriers (CCs), or any combination thereof. If the UE detects a single beam failure, the UE may indicate multiple new beams in a beam failure recovery request (BFRQ). The UE may select a new beam based on the detected beam failure and may determine one or more additional new beams (e.g., for a different TRP, link direction, or CC than the failed beam) that are compatible with the selected new beam to further indicate in the BFRQ. The UE may receive a beam failure recovery response (BFRR) in response to the BFRQ and may communicate using the new beams.

30 Claims, 29 Drawing Sheets

(56)                References Cited

U.S. PATENT DOCUMENTS

2021/0409094 A1*  12/2021  Yuan ..................... H04W 76/19
2023/0180205 A1*   6/2023  Xu ..................... H04B 7/06964
                                                    370/329
2024/0430969 A1*  12/2024  Gao ................... H04B 7/06964

OTHER PUBLICATIONS

International Search Report and Written Opinion—PCT/US2022/054141—ISA/EPO—Apr. 11, 2023.
NTT Docomo et al., "Discussion on Beam Management for MTRP", 3GPP TSG RAN WG1 #104b-e, R1-2103562, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021 Apr. 6, 2021, XP051993434, 7 Pages, p. 4, line penultimate line—p. 5.
3GPP: 3rd Generation Partnership Project; Technical Specification Group Radio Access Network; NR; Physical layer procedures for control (Release 15), 3GPP TS 38.213 V15.14.0 (Jun. 2021), Jun. 2021, Section 6, 6 pages, 3GPP Organizational Partners, Sophia Antipolis Valbonne, France.
3GPP: 3rd Generation Partnership Project; Technical Specification Group Radio Access Network; NR; Physical layer procedures for control (Release 16), 3GPP TS 38.213 V16.8.0 (Dec. .2021), Dec. 2021, Section 6, 7 pages, 3GPP Organizational Partners, Sophia Antipolis Valbonne, France.
3GPP: 3rd Generation Partnership Project; Technical Specification Group Radio Access Network; NR; Physical layer procedures for control (Release 17), 3GPP TS 38.213 V17.0.0 (Dec. 2021), Dec. 2021, Section 6, 9 pages, 3GPP Organizational Partners, Sophia Antipolis Valbonne, France.
3GPP: 3rd Generation Partnership Project; Technical Specification Group Radio Access Network; NR; Physical layer procedures for data (Release 17), 3GPP TS 38.214 V17.0.0 (Dec. 2021), Dec. 2021, Section 5.1.5, 11 pages, 3GPP Organizational Partners, Sophia Antipolis Valbonne, France.
3GPP TSG RAN WG1 #106bis-e, e-Meeting, Oct. 11-19, 2021, RAN1 Chair's Notes, Agreement under R1-2110549, p. 15.

* cited by examiner

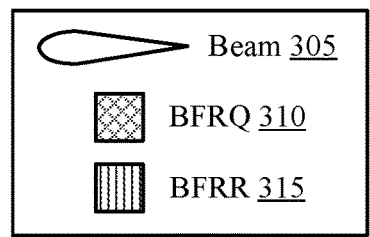
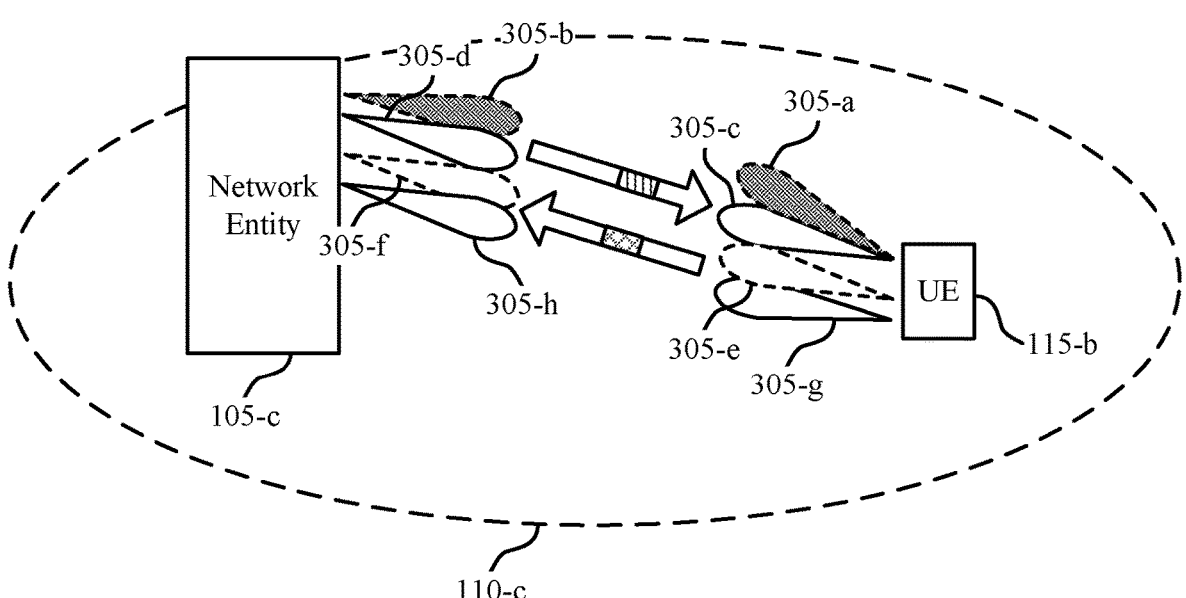
FIG. 3

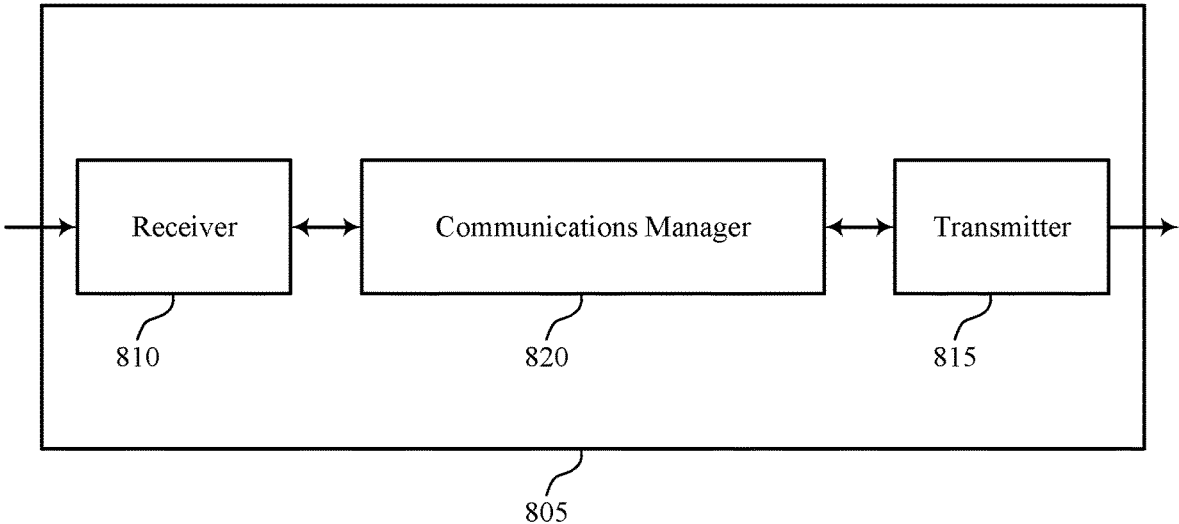
810
820
815
805
800
FIG. 8

1205

Communications Manager

BFRQ Component

1325

Receiver

1310

BFRR Component

1330

Transmitter

1315

Beam Reset Component

1335

1320

1305

1300

Figure 16:
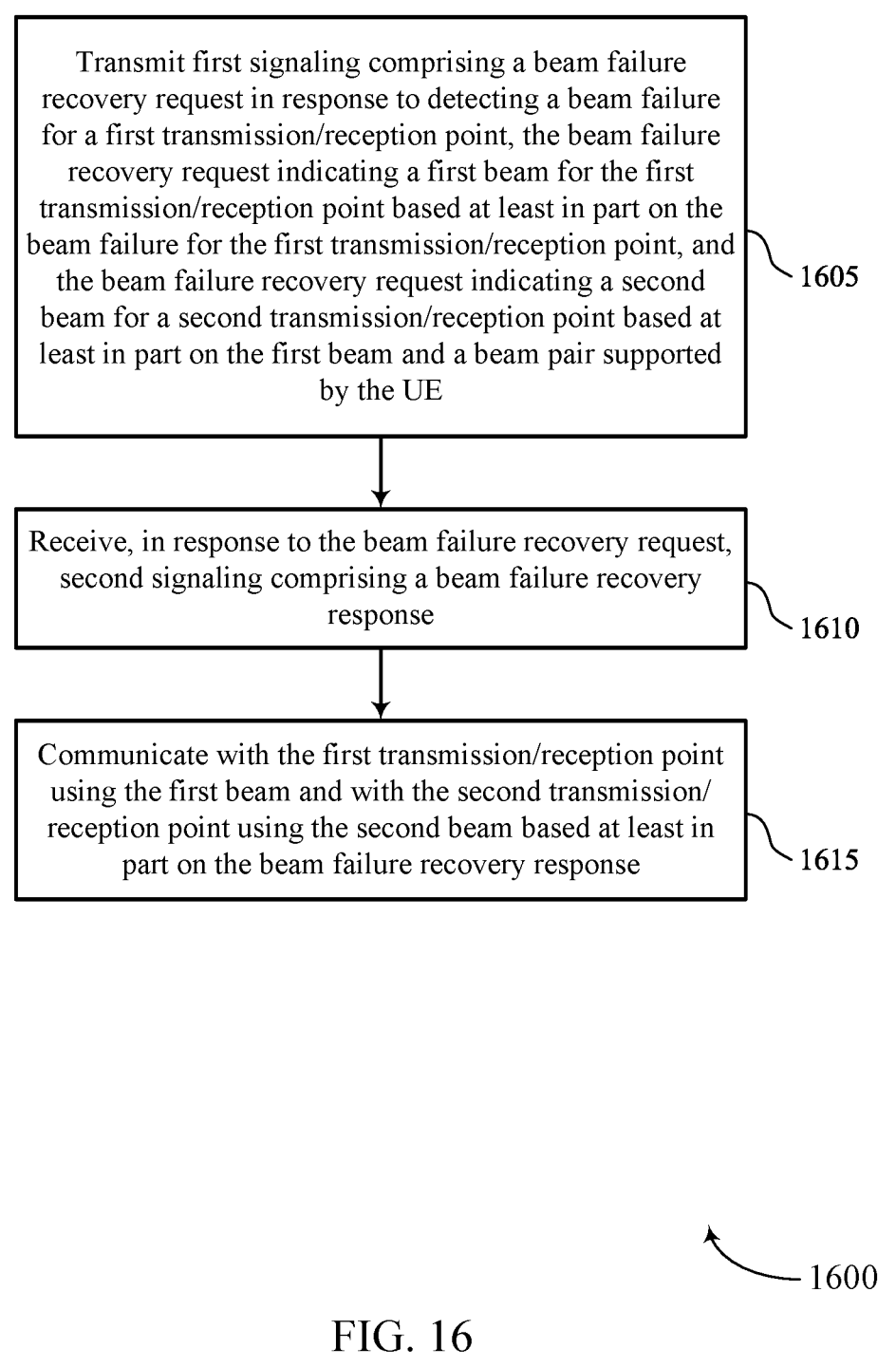

Transmit first signaling comprising a beam failure recovery request in response to detecting a beam failure for a first transmission/reception point, the beam failure recovery request indicating a first beam for the first transmission/reception point based at least in part on the beam failure for the first transmission/reception point, and the beam failure recovery request indicating a second beam for a second transmission/reception point based at least in part on the first beam and a beam pair supported by the UE

1605

Receive, in response to the beam failure recovery request, second signaling comprising a beam failure recovery response

1610

Communicate with the first transmission/reception point using the first beam and with the second transmission/reception point using the second beam based at least in part on the beam failure recovery response

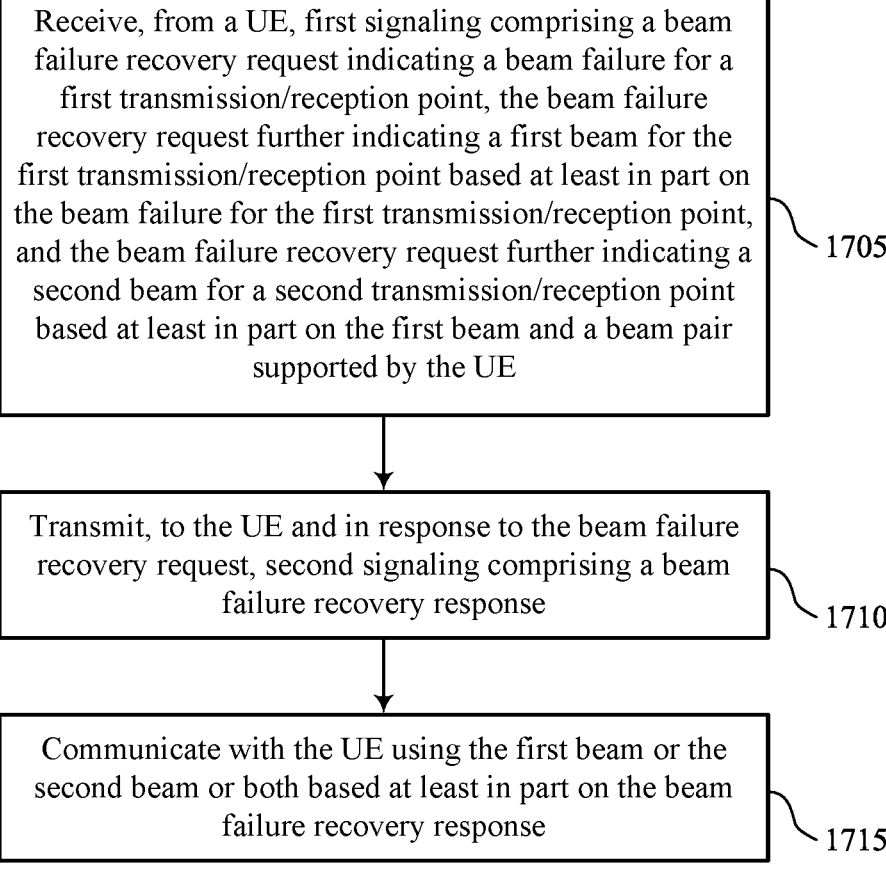

Receive, from a UE, first signaling comprising a beam
failure recovery request indicating a beam failure for a
first transmission/reception point, the beam failure
recovery request further indicating a first beam for the
first transmission/reception point based at least in part on
the beam failure for the first transmission/reception point,
and the beam failure recovery request further indicating a
second beam for a second transmission/reception point
based at least in part on the first beam and a beam pair
supported by the UE

1705

Transmit, to the UE and in response to the beam failure
recovery request, second signaling comprising a beam
failure recovery response

1710

Communicate with the UE using the first beam or the
second beam or both based at least in part on the beam
failure recovery response

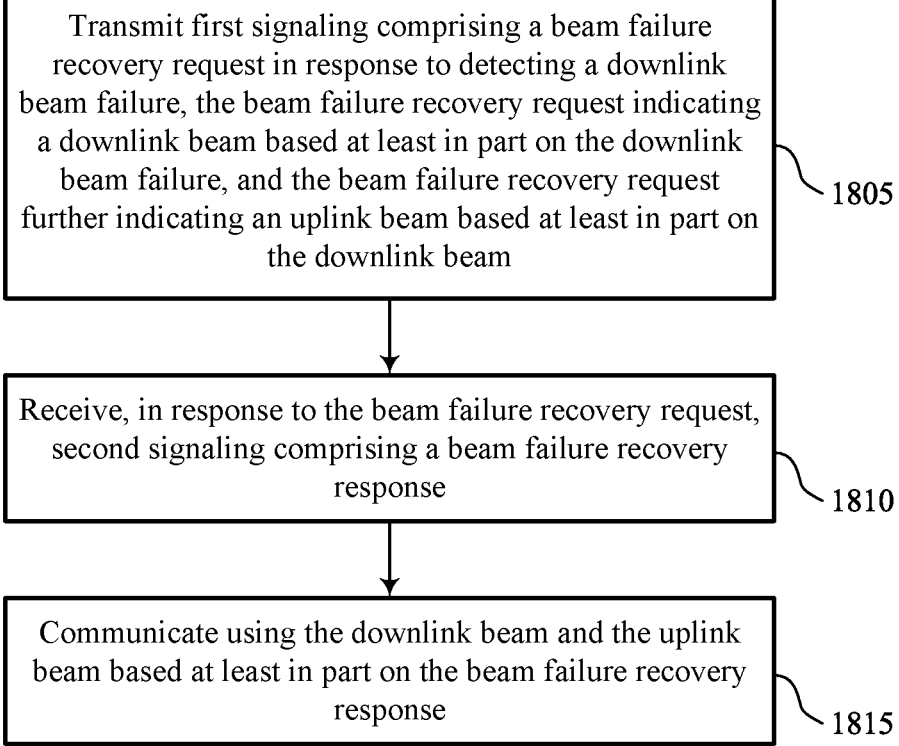

Transmit first signaling comprising a beam failure recovery request in response to detecting a downlink beam failure, the beam failure recovery request indicating a downlink beam based at least in part on the downlink beam failure, and the beam failure recovery request further indicating an uplink beam based at least in part on the downlink beam

1805

Receive, in response to the beam failure recovery request, second signaling comprising a beam failure recovery response

1810

Communicate using the downlink beam and the uplink beam based at least in part on the beam failure recovery response

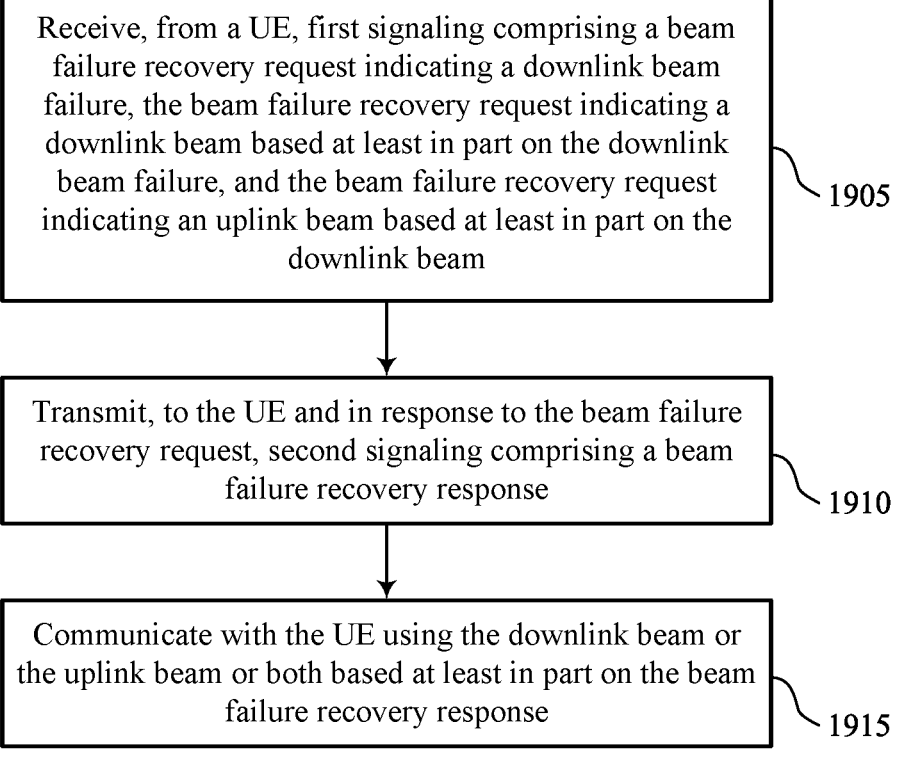

Receive, from a UE, first signaling comprising a beam failure recovery request indicating a downlink beam failure, the beam failure recovery request indicating a downlink beam based at least in part on the downlink beam failure, and the beam failure recovery request indicating an uplink beam based at least in part on the downlink beam ⟍ 1905

Transmit, to the UE and in response to the beam failure recovery request, second signaling comprising a beam failure recovery response ⟍ 1910

Communicate with the UE using the downlink beam or the uplink beam or both based at least in part on the beam failure recovery response ⟍ 1915

Figure 20:
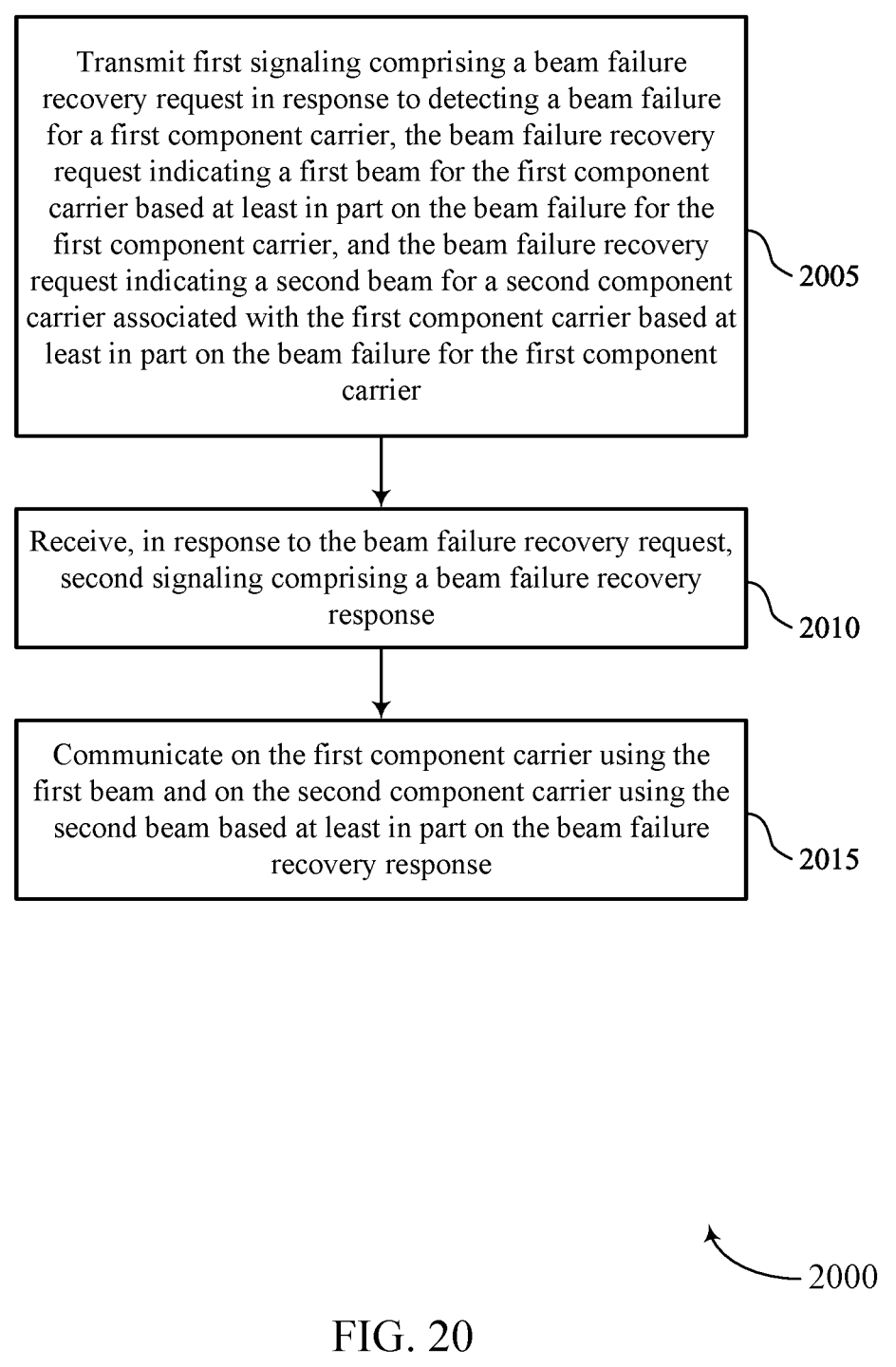

Transmit first signaling comprising a beam failure recovery request in response to detecting a beam failure for a first component carrier, the beam failure recovery request indicating a first beam for the first component carrier based at least in part on the beam failure for the first component carrier, and the beam failure recovery request indicating a second beam for a second component carrier associated with the first component carrier based at least in part on the beam failure for the first component carrier

2005

Receive, in response to the beam failure recovery request, second signaling comprising a beam failure recovery response

2010

Communicate on the first component carrier using the first beam and on the second component carrier using the second beam based at least in part on the beam failure recovery response

Figure 21:
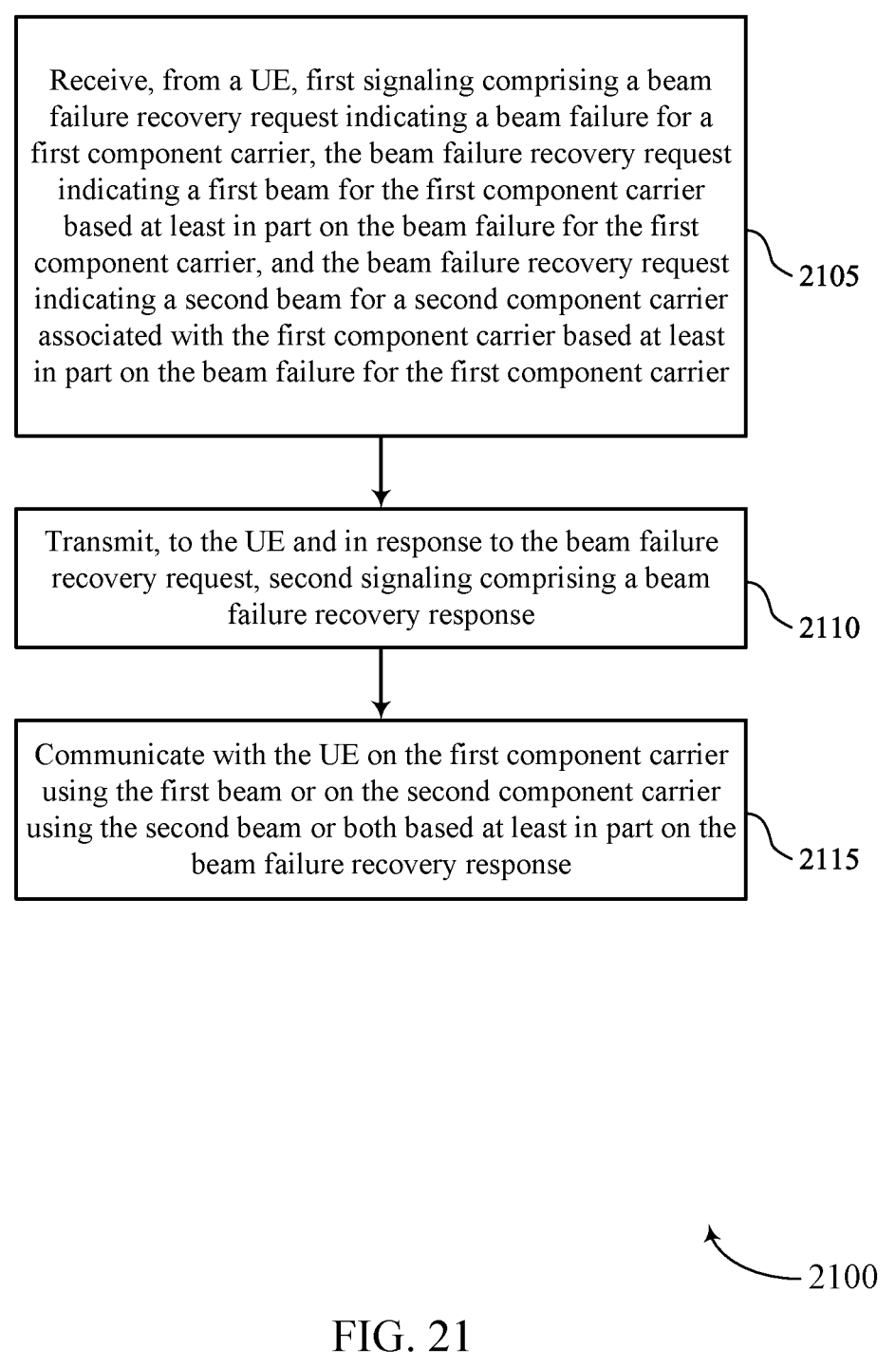

Receive, from a UE, first signaling comprising a beam
failure recovery request indicating a beam failure for a
first component carrier, the beam failure recovery request
indicating a first beam for the first component carrier
based at least in part on the beam failure for the first
component carrier, and the beam failure recovery request
indicating a second beam for a second component carrier
associated with the first component carrier based at least
in part on the beam failure for the first component carrier

2105

Transmit, to the UE and in response to the beam failure
recovery request, second signaling comprising a beam
failure recovery response

2110

Communicate with the UE on the first component carrier
using the first beam or on the second component carrier
using the second beam or both based at least in part on the
beam failure recovery response

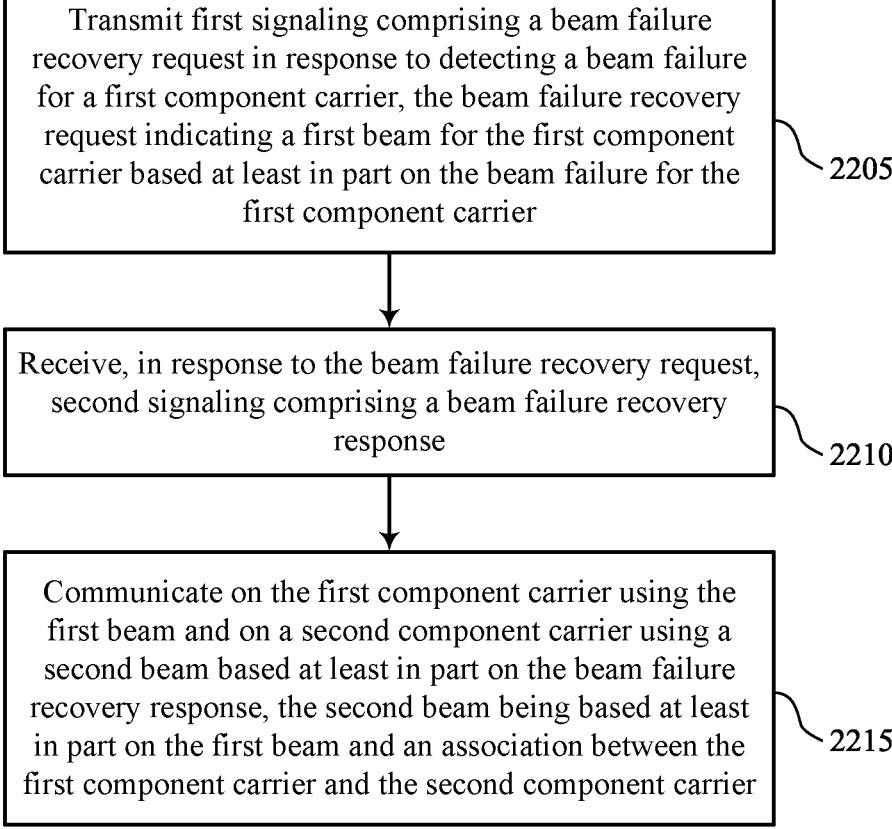

Transmit first signaling comprising a beam failure recovery request in response to detecting a beam failure for a first component carrier, the beam failure recovery request indicating a first beam for the first component carrier based at least in part on the beam failure for the first component carrier

2205

Receive, in response to the beam failure recovery request, second signaling comprising a beam failure recovery response

2210

Communicate on the first component carrier using the first beam and on a second component carrier using a second beam based at least in part on the beam failure recovery response, the second beam being based at least in part on the first beam and an association between the first component carrier and the second component carrier

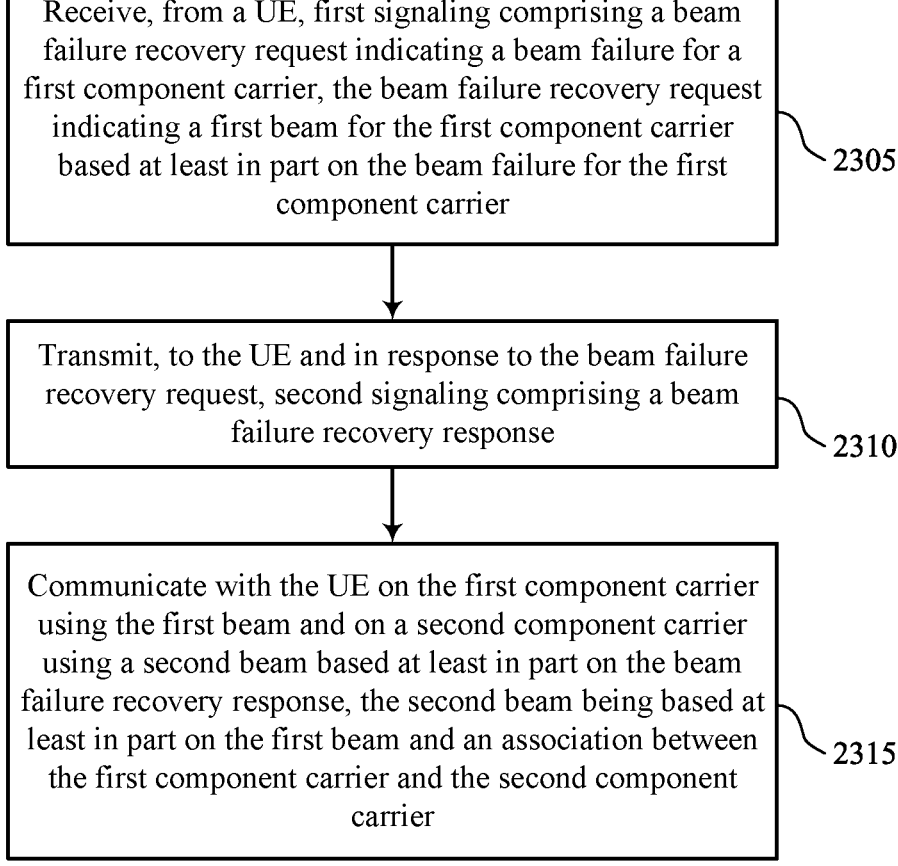

Receive, from a UE, first signaling comprising a beam failure recovery request indicating a beam failure for a first component carrier, the beam failure recovery request indicating a first beam for the first component carrier based at least in part on the beam failure for the first component carrier

2305

Transmit, to the UE and in response to the beam failure recovery request, second signaling comprising a beam failure recovery response

2310

Communicate with the UE on the first component carrier using the first beam and on a second component carrier using a second beam based at least in part on the beam failure recovery response, the second beam being based at least in part on the first beam and an association between the first component carrier and the second component carrier

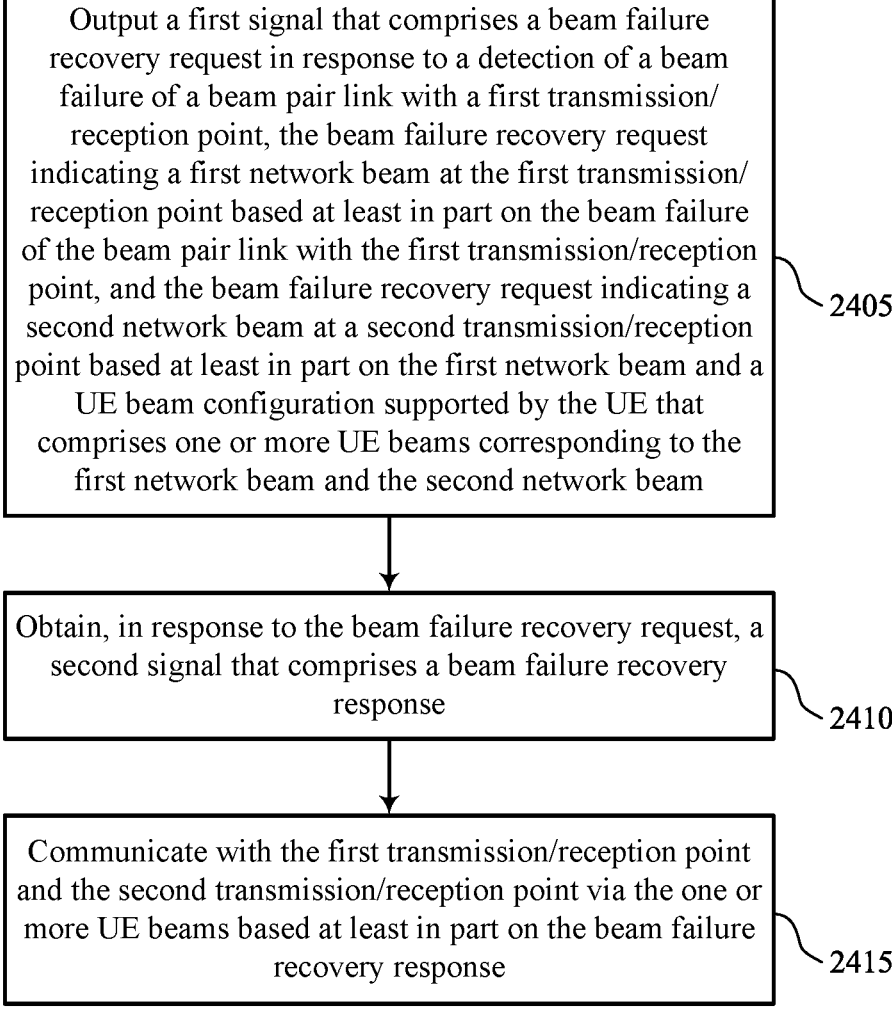

Output a first signal that comprises a beam failure recovery request in response to a detection of a beam failure of a beam pair link with a first transmission/reception point, the beam failure recovery request indicating a first network beam at the first transmission/reception point based at least in part on the beam failure of the beam pair link with the first transmission/reception point, and the beam failure recovery request indicating a second network beam at a second transmission/reception point based at least in part on the first network beam and a UE beam configuration supported by the UE that comprises one or more UE beams corresponding to the first network beam and the second network beam

2405

Obtain, in response to the beam failure recovery request, a second signal that comprises a beam failure recovery response

2410

Communicate with the first transmission/reception point and the second transmission/reception point via the one or more UE beams based at least in part on the beam failure recovery response

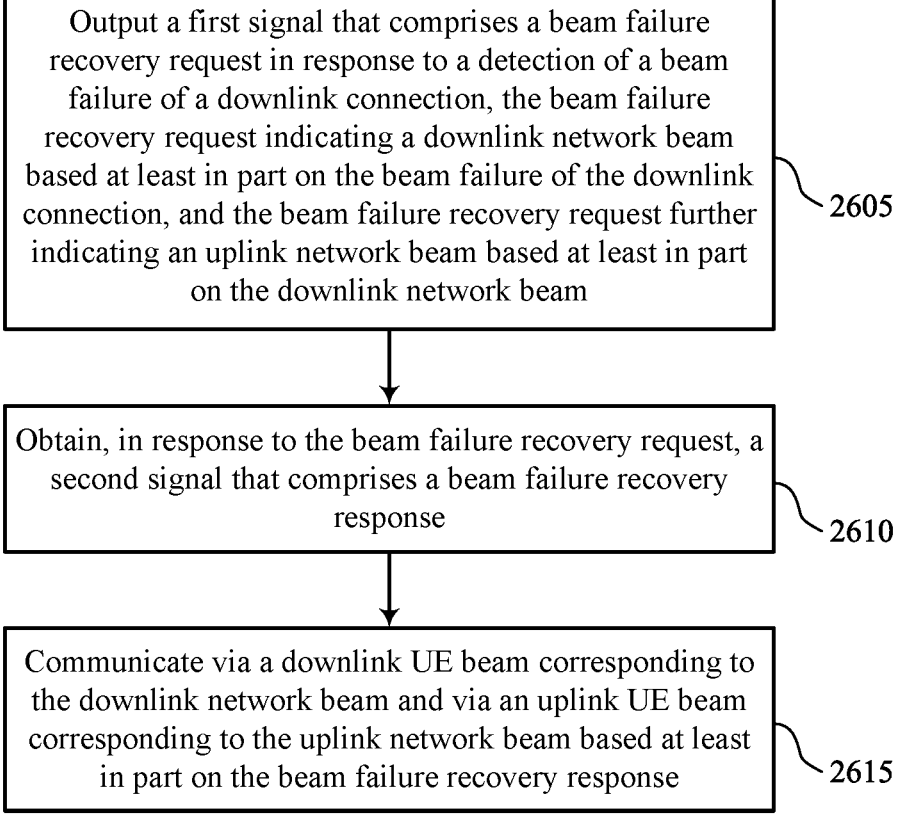

Output a first signal that comprises a beam failure recovery request in response to a detection of a beam failure of a downlink connection, the beam failure recovery request indicating a downlink network beam based at least in part on the beam failure of the downlink connection, and the beam failure recovery request further indicating an uplink network beam based at least in part on the downlink network beam

2605

Obtain, in response to the beam failure recovery request, a second signal that comprises a beam failure recovery response

2610

Communicate via a downlink UE beam corresponding to the downlink network beam and via an uplink UE beam corresponding to the uplink network beam based at least in part on the beam failure recovery response

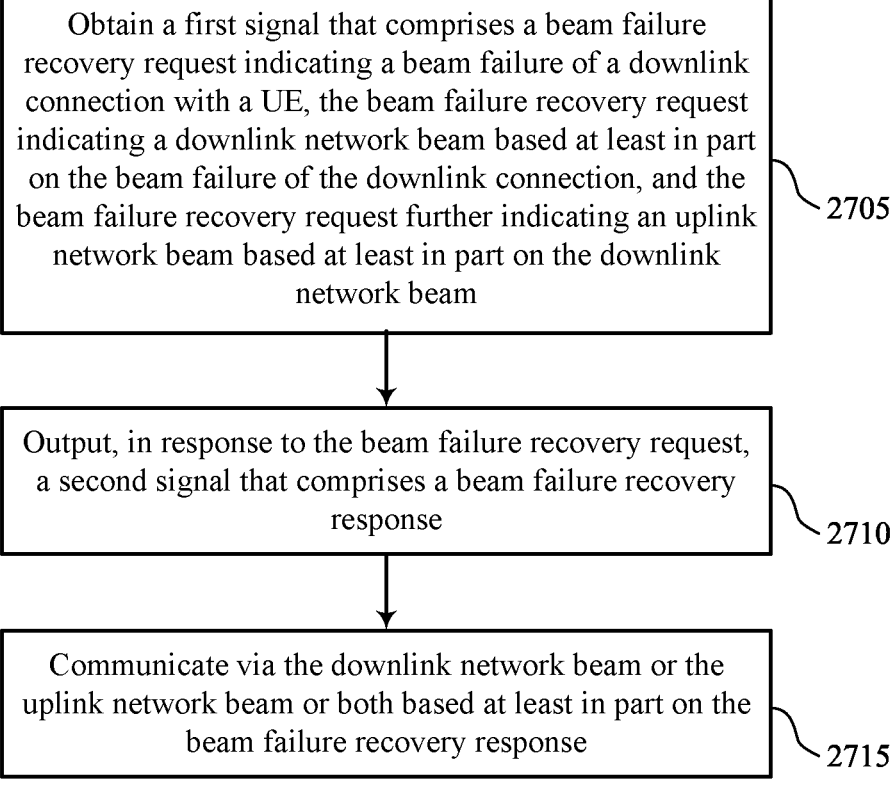

Obtain a first signal that comprises a beam failure recovery request indicating a beam failure of a downlink connection with a UE, the beam failure recovery request indicating a downlink network beam based at least in part on the beam failure of the downlink connection, and the beam failure recovery request further indicating an uplink network beam based at least in part on the downlink network beam

2705

Output, in response to the beam failure recovery request, a second signal that comprises a beam failure recovery response

2710

Communicate via the downlink network beam or the uplink network beam or both based at least in part on the beam failure recovery response

Figure 28:
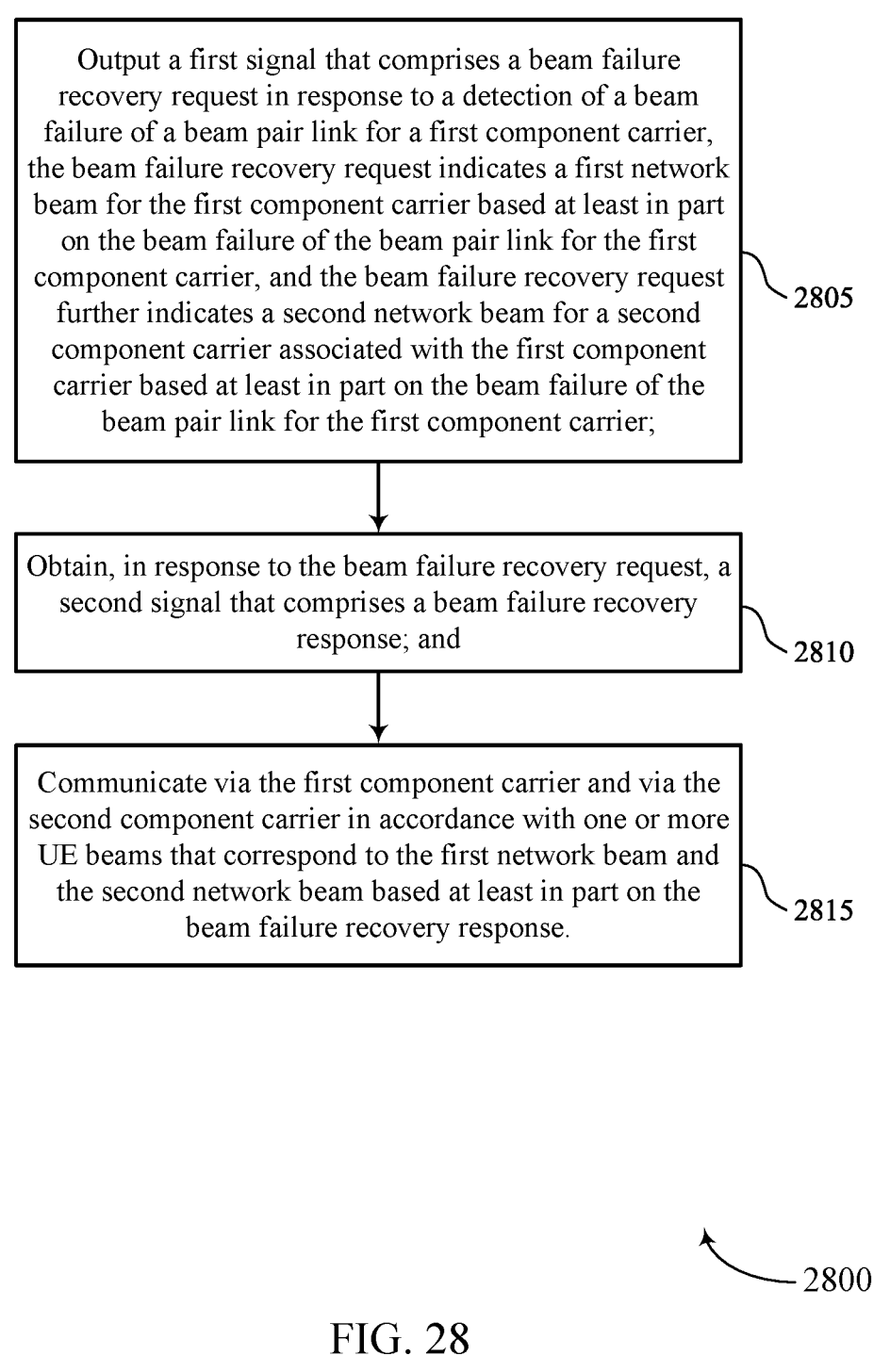

Output a first signal that comprises a beam failure recovery request in response to a detection of a beam failure of a beam pair link for a first component carrier, the beam failure recovery request indicates a first network beam for the first component carrier based at least in part on the beam failure of the beam pair link for the first component carrier, and the beam failure recovery request further indicates a second network beam for a second component carrier associated with the first component carrier based at least in part on the beam failure of the beam pair link for the first component carrier;

2805

Obtain, in response to the beam failure recovery request, a second signal that comprises a beam failure recovery response; and

2810

Communicate via the first component carrier and via the second component carrier in accordance with one or more UE beams that correspond to the first network beam and the second network beam based at least in part on the beam failure recovery response.

Figure 29:
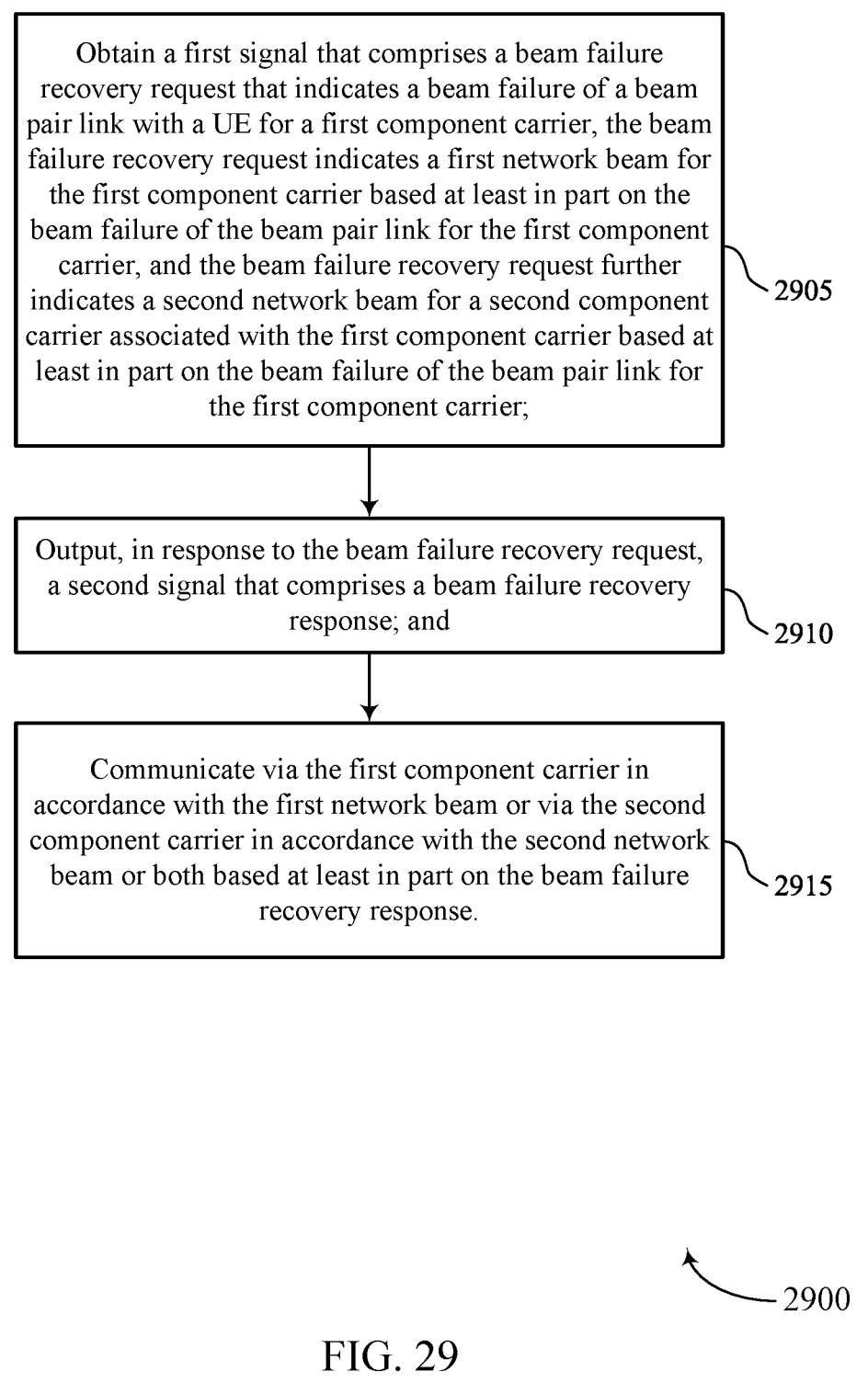

Obtain a first signal that comprises a beam failure recovery request that indicates a beam failure of a beam pair link with a UE for a first component carrier, the beam failure recovery request indicates a first network beam for the first component carrier based at least in part on the beam failure of the beam pair link for the first component carrier, and the beam failure recovery request further indicates a second network beam for a second component carrier associated with the first component carrier based at least in part on the beam failure of the beam pair link for the first component carrier;

2905

Output, in response to the beam failure recovery request, a second signal that comprises a beam failure recovery response; and

2910

Communicate via the first component carrier in accordance with the first network beam or via the second component carrier in accordance with the second network beam or both based at least in part on the beam failure recovery response.

REPORTING MULTIPLE REPLACEMENT BEAMS IN BEAM FAILURE RECOVERY REQUESTS

CROSS REFERENCE

The present application for patent claims the benefit of U.S. Provisional Patent Application No. 63/297,688 by BAI et al., entitled "REPORTING MULTIPLE REPLACE-MENT BEAMS IN BEAM FAILURE RECOVERY REQUESTS," filed Jan. 7, 2022, assigned to the assignee hereof, and expressly incorporated by reference herein.

INTRODUCTION

The following relates to wireless communications, including beam failure recovery procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a user equipment (UE) is described. The method may include outputting a first signal that includes a beam failure recovery request (BFRQ) in response to a detection of a beam failure of a beam pair link with a first transmission/reception point (TRP). In some examples, the BFRQ indicates a first network beam at the first TRP based on the beam failure of the beam pair link with the first TRP, and the BFRQ indicates a second network beam at a second TRP based on the first network beam and a UE beam configuration supported by the UE that includes one or more UE beams corresponding to the first network beam and the second network beam. In some examples, the method may include obtaining, in response to the BFRQ, a second signal that includes a beam failure recovery response (BFRR) and communicating with the first TRP and the second TRP via the one or more UE beams based on the BFRR.

An apparatus for wireless communications at a UE is described. The apparatus may include a processor and memory coupled with the processor. The processor may be configured to output a first signal that includes a BFRQ in response to a detection of a beam failure of a beam pair link with a first TRP. In some examples, the BFRQ indicates a first network beam at the first TRP based on the beam failure of the beam pair link with the first TRP, and the BFRQ indicates a second network beam at a second TRP based on the first network beam and a UE beam configuration supported by the UE that includes one or more UE beams corresponding to the first network beam and the second network beam. In some examples, the processor may be configured to obtain, in response to the BFRQ, a second signal that includes a BFRR and communicate with the first TRP and the second TRP via the one or more UE beams based on the BFRR.

Another apparatus for wireless communications at a UE is described. The apparatus may include means for outputting a first signal that includes a BFRQ in response to a detection of a beam failure of a beam pair link with a first TRP. In some examples, the BFRQ indicates a first network beam at the first TRP based on the beam failure of the beam pair link with the first TRP, and the BFRQ indicates a second network beam at a second TRP based on the first network beam and a UE beam configuration supported by the UE that includes one or more UE beams corresponding to the first network beam and the second network beam. In some examples, the apparatus may include means for obtaining, in response to the BFRQ, a second signal that includes a BFRR and means for communicating with the first TRP and the second TRP via the one or more UE beams based on the BFRR.

A non-transitory computer-readable medium storing code for wireless communications at a UE is described. The code may include instructions executable by a processor to output a first signal that includes a BFRQ in response to a detection of a beam failure of a beam pair link with a first TRP. In some examples, the BFRQ indicates a first network beam at the first TRP based on the beam failure of the beam pair link with the first TRP, and the BFRQ indicates a second network beam at a second TRP based on the first network beam and a UE beam configuration supported by the UE that includes one or more UE beams corresponding to the first network beam and the second network beam. In some examples, the code may include instructions executable by the processor to obtain, in response to the BFRQ, a second signal that includes a BFRR and communicate with the first TRP and the second TRP via the one or more UE beams based on the BFRR.

Some examples of the method, apparatuses, and non-transitory computer-readable medium described herein may further include operations, features, means, or instructions for storing a transmission configuration indicator (TCI) state codepoint that includes a first TCI state for the first TRP and a second TCI state for the second TRP and determining the second network beam based on the first TCI state that corresponds to the first network beam and the second TCI state that corresponds to the second network beam.

Some examples of the method, apparatuses, and non-transitory computer-readable medium described herein may further include operations, features, means, or instructions for outputting a third signal indicating a set of multiple network beam configurations that correspond to respective UE beam configurations supported by the UE, where the respective UE beam configurations include at least the UE beam configuration supported by the UE.

Some examples of the method, apparatuses, and non-transitory computer-readable medium described herein may further include operations, features, means, or instructions for determining the set of multiple network beam configurations based on the first TRP, the second TRP, a capability of the UE, a first channel associated with the UE and the first TRP, a second channel associated with the UE and the second TRP, a multiplexing scheme for the UE, or a combination thereof.

Some examples of the method, apparatuses, and non-transitory computer-readable medium described herein may further include operations, features, means, or instructions for obtaining a new beam identification reference signal (NBI-RS) that corresponds to the first network beam and determine the first network beam based on the NBI-RS, where the BFRQ indicates the first network beam based on the determination.

Some examples of the method, apparatuses, and non-transitory computer-readable medium described herein may further include operations, features, means, or instructions for maintaining a second beam pair link with the second TRP concurrent to the detection of the beam failure of the beam pair link with the first TRP and concurrent to the first signal that includes the BFRQ being output.

Some examples of the method, apparatuses, and non-transitory computer-readable medium described herein may further include operations, features, means, or instructions for supporting the UE beam configuration based on the UE supporting concurrent reception via a first UE beam of the UE beam configuration that corresponds to the first network beam and a second UE beam of the UE beam configuration that corresponds to the second network beam in a spatial-division multiplexing (SDM) scheme.

Some examples of the method, apparatuses, and non-transitory computer-readable medium described herein may further include operations, features, means, or instructions for initiating a timer in response to the obtained second signal that includes the BFRR and activating the UE beam configuration based on an expiration of the timer, the communication with the first TRP and the second TRP via the one or more UE beams being further based on the activation of the UE beam configuration.

In some examples of the method, apparatuses, and non-transitory computer-readable medium described herein, to communicate with the first TRP and the second TRP, the method, apparatuses, and non-transitory computer-readable medium may include operations, features, means, or instructions for obtaining, via a transceiver, a downlink signal from the first TRP or from the second TRP or both and outputting, via the transceiver, an uplink signal to the first TRP or to the second TRP or both.

A method for wireless communications at a device in a wireless network is described. The method may include obtaining a first signal that includes a BFRQ that indicates a beam failure of a beam pair link between a UE and a first TRP. In some examples, the BFRQ further indicates a first network beam at the first TRP based on the beam failure of the beam pair link between the UE and the first TRP, and the BFRQ further indicates a second network beam at a second TRP based on the first network beam and a UE beam configuration supported by the UE that corresponds to the first network beam at the first TRP and the second network beam at the second TRP. In some examples, the method may include outputting, in response to the BFRQ, a second signal that includes a BFRR and communicating via the first network beam or the second network beam or both based on the BFRR.

An apparatus for wireless communications at a device in a wireless network is described. The apparatus may include a processor and memory coupled with the processor. The processor may be configured to obtain a first signal that includes a BFRQ that indicates a beam failure of a beam pair link between a UE and a first TRP. In some examples, the BFRQ further indicates a first network beam at the first TRP based on the beam failure of the beam pair link between the UE and the first TRP, and the BFRQ further indicates a second network beam at a second TRP based on the first network beam and a UE beam configuration supported by the UE that corresponds to the first network beam at the first TRP and the second network beam at the second TRP. In some examples, the processor may be configured to output, in response to the BFRQ, a second signal that includes a BFRR and communicate via the first network beam or the second network beam or both based on the BFRR.

Another apparatus for wireless communications at a device in a wireless network is described. The apparatus may include means for obtaining a first signal that includes a BFRQ that indicates a beam failure of a beam pair link between a UE and a first TRP. In some examples, the BFRQ further indicates a first network beam at the first TRP based on the beam failure of the beam pair link between the UE and the first TRP, and the BFRQ further indicates a second network beam at a second TRP based on the first network beam and a UE beam configuration supported by the UE that corresponds to the first network beam at the first TRP and the second network beam at the second TRP. In some examples, the apparatus may include means for outputting, in response to the BFRQ, a second signal that includes a BFRR and means for communicating via the first network beam or the second network beam or both based on the BFRR.

A non-transitory computer-readable medium storing code for wireless communications at a device in a wireless network is described. The code may include instructions executable by a processor to obtain a first signal that includes a BFRQ that indicates a beam failure of a beam pair link between a UE and a first TRP. In some examples, the BFRQ further indicates a first network beam at the first TRP based on the beam failure of the beam pair link between the UE and the first TRP, and the BFRQ further indicates a second network beam at a second TRP based on the first network beam and a UE beam configuration supported by the UE that corresponds to the first network beam at the first TRP and the second network beam at the second TRP. In some examples, the code may include instructions executable by the processor to output, in response to the BFRQ, a second signal that includes a BFRR and communicate via the first network beam or the second network beam or both based on the BFRR.

Some examples of the method, apparatuses, and non-transitory computer-readable medium described herein may further include operations, features, means, or instructions for obtaining a third signal that indicates a set of multiple network beam configurations corresponding to respective UE beam configurations supported by the UE and determining the UE beam configuration supported by the UE based on the indicated set of multiple network beam configurations.

In some examples of the method, apparatuses, and non-transitory computer-readable medium described herein, to communicate, the method, apparatuses, and non-transitory computer-readable medium may include operations, features, means, or instructions for communicating via a transceiver and via the first network beam based on the device in the wireless network including the first TRP.

In some examples of the method, apparatuses, and non-transitory computer-readable medium described herein, to communicate, the method, apparatuses, and non-transitory computer-readable medium may include operations, features, means, or instructions for communicating via a transceiver and via the second network beam based on the device in the wireless network including the second TRP.

A method for wireless communications at a UE is described. The method may include outputting a first signal that includes a BFRQ in response to a detection of a beam failure of a downlink connection. In some examples, the BFRQ indicates a downlink network beam based on the beam failure of the downlink connection, and the BFRQ further indicates an uplink network beam based on the downlink network beam. In some examples, the method further includes obtaining, in response to the BFRQ, a second signal that includes a BFRR and communicating via a downlink UE beam corresponding to the downlink network beam and via an uplink UE beam corresponding to the uplink network beam based on the BFRR.

An apparatus for wireless communications at a UE is described. The apparatus may include a processor and memory coupled with the processor. The processor may be configured to output a first signal that includes a BFRQ in response to a detection of a beam failure of a downlink connection. In some examples, the BFRQ indicates a downlink network beam based on the beam failure of the downlink connection, and the BFRQ further indicates an uplink network beam based on the downlink network beam. In some examples, the processor may be configured to obtain, in response to the BFRQ, a second signal that includes a BFRR and communicate via a downlink UE beam corresponding to the downlink network beam and via an uplink UE beam corresponding to the uplink network beam based on the BFRR.

Another apparatus for wireless communications at a UE is described. The apparatus may include means for outputting a first signal that includes a BFRQ in response to a detection of a beam failure of a downlink connection. In some examples, the BFRQ indicates a downlink network beam based on the beam failure of the downlink connection, and the BFRQ further indicates an uplink network beam based on the downlink network beam. In some examples, the apparatus may include means for obtaining, in response to the BFRQ, a second signal that includes a BFRR and means for communicating via a downlink UE beam corresponding to the downlink network beam and via an uplink UE beam corresponding to the uplink network beam based on the BFRR.

A non-transitory computer-readable medium storing code for wireless communications at a UE is described. The code may include instructions executable by a processor to output a first signal that includes a BFRQ in response to a detection of a beam failure of a downlink connection. In some examples, the BFRQ indicates a downlink network beam based on the beam failure of the downlink connection, and the BFRQ further indicates an uplink network beam based on the downlink network beam. In some examples, the code may include instructions executable by the processor to obtain, in response to the BFRQ, a second signal that includes a BFRR and communicate via a downlink UE beam corresponding to the downlink network beam and via an uplink UE beam corresponding to the uplink network beam based on the BFRR.

Some examples of the method, apparatuses, and non-transitory computer-readable medium described herein may further include operations, features, means, or instructions for determining the uplink network beam further based on a permissible exposure threshold for the UE.

In some examples of the method, apparatuses, and non-transitory computer-readable medium described herein, to communicate via the downlink UE beam and the uplink UE beam, the method, apparatuses, and non-transitory computer-readable medium may include operations, features, means, or instructions for obtaining, via a transceiver, a downlink signal via the downlink UE beam and outputting, via the transceiver, an uplink signal via the uplink UE beam.

A method for wireless communications at a device in a wireless network is described. The method may include obtaining a first signal that includes a BFRQ that indicates a beam failure of a downlink connection with a UE. In some examples, the BFRQ indicates a downlink network beam based on the beam failure of the downlink connection, and the BFRQ further indicates an uplink network beam based on the downlink network beam. In some examples, the method may include outputting, in response to the BFRQ, a second signal that includes a BFRR and communicating via the downlink network beam or the uplink network beam or both based on the BFRR.

An apparatus for wireless communications at a device in a wireless network is described. The apparatus may include a processor and memory coupled with the processor. The processor may be configured to obtain a first signal that includes a BFRQ that indicates a beam failure of a downlink connection with a UE. In some examples, the BFRQ indicates a downlink network beam based on the beam failure of the downlink connection, and the BFRQ further indicates an uplink network beam based on the downlink network beam. In some examples, the processor may be configured to output, in response to the BFRQ, a second signal that includes a BFRR and communicate via the downlink network beam or the uplink network beam or both based on the BFRR.

Another apparatus for wireless communications at a device in a wireless network is described. The apparatus may include means for obtaining a first signal that includes a BFRQ that indicates a beam failure of a downlink connection with a UE. In some examples, the BFRQ indicates a downlink network beam based on the beam failure of the downlink connection, and the BFRQ further indicates an uplink network beam based on the downlink network beam. In some examples, the apparatus includes means for outputting, in response to the BFRQ, a second signal that includes a BFRR and means for communicating via the downlink network beam or the uplink network beam or both based on the BFRR.

A non-transitory computer-readable medium storing code for wireless communications at a device in a wireless network is described. The code may include instructions executable by a processor to obtain a first signal that includes a BFRQ that indicates a beam failure of a downlink connection with a UE. In some examples, the BFRQ indicates a downlink network beam based on the beam failure of the downlink connection, and the BFRQ further indicates an uplink network beam based on the downlink network beam. In some examples, the code may include instructions executable by the processor to output, in response to the BFRQ, a second signal that includes a BFRR and communicate via the downlink network beam or the uplink network beam or both based on the BFRR.

In some examples of the method, apparatuses, and non-transitory computer-readable medium described herein, to communicate, the method, apparatuses, and non-transitory computer-readable medium may include operations, features, means, or instructions for outputting, via a transceiver, a downlink signal via the downlink network beam based on the device in the wireless network including a TRP that supports the downlink network beam.

In some examples of the method, apparatuses, and non-transitory computer-readable medium described herein, to communicate, the method, apparatuses, and non-transitory computer-readable medium may include operations, features, means, or instructions for obtaining, via a transceiver, an uplink signal via the uplink network beam based on the device in the wireless network including a TRP that supports the uplink network beam.

A method for wireless communications at a UE is described. The method may include outputting a first signal that includes a BFRQ in response to a detection of a beam failure of a beam pair link for a first component carrier (CC). In some examples, the BFRQ indicates a first network beam for the first CC based on the beam failure of the beam pair link for the first CC, and the BFRQ further indicates a second network beam for a second CC associated with the first CC based on the beam failure of the beam pair link for the first CC. In some examples, the method may include obtaining, in response to the BFRQ, a second signal that includes a BFRR and communicating via the first CC and via the second CC in accordance with one or more UE beams that correspond to the first network beam and the second network beam based on the BFRR.

An apparatus for wireless communications at a UE is described. The apparatus may include a processor and memory coupled with the processor. The processor may be configured to output a first signal that includes a BFRQ in response to a detection of a beam failure of a beam pair link for a first CC. In some examples, the BFRQ indicates a first network beam for the first CC based on the beam failure of the beam pair link for the first CC, and the BFRQ further indicates a second network beam for a second CC associated with the first CC based on the beam failure of the beam pair link for the first CC. In some examples, the processor may be configured to obtain, in response to the BFRQ, a second signal that includes a BFRR and communicate via the first CC and via the second CC in accordance with one or more UE beams that correspond to the first network beam and the second network beam based on the BFRR.

Another apparatus for wireless communications at a UE is described. The apparatus may include means for outputting a first signal that includes a BFRQ in response to a detection of a beam failure of a beam pair link for a first CC. In some examples, the BFRQ indicates a first network beam for the first CC based on the beam failure of the beam pair link for the first CC, and the BFRQ further indicates a second network beam for a second CC associated with the first CC based on the beam failure of the beam pair link for the first CC. In some examples, the apparatus may include means for obtaining, in response to the BFRQ, a second signal that includes a BFRR and means for communicating via the first CC and via the second CC in accordance with one or more UE beams that correspond to the first network beam and the second network beam based on the BFRR.

A non-transitory computer-readable medium storing code for wireless communications at a UE is described. The code may include instructions executable by a processor to output a first signal that includes a BFRQ in response to a detection of a beam failure of a beam pair link for a first CC. In some examples, the BFRQ indicates a first network beam for the first CC based on the beam failure of the beam pair link for the first CC, and the BFRQ further indicates a second network beam for a second CC associated with the first CC based on the beam failure of the beam pair link for the first CC. In some examples, the code may include instructions executable by the processor to obtain, in response to the BFRQ, a second signal that includes a BFRR and communicate via the first CC and via the second CC in accordance with one or more UE beams that correspond to the first network beam and the second network beam based on the BFRR.

Some examples of the method, apparatuses, and non-transitory computer-readable medium described herein may further include operations, features, means, or instructions for determining an association between the first CC and the second CC based on the second CC being within a frequency range from the first CC, where the BFRQ indicates the second network beam based on the association between the first CC and the second CC.

Some examples of the method, apparatuses, and non-transitory computer-readable medium described herein may further include operations, features, means, or instructions for determining an association between the first CC and the second CC based on a configured CC list that includes the first CC and the second CC, where the BFRQ indicates the second network beam based on the association between the first CC and the second CC.

In some examples of the method, apparatuses, and non-transitory computer-readable medium described herein, the BFRQ further indicates a first association between the first network beam and the first CC and a second association between the second network beam and the second CC.

In some examples of the method, apparatuses, and non-transitory computer-readable medium described herein, the BFRQ further indicates a first association between the first network beam and a first bandwidth part (BWP) that corresponds to the first CC and a second association between the second network beam and a second BWP that corresponds to the second CC.

In some examples of the method, apparatuses, and non-transitory computer-readable medium described herein, the BFRQ further indicates one or more additional network beams for one or more additional CCs associated with the first CC based on the beam failure of the beam pair link for the first CC.

Some examples of the method, apparatuses, and non-transitory computer-readable medium described herein may further include operations, features, means, or instructions for determining the second network beam based on a beam width of the first network beam that fails to satisfy a threshold beam width.

Some examples of the method, apparatuses, and non-transitory computer-readable medium described herein may further include operations, features, means, or instructions for determining that the first network beam fails to support communications via the second CC according to a beam squint effect for the first network beam based on the beam width of the first network beam that fails to satisfy the threshold beam width.

In some examples of the method, apparatuses, and non-transitory computer-readable medium described herein, to communicate via the first CC and via the second CC, the method, apparatuses, and non-transitory computer-readable medium may include operations, features, means, or instructions for obtaining, via a transceiver, a downlink signal via the first CC or via the second CC or both and outputting, via the transceiver, an uplink signal via the first CC or via the second CC or both.

A method for wireless communications at a device in a wireless network is described. The method may include obtaining a first signal that includes a BFRQ that indicates a beam failure of a beam pair link with a UE for a first CC. In some examples, the BFRQ indicates a first network beam for the first CC based on the beam failure of the beam pair link for the first CC, and the BFRQ further indicates a second network beam for a second CC associated with the first CC based on the beam failure of the beam pair link for the first CC. In some examples, the method may include outputting, in response to the BFRQ, a second signal that includes a BFRR and communicating via the first CC in accordance with the first network beam or via the second CC in accordance with the second network beam or both based on the BFRR.

An apparatus for wireless communications at a device in a wireless network is described. The apparatus may include a processor and memory coupled with the processor. The processor may be configured to obtain a first signal that includes a BFRQ that indicates a beam failure of a beam pair link with a UE for a first CC. In some examples, the BFRQ indicates a first network beam for the first CC based on the beam failure of the beam pair link for the first CC, and the BFRQ further indicates a second network beam for a second CC associated with the first CC based on the beam failure of the beam pair link for the first CC. In some examples, the processor may be configured to output, in response to the BFRQ, a second signal that includes a BFRR and communicate via the first CC in accordance with the first network beam or via the second CC in accordance with the second network beam or both based on the BFRR.

Another apparatus for wireless communications at a device in a wireless network is described. The apparatus may include means for obtaining a first signal that includes a BFRQ that indicates a beam failure of a beam pair link with a UE for a first CC. In some examples, the BFRQ indicates a first network beam for the first CC based on the beam failure of the beam pair link for the first CC, and the BFRQ further indicates a second network beam for a second CC associated with the first CC based on the beam failure of the beam pair link for the first CC. In some examples, the apparatus may include means for outputting, in response to the BFRQ, a second signal that includes a BFRR and means for communicating via the first CC in accordance with the first network beam or via the second CC in accordance with the second network beam or both based on the BFRR.

A non-transitory computer-readable medium storing code for wireless communications at a device in a wireless network is described. The code may include instructions executable by a processor to obtain a first signal that includes a BFRQ that indicates a beam failure of a beam pair link with a UE for a first CC. In some examples, the BFRQ indicates a first network beam for the first CC based on the beam failure of the beam pair link for the first CC, and the BFRQ further indicates a second network beam for a second CC associated with the first CC based on the beam failure of the beam pair link for the first CC. In some examples, the code may include instructions executable by the processor to output, in response to the BFRQ, a second signal that includes a BFRR and communicate via the first CC in accordance with the first network beam or via the second CC in accordance with the second network beam or both based on the BFRR.

In some examples of the method, apparatuses, and non-transitory computer-readable medium described herein, to communicate, the method, apparatuses, and non-transitory computer-readable medium may include operations, features, means, or instructions for outputting, via a transceiver, a downlink signal via the first CC in accordance with the first network beam or via the second CC in accordance with the second network beam or both and obtaining, via the transceiver, an uplink signal via the first CC in accordance with the first network beam or via the second CC in accordance with the second network beam or both.

A method for wireless communications at a UE is described. The method may include transmitting first signaling including a BFRQ in response to detecting a beam failure of a beam pair link with a first TRP, the BFRQ indicating a first base station beam at the first TRP based on the beam failure of the beam pair link with the first TRP, and the BFRQ indicating a second base station beam at a second TRP based on the first base station beam and a UE beam pair supported by the UE and including a first UE beam corresponding to the first base station beam and a second UE beam corresponding to the second base station beam. The method may further include receiving, in response to the BFRQ, second signaling including a beam failure recovery response (BFRR) and communicating with the first TRP using the first UE beam and with the second TRP using the second UE beam based on the BFRR.

An apparatus for wireless communications at a UE is described. The apparatus may include a processor and memory coupled with the processor. The processor may be configured to transmit first signaling including a BFRQ in response to detecting a beam failure of a beam pair link with a first TRP, the BFRQ indicating a first base station beam at the first TRP based on the beam failure of the beam pair link with the first TRP, and the BFRQ indicating a second base station beam at a second TRP based on the first base station beam and a UE beam pair supported by the UE and including a first UE beam corresponding to the first base station beam and a second UE beam corresponding to the second base station beam. The processor and memory may be further configured to receive, in response to the BFRQ, second signaling including a BFRR and communicate with the first TRP using the first UE beam and with the second TRP using the second UE beam based on the BFRR.

Another apparatus for wireless communications at a UE is described. The apparatus may include means for transmitting first signaling including a BFRQ in response to detecting a beam failure of a beam pair link with a first TRP, the BFRQ indicating a first base station beam at the first TRP based on the beam failure of the beam pair link with the first TRP, and the BFRQ indicating a second base station beam at a second TRP based on the first base station beam and a UE beam pair supported by the UE and including a first UE beam corresponding to the first base station beam and a second UE beam corresponding to the second base station beam. The apparatus may further include means for receiving, in response to the BFRQ, second signaling including a BFRR and means for communicating with the first TRP using the first UE beam and with the second TRP using the second UE beam based on the BFRR.

A non-transitory computer-readable medium storing code for wireless communications at a UE is described. The code may include instructions executable by a processor to transmit first signaling including a BFRQ in response to detecting a beam failure of a beam pair link with a first TRP, the BFRQ indicating a first base station beam at the first TRP based on the beam failure of the beam pair link with the first TRP, and the BFRQ indicating a second base station beam at a second TRP based on the first base station beam and a UE beam pair supported by the UE and including a first UE beam corresponding to the first base station beam and a second UE beam corresponding to the second base station beam. The code may further include instructions executable by the processor to receive, in response to the BFRQ, second signaling including a BFRR and communicate with the first TRP using the first UE beam and with the second TRP using the second UE beam based on the BFRR.

Some examples of the method, apparatuses, and non-transitory computer-readable medium described herein may further include operations, features, means, or instructions for storing a TCI state codepoint including a first TCI state for the first TRP and a second TCI state for the second TRP and determining the second base station beam based on the first TCI state corresponding to the first base station beam and the second TCI state corresponding to the second base station beam.

Some examples of the method, apparatuses, and non-transitory computer-readable medium described herein may further include operations, features, means, or instructions for transmitting third signaling indicating a set of multiple UE beam pairs supported by the UE, the set of multiple UE beam pairs including at least the UE beam pair supported by the UE.

Some examples of the method, apparatuses, and non-transitory computer-readable medium described herein may further include operations, features, means, or instructions for determining the set of multiple UE beam pairs supported by the UE based on the first TRP, the second TRP, a capability of the UE, a first channel between the UE and the first TRP, a second channel between the UE and the second TRP, a multiplexing scheme for the UE, or a combination thereof.

Some examples of the method, apparatuses, and non-transitory computer-readable medium described herein may further include operations, features, means, or instructions for receiving an NBI-RS corresponding to the first base station beam and determining the first base station beam based on the NBI-RS, the BFRQ indicating the first base station beam based on the determining.

Some examples of the method, apparatuses, and non-transitory computer-readable medium described herein may further include operations, features, means, or instructions for maintaining a second beam pair link with the second TRP concurrent to detecting the beam failure of the beam pair link with the first TRP and concurrent to transmitting the first signaling including the BFRQ indicating the second base station beam at the second TRP.

Some examples of the method, apparatuses, and non-transitory computer-readable medium described herein may further include operations, features, means, or instructions for supporting the UE beam pair based on the UE supporting concurrent reception using the first UE beam and the second UE beam of the UE beam pair in an SDM scheme.

Some examples of the method, apparatuses, and non-transitory computer-readable medium described herein may further include operations, features, means, or instructions for initiating a timer in response to receiving the second signaling including the BFRR and activating the UE beam pair based on an expiration of the timer, the communicating with the first TRP using the first UE beam and with the second TRP using the second UE beam being further based on activating the UE beam pair.

In some examples of the method, apparatuses, and non-transitory computer-readable medium described herein, the communicating may include operations, features, means, or instructions for receiving, via a transceiver, downlink signaling from the first TRP using the first UE beam or from the second TRP using the second UE beam or both and transmitting, via the transceiver, uplink signaling to the first TRP using the first UE beam or to the second TRP using the second UE beam or both.

A method for wireless communications at a device in a wireless network is described. The method may include receiving, from a UE, first signaling including a BFRQ indicating a beam failure of a beam pair link between the UE and a first TRP, the BFRQ further indicating a first base station beam at the first TRP based on the beam failure of the beam pair link between the UE and the first TRP, and the BFRQ further indicating a second base station beam at a second TRP based on the first base station beam and a UE beam pair supported by the UE and corresponding to the first base station beam at the first TRP and the second base station beam at the second TRP. The method may further include transmitting, to the UE and in response to the BFRQ, second signaling including a BFRR and communicating with the UE using the first base station beam or the second base station beam or both based on the BFRR.

An apparatus for wireless communications at a device in a wireless network is described. The apparatus may include a processor and memory coupled with the processor. The processor may be configured to receive, from a UE, first signaling including a BFRQ indicating a beam failure of a beam pair link between the UE and a first TRP, the BFRQ further indicating a first base station beam at the first TRP based on the beam failure of the beam pair link between the UE and the first TRP, and the BFRQ further indicating a second base station beam at a second TRP based on the first base station beam and a UE beam pair supported by the UE and corresponding to the first base station beam at the first TRP and the second base station beam at the second TRP. The processor and memory may be further configured to transmit, to the UE and in response to the BFRQ, second signaling including a BFRR and communicate with the UE using the first base station beam or the second base station beam or both based on the BFRR.

Another apparatus for wireless communications at a device in a wireless network is described. The apparatus may include means for receiving, from a UE, first signaling including a BFRQ indicating a beam failure of a beam pair link between the UE and a first TRP, the BFRQ further indicating a first base station beam at the first TRP based on the beam failure of the beam pair link between the UE and the first TRP, and the BFRQ further indicating a second base station beam at a second TRP based on the first base station beam and a UE beam pair supported by the UE and corresponding to the first base station beam at the first TRP and the second base station beam at the second TRP. The apparatus may further include means for transmitting, to the UE and in response to the BFRQ, second signaling including a BFRR and means for communicating with the UE using the first base station beam or the second base station beam or both based on the BFRR.

A non-transitory computer-readable medium storing code for wireless communications at a device in a wireless network is described. The code may include instructions executable by a processor to receive, from a UE, first signaling including a BFRQ indicating a beam failure of a beam pair link between the UE and a first TRP, the BFRQ further indicating a first base station beam at the first TRP based on the beam failure of the beam pair link between the UE and the first TRP, and the BFRQ further indicating a second base station beam at a second TRP based on the first base station beam and a UE beam pair supported by the UE and corresponding to the first base station beam at the first TRP and the second base station beam at the second TRP. The code may further include instructions executable by the processor to transmit, to the UE and in response to the BFRQ, second signaling including a BFRR and communicate with the UE using the first base station beam or the second base station beam or both based on the BFRR.

Some examples of the method, apparatuses, and non-transitory computer-readable medium described herein may further include operations, features, means, or instructions for receiving, from the UE, third signaling indicating a set of multiple UE beam pairs supported by the UE and determining the UE beam pair supported by the UE based on the set of multiple UE beam pairs.

In some examples of the method, apparatuses, and non-transitory computer-readable medium described herein, the communicating may include operations, features, means, or instructions for communicating, via a transceiver, with the UE using the first base station beam based on the device in the wireless network including the first TRP.

In some examples of the method, apparatuses, and non-transitory computer-readable medium described herein, the communicating may include operations, features, means, or instructions for communicating, via a transceiver, with the UE using the second base station beam based on the device in the wireless network including the second TRP.

A method for wireless communications at a UE is described. The method may include transmitting first signaling including a BFRQ in response to detecting a beam failure of a downlink connection, the BFRQ indicating a downlink base station beam based on the beam failure of the downlink connection, and the BFRQ further indicating an uplink base station beam based on the downlink base station beam. The method may further include receiving, in response to the BFRQ, second signaling including a BFRR and communicating using a downlink UE beam corresponding to the downlink base station beam and using an uplink UE beam corresponding to the uplink base station beam based on the BFRR.

An apparatus for wireless communications at a UE is described. The apparatus may include a processor and memory coupled with the processor. The processor may be configured to transmit first signaling including a BFRQ in response to detecting a beam failure of a downlink connection, the BFRQ indicating a downlink base station beam based on the beam failure of the downlink connection, and the BFRQ further indicating an uplink base station beam based on the downlink base station beam. The processor and memory may be further configured to receive, in response to the BFRQ, second signaling including a BFRR and communicate using a downlink UE beam corresponding to the downlink base station beam and using an uplink UE beam corresponding to the uplink base station beam based on the BFRR.

Another apparatus for wireless communications at a UE is described. The apparatus may include means for transmitting first signaling including a BFRQ in response to detecting a beam failure of a downlink connection, the BFRQ indicating a downlink base station beam based on the beam failure of the downlink connection, and the BFRQ further indicating an uplink base station beam based on the downlink base station beam. The apparatus may further include means for receiving, in response to the BFRQ, second signaling including a BFRR and means for communicating using a downlink UE beam corresponding to the downlink base station beam and using an uplink UE beam corresponding to the uplink base station beam based on the BFRR.

A non-transitory computer-readable medium storing code for wireless communications at a UE is described. The code may include instructions executable by a processor to transmit first signaling including a BFRQ in response to detecting a beam failure of a downlink connection, the BFRQ indicating a downlink base station beam based on the beam failure of the downlink connection, and the BFRQ further indicating an uplink base station beam based on the downlink base station beam. The code may further include instructions executable by the processor to receive, in response to the BFRQ, second signaling including a BFRR and communicate using a downlink UE beam corresponding to the downlink base station beam and using an uplink UE beam corresponding to the uplink base station beam based on the BFRR.

Some examples of the method, apparatuses, and non-transitory computer-readable medium described herein may further include operations, features, means, or instructions for determining the uplink base station beam further based on a permissible exposure threshold for the UE.

Some examples of the method, apparatuses, and non-transitory computer-readable medium described herein may further include operations, features, means, or instructions for receiving an NBI-RS using the downlink beam and determining the downlink beam based on the NBI-RS, the BFRQ indicating the downlink beam based on the determining.

Some examples of the method, apparatuses, and non-transitory computer-readable medium described herein may further include operations, features, means, or instructions for initiating a timer in response to receiving the second signaling including the BFRR and activating the downlink beam and the uplink beam based on an expiration of the timer, the communicating using the downlink beam and the uplink beam being further based on activating the downlink beam and the uplink beam.

In some examples of the method, apparatuses, and non-transitory computer-readable medium described herein, the communicating may include operations, features, means, or instructions for receiving, via a transceiver, downlink signaling using the downlink UE beam and transmitting, via the transceiver, uplink signaling using the uplink UE beam.

A method for wireless communications at a device in a wireless network is described. The method may include receiving, from a UE, first signaling including a BFRQ indicating a beam failure of a downlink connection, the BFRQ indicating a downlink base station beam based on the beam failure of the downlink connection, and the BFRQ indicating an uplink base station beam based on the downlink base station beam. The method may further include transmitting, to the UE and in response to the BFRQ, second signaling including a BFRR and communicating with the UE using the downlink base station beam or the uplink base station beam or both based on the BFRR.

An apparatus for wireless communications at a device in a wireless network is described. The apparatus may include a processor and memory coupled with the processor. The processor may be configured to receive, from a UE, first signaling including a BFRQ indicating a beam failure of a downlink connection, the BFRQ indicating a downlink base station beam based on the beam failure of the downlink connection, and the BFRQ indicating an uplink base station beam based on the downlink base station beam. The processor and memory may be further configured to transmit, to the UE and in response to the BFRQ, second signaling including a BFRR and communicate with the UE using the downlink base station beam or the uplink base station beam or both based on the BFRR.

Another apparatus for wireless communications at a device in a wireless network is described. The apparatus may include means for receiving, from a UE, first signaling including a BFRQ indicating a beam failure of a downlink connection, the BFRQ indicating a downlink base station beam based on the beam failure of the downlink connection, and the BFRQ indicating an uplink base station beam based on the downlink base station beam. The apparatus may further include means for transmitting, to the UE and in response to the BFRQ, second signaling including a BFRR and means for communicating with the UE using the downlink base station beam or the uplink base station beam or both based on the BFRR.

A non-transitory computer-readable medium storing code for wireless communications at a device in a wireless network is described. The code may include instructions executable by a processor to receive, from a UE, first signaling including a BFRQ indicating a beam failure of a downlink connection, the BFRQ indicating a downlink base station beam based on the beam failure of the downlink connection, and the BFRQ indicating an uplink base station beam based on the downlink base station beam. The code may further include instructions executable by a processor to transmit, to the UE and in response to the BFRQ, second signaling including a BFRR and communicate with the UE using the downlink base station beam or the uplink base station beam or both based on the BFRR.

In some examples of the method, apparatuses, and non-transitory computer-readable medium described herein, the communicating may include operations, features, means, or instructions for transmitting, via a transceiver, downlink signaling to the UE using the downlink base station beam based on the device in the wireless network including a TRP supporting the downlink base station beam.

In some examples of the method, apparatuses, and non-transitory computer-readable medium described herein, the communicating may include operations, features, means, or instructions for receiving, via a transceiver, uplink signaling from the UE using the uplink base station beam based on the device in the wireless network including a TRP supporting the uplink base station beam.

A method for wireless communications at a UE is described. The method may include transmitting first signaling including a BFRQ in response to detecting a beam failure of a beam pair link for a first CC, the BFRQ indicating a first base station beam for the first CC based on the beam failure of the beam pair link for the first CC, and the BFRQ indicating a second base station beam for a second CC associated with the first CC based on the beam failure of the beam pair link for the first CC. The method may further include receiving, in response to the BFRQ, second signaling including a BFRR and communicating on the first CC using a first UE beam corresponding to the first base station beam and on the second CC using a second UE beam corresponding to the second base station beam based on the BFRR.

An apparatus for wireless communications at a UE is described. The apparatus may include a processor and memory coupled with the processor. The processor may be configured to transmit first signaling including a BFRQ in response to detecting a beam failure of a beam pair link for a first CC, the BFRQ indicating a first base station beam for the first CC based on the beam failure of the beam pair link for the first CC, and the BFRQ indicating a second base station beam for a second CC associated with the first CC based on the beam failure of the beam pair link for the first CC. The processor and memory may be further configured to receive, in response to the BFRQ, second signaling including a BFRR and communicate on the first CC using a first UE beam corresponding to the first base station beam and on the second CC using a second UE beam corresponding to the second base station beam based on the BFRR.

Another apparatus for wireless communications at a UE is described. The apparatus may include means for transmitting first signaling including a BFRQ in response to detecting a beam failure of a beam pair link for a first CC, the BFRQ indicating a first base station beam for the first CC based on the beam failure of the beam pair link for the first CC, and the BFRQ indicating a second base station beam for a second CC associated with the first CC based on the beam failure of the beam pair link for the first CC. The apparatus may further include means for receiving, in response to the BFRQ, second signaling including a BFRR and means for communicating on the first CC using a first UE beam corresponding to the first base station beam and on the second CC using a second UE beam corresponding to the second base station beam based on the BFRR.

A non-transitory computer-readable medium storing code for wireless communications at a UE is described. The code may include instructions executable by a processor to transmit first signaling including a BFRQ in response to detecting a beam failure of a beam pair link for a first CC, the BFRQ indicating a first base station beam for the first CC based on the beam failure of the beam pair link for the first CC, and the BFRQ indicating a second base station beam for a second CC associated with the first CC based on the beam failure of the beam pair link for the first CC. The code may further include instructions executable by the processor to receive, in response to the BFRQ, second signaling including a BFRR and communicate on the first CC using a first UE beam corresponding to the first base station beam and on the second CC using a second UE beam corresponding to the second base station beam based on the BFRR.

Some examples of the method, apparatuses, and non-transitory computer-readable medium described herein may further include operations, features, means, or instructions for determining an association between the first CC and the second CC based on the second CC being within a frequency range from the first CC, the BFRQ indicating the second base station beam based on the association between the first CC and the second CC.

Some examples of the method, apparatuses, and non-transitory computer-readable medium described herein may further include operations, features, means, or instructions for determining an association between the first CC and the second CC based on a configured CC list including the first CC and the second CC, the BFRQ indicating the second base station beam based on the association between the first CC and the second CC.

In some examples of the method, apparatuses, and non-transitory computer-readable medium described herein, the BFRQ further indicates a first association between the first base station beam and the first CC and a second association between the second base station beam and the second CC.

In some examples of the method, apparatuses, and non-transitory computer-readable medium described herein, the BFRQ further indicates a first association between the first base station beam and a first BWP corresponding to the first CC and a second association between the second base station beam and a second BWP corresponding to the second CC.

In some examples of the method, apparatuses, and non-transitory computer-readable medium described herein, the BFRQ further indicates one or more additional base station beams for one or more additional CCs associated with the first CC based on the beam failure of the beam pair link for the first CC.

Some examples of the method, apparatuses, and non-transitory computer-readable medium described herein may further include operations, features, means, or instructions for determining the second base station beam based on a beam width of the first base station beam failing to satisfy a threshold beam width.

Some examples of the method, apparatuses, and non-transitory computer-readable medium described herein may further include operations, features, means, or instructions for determining that the first base station beam fails to support communications on the second CC according to a beam squint effect for the first base station beam based on the beam width of the first base station beam failing to satisfy the threshold beam width.

Some examples of the method, apparatuses, and non-transitory computer-readable medium described herein may further include operations, features, means, or instructions for receiving an NBI-RS on the first CC corresponding to the first base station beam and determining the first base station beam based on the NBI-RS, the BFRQ indicating the first base station beam based on the determining.

Some examples of the method, apparatuses, and non-transitory computer-readable medium described herein may further include operations, features, means, or instructions for initiating a timer in response to receiving the second signaling including the BFRR and activating the first UE beam and the second UE beam based on an expiration of the timer, the communicating on the first CC using the first UE beam and on the second CC using the second UE beam being further based on activating the first UE beam and the second UE beam.

In some examples of the method, apparatuses, and non-transitory computer-readable medium described herein, the communicating may include operations, features, means, or instructions for receiving, via a transceiver, downlink signaling on the first CC using the first UE beam or on the second CC using the second UE beam or both and transmitting, via the transceiver, uplink signaling on the first CC using the first UE beam or on the second CC using the second UE beam or both.

A method for wireless communications at a device in a wireless network is described. The method may include receiving, from a UE, first signaling including a BFRQ indicating a beam failure of a beam pair link for a first CC, the BFRQ indicating a first base station beam for the first CC based on the beam failure of the beam pair link for the first CC, and the BFRQ indicating a second base station beam for a second CC associated with the first CC based on the beam failure of the beam pair link for the first CC. The method may further include transmitting, to the UE and in response to the BFRQ, second signaling including a BFRR and communicating with the UE on the first CC using the first base station beam or on the second CC using the second base station beam or both based on the BFRR.

An apparatus for wireless communications at a device in a wireless network is described. The apparatus may include a processor and memory coupled with the processor. The processor may be configured to receive, from a UE, first signaling including a BFRQ indicating a beam failure of a beam pair link for a first CC, the BFRQ indicating a first base station beam for the first CC based on the beam failure of the beam pair link for the first CC, and the BFRQ indicating a second base station beam for a second CC associated with the first CC based on the beam failure of the beam pair link for the first CC. The processor and memory may be further configured to transmit, to the UE and in response to the BFRQ, second signaling including a BFRR and communicate with the UE on the first CC using the first base station beam or on the second CC using the second base station beam or both based on the BFRR.

Another apparatus for wireless communications at a device in a wireless network is described. The apparatus may include means for receiving, from a UE, first signaling including a BFRQ indicating a beam failure of a beam pair link for a first CC, the BFRQ indicating a first base station beam for the first CC based on the beam failure of the beam pair link for the first CC, and the BFRQ indicating a second base station beam for a second CC associated with the first CC based on the beam failure of the beam pair link for the first CC. The apparatus may further include means for transmitting, to the UE and in response to the BFRQ, second signaling including a BFRR and means for communicating with the UE on the first CC using the first base station beam or on the second CC using the second base station beam or both based on the BFRR.

A non-transitory computer-readable medium storing code for wireless communications at a device in a wireless network is described. The code may include instructions executable by a processor to receive, from a UE, first signaling including a BFRQ indicating a beam failure of a beam pair link for a first CC, the BFRQ indicating a first base station beam for the first CC based on the beam failure of the beam pair link for the first CC, and the BFRQ indicating a second base station beam for a second CC associated with the first CC based on the beam failure of the beam pair link for the first CC. The code may further include instructions executable by the processor to transmit, to the UE and in response to the BFRQ, second signaling including a BFRR and communicate with the UE on the first CC using the first base station beam or on the second CC using the second base station beam or both based on the BFRR.

In some examples of the method, apparatuses, and non-transitory computer-readable medium described herein, the communicating may include operations, features, means, or instructions for transmitting, via a transceiver, downlink signaling on the first CC using the first base station beam or on the second CC using the second base station beam or both and receiving, via the transceiver, uplink signaling on the first CC using the first base station beam or on the second CC using the second base station beam or both.

A method for wireless communications at a UE is described. The method may include transmitting first signaling including a BFRQ in response to detecting a beam failure for a first CC, the BFRQ indicating a first beam for the first CC based on the beam failure for the first CC. The method may further include receiving, in response to the BFRQ, second signaling including a BFRR and communicating on the first CC using the first beam and on a second CC using a second beam based on the BFRR, the second beam being based on the first beam and an association between the first CC and the second CC.

An apparatus for wireless communications at a UE is described. The apparatus may include a processor and memory coupled with the processor. The processor and memory may be configured to transmit first signaling including a BFRQ in response to detecting a beam failure for a first CC, the BFRQ indicating a first beam for the first CC based on the beam failure for the first CC. The processor and memory may be further configured to receive, in response to the BFRQ, second signaling including a BFRR and communicate on the first CC using the first beam and on a second CC using a second beam based on the BFRR, the second beam being based on the first beam and an association between the first CC and the second CC.

Another apparatus for wireless communications at a UE is described. The apparatus may include means for transmitting first signaling including a BFRQ in response to detecting a beam failure for a first CC, the BFRQ indicating a first beam for the first CC based on the beam failure for the first CC. The apparatus may further include means for receiving, in response to the BFRQ, second signaling including a BFRR and means for communicating on the first CC using the first beam and on a second CC using a second beam based on the BFRR, the second beam being based on the first beam and an association between the first CC and the second CC.

A non-transitory computer-readable medium storing code for wireless communications at a UE is described. The code may include instructions executable by a processor to transmit first signaling including a BFRQ in response to detecting a beam failure for a first CC, the BFRQ indicating a first beam for the first CC based on the beam failure for the first CC. The code may further include instructions executable by a processor to receive, in response to the BFRQ, second signaling including a BFRR and communicate on the first CC using the first beam and on a second CC using a second beam based on the BFRR, the second beam being based on the first beam and an association between the first CC and the second CC.

Some examples of the method, apparatuses, and non-transitory computer-readable medium described herein may further include operations, features, means, or instructions for storing a table or a rule or both associating the first CC with the second CC and determining the second beam based on the table or the rule or both and the first beam for the first CC.

A method for wireless communications at a device in a wireless network is described. The method may include receiving, from a UE, first signaling including a BFRQ indicating a beam failure for a first CC, the BFRQ indicating a first beam for the first CC based on the beam failure for the first CC. The method may further include transmitting, to the UE and in response to the BFRQ, second signaling including a BFRR and communicating with the UE on the first CC using the first beam and on a second CC using a second beam based on the BFRR, the second beam being based on the first beam and an association between the first CC and the second CC.

An apparatus for wireless communications at a device in a wireless network is described. The apparatus may include a processor and memory coupled with the processor. The processor and memory may be configured to receive, from a UE, first signaling including a BFRQ indicating a beam failure for a first CC, the BFRQ indicating a first beam for the first CC based on the beam failure for the first CC. The processor and memory may be further configured to transmit, to the UE and in response to the BFRQ, second signaling including a BFRR and communicate with the UE on the first CC using the first beam and on a second CC using a second beam based on the BFRR, the second beam being based on the first beam and an association between the first CC and the second CC.

Another apparatus for wireless communications at a device in a wireless network is described. The apparatus may include means for receiving, from a UE, first signaling including a BFRQ indicating a beam failure for a first CC, the BFRQ indicating a first beam for the first CC based on the beam failure for the first CC. The apparatus may further include means for transmitting, to the UE and in response to the BFRQ, second signaling including a BFRR and means for communicating with the UE on the first CC using the first beam and on a second CC using a second beam based on the BFRR, the second beam being based on the first beam and an association between the first CC and the second CC.

A non-transitory computer-readable medium storing code for wireless communications at a device in a wireless network is described. The code may include instructions executable by a processor to receive, from a UE, first signaling including a BFRQ indicating a beam failure for a first CC, the BFRQ indicating a first beam for the first CC based on the beam failure for the first CC. The code may further include instructions executable by the processor to transmit, to the UE and in response to the BFRQ, second signaling including a BFRR and communicate with the UE on the first CC using the first beam and on a second CC using a second beam based on the BFRR, the second beam being based on the first beam and an association between the first CC and the second CC.

Some examples of the method, apparatuses, and non-transitory computer-readable medium described herein may further include operations, features, means, or instructions for storing a table or a rule or both associating the first CC with the second CC and determining the second beam based on the table or the rule or both and the first beam for the first CC.

BRIEF DESCRIPTION OF THE DRAWINGS

FIGS. 1 through 4 illustrate examples of wireless communications systems that support reporting multiple replacement beams in beam failure recovery requests (BFRQs) in accordance with one or more aspects of the present disclosure.

FIGS. 8 and 9 show block diagrams of devices that support reporting multiple replacement beams in BFRQs in accordance with one or more aspects of the present disclosure.

FIGS. 16 through 29 show flowcharts illustrating methods that support reporting multiple replacement beams in BFRQs in accordance with one or more aspects of the present disclosure.

DETAILED DESCRIPTION

Figure 1:
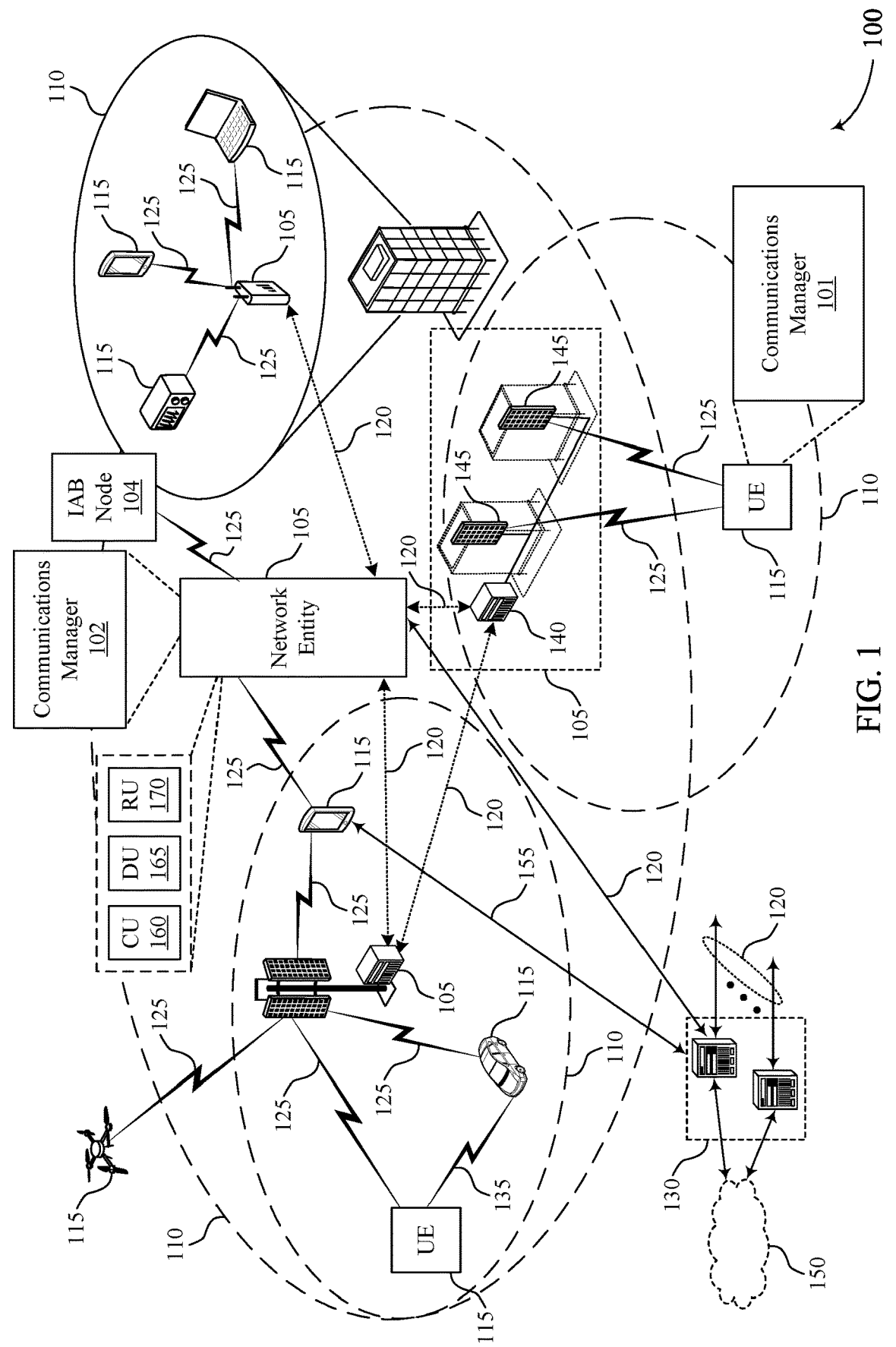

In some wireless communications systems, a UE may use multiple beam pair links for communications with a wireless network in accordance with a UE beam configuration. A beam pair link may include a network beam (e.g., a network receive beam, a network transmit beam, a base station beam, a base station receive beam, a base station transmit beam, or a combination thereof) and a UE beam (e.g., a UE transmit beam, a UE receive beam, or a combination thereof). For example, the UE may use different beam pair links to communicate with different TRPs of the wireless network (e.g., TRPs at one or more base stations or other network entities), different beam pair links for uplink and downlink communications, different beam pair links for different CCs, or some combination thereof. If the UE detects a beam failure for a single beam pair link (e.g., a beam pair link corresponding to a first TRP or a first CC, a downlink beam pair link including a network transmit beam and a UE receive beam supporting downlink transmission), the UE may transmit a BFRQ to the wireless network to request that the UE and the wireless network switch to a new beam pair link. The BFRQ may be an example of a message or other signal (e.g., an uplink signal from a UE) that indicates detection of a beam failure (e.g., by the UE for a beam pair link) and a request for the network to recover the failed beam (e.g., establish a new beam pair link, re-establish the failed beam pair link). The BFRQ may indicate a new network beam for the wireless network (e.g., for a base station or other network entity of the wireless network), a new UE beam, or both to use for the new beam pair link.

In some cases, the requested new network beam may not be compatible with another network beam currently active for communications between the wireless network and the UE (e.g., for a different TRP or CC, for uplink communications). To improve BFRQ reporting, the UE may support indicating multiple network beams (e.g., network receive beams, network transmit beams, or combinations thereof) in a BFRQ in response to detecting, at the UE, a beam failure for a single beam pair link. The UE may detect the beam failure for the beam pair link based on detecting beam failure for the UE beam (e.g., a UE receive beam, a UE transmit beam) of the beam pair link.

In some examples, the UE may communicate with the wireless network using multiple TRPs and may detect a beam failure of a beam pair link between the UE and a first TRP. Detecting a beam failure may involve the UE determining that a channel metric or signal metric associated with an active UE beam of the beam pair link fails to satisfy a threshold value. The UE may transmit a BFRQ in response to detecting the beam failure for the beam pair link with the first TRP. The UE may determine a first replacement network beam for the failed beam pair link and may include an indication of the first replacement network beam in the BFRQ. Additionally, the UE may determine a second replacement network beam for a second beam pair link with a second TRP based on the first replacement network beam and the beam failure for the first TRP. In some cases, the first replacement network beam and the second replacement network beam may correspond to a TCI state codepoint stored at the UE. For example, the UE may store one or more TCI state codepoints indicating which TCI states are supported for concurrent use at the UE. A TCI state codepoint may be an example of a pair of values (e.g., TCI state indexes) indicating a pair of TCI states supported for concurrent use at the UE. The BFRQ may further indicate the second replacement network beam. The first replacement network beam may correspond to a first UE beam at the UE (e.g., to form a new beam pair link), and the second replacement network beam may correspond to a second UE beam at the UE. The first and second UE beams may correspond to a UE beam configuration supported by the UE.

The UE may receive, from the network and in response to the BFRQ, a BFRR. The BFRR may be an example of a message or other signal (e.g., a downlink signal from the network) that indicates a new beam pair link to establish for communications between the UE and the network. In response to the BFRR, the UE and the base station (e.g., a network entity) may switch active beams to form new beam pair links for the first TRP and the second TRP. For example, the network entity including the first TRP may switch to the first replacement network beam and the network entity including the second TRP may switch to the second replacement network beam, and the UE may switch to the first UE beam and the second UE beam. The UE may communicate with the first TRP using the first UE beam corresponding to the first replacement network beam and may communicate with the second TRP using the second UE beam corresponding to the second replacement network beam based on the switch (e.g., in response to the BFRR). Switching to using the first UE beam and the second UE beam (e.g., activating the first UE beam and the second UE beam for communications at the UE) may be referred to as a beam resetting procedure. By indicating multiple network beams corresponding to different TRPs in a BFRQ triggered in response to a failed beam pair link for a single TRP, the UE may perform beam failure recovery for a first TRP while maintaining the compatibility of beam pair links across multiple TRPs.

Techniques, systems, and devices described herein support the use of one BFRQ to request multiple network beam replacements across multiple TRPs in response to a beam failure detection at the UE for a single beam pair link (e.g., between the UE and a first TRP), which may increase efficiency in resource utilization and reduce latency in requesting replacement beams. That is, using the BFRQ to request replacement network beams for multiple TRPs may allow a UE to maintain the compatibility of beam pair links used for the different TRPs if a beam failure is detected for one TRP. For example, the configured TCI states may fail to support the requested replacement network beam for the first TRP in combination with a currently active network beam at a second TRP. The BFRQ may additionally request a replacement network beam for the second TRP that is supported in combination with the requested replacement network beam for the first TRP (e.g., according to the configured TCI states). Maintaining such a compatibility between active beam pair links may improve communication reliability and provide more consistent connectivity. Using a single BFRQ (e.g., as compared to using multiple BFRQs) may reduce channel overhead and processing overhead for beam failure recovery procedures at the UE. Additionally, or alternatively, indicating a requested replacement network beam in the BFRQ for one or more TRPs without detecting beam failures for the one or more TRPs (e.g., in response to detecting a beam failure for a different TRP) may improve the dynamic operations of the system. The UE may dynamically update multiple beam pair links in multi-TRP (mTRP) operations to improve performance based on a detected beam failure of a beam link pair for one TRP.

In some examples, the UE may use separate uplink and downlink beam pair links for communications with the wireless network. The UE may detect beam failure for a downlink beam pair link (e.g., based on detecting a beam failure of a UE receive beam) and may determine a network transmit beam to indicate as a replacement beam for the downlink beam pair link (e.g., a downlink connection between the UE and a base station or other network entity). The UE may transmit a BFRQ in response to detecting the beam failure of the downlink connection, the BFRQ indicating a downlink network beam (e.g., a replacement network transmit beam) based on the beam failure of the downlink connection. The UE may additionally determine a replacement uplink network beam (e.g., a replacement network receive beam) for an uplink connection between the UE and the base station based on the indicated downlink network beam. For example, in one aspect, the UE may indicate the replacement uplink network beam in the BFRQ for an uplink connection between the UE and the base station, even if the UE did not detect a beam failure for that uplink connection. The UE may determine the replacement uplink network beam based on the replacement downlink network beam and one or more uplink/downlink beam pairs supported at the UE, the base station (e.g., the network entity), or both. For example, the UE may determine to replace the network receive beam for an uplink connection if the indicated replacement network transmit beam for the failed downlink connection does not support concurrent operation with the currently active network receive beam. In some cases, the UE may support an uplink/downlink UE beam configuration (e.g., a UE transmit beam and a UE receive beam) based on a permissible exposure threshold. For example, a permissible exposure threshold may be an example of a maximum permissible exposure (MPE) threshold, which may define an amount of signal exposure that the UE may experience at different areas of the UE (e.g., to reduce exposure of an operator of the UE to the signaling). The UE may receive, in response to the BFRQ, second signaling including a BFRR. In response to the BFRR, the UE and base station may update beam pair links, such that the base station may communicate using the downlink network beam and uplink network beam indicated in the BFRQ.

Techniques, systems, and devices described herein support the use of one BFRQ to request uplink and downlink network beam replacements in response to a beam failure detection for a downlink connection between a UE and a network entity (e.g., a base station or other network entity). The BFRQ requesting multiple network beam replacements may increase efficiency in resource utilization and reduce latency in requesting replacement network beams. That is, using the BFRQ to request both uplink and downlink network beams (e.g., a network receive beam and a network transmit beam) may allow a UE to maintain the compatibility of active uplink and downlink beam pair links and satisfy a permissible exposure threshold for the UE. Maintaining the compatibility between the beam pair links may improve communication reliability and provide more consistent connectivity. Using a single BFRQ (e.g., as compared to using multiple BFRQs) may reduce channel overhead and processing overhead for beam failure recovery procedures at the UE. Additionally, or alternatively, requesting uplink and downlink replacement network beams in the BFRQ without detecting a beam failure for an uplink connection may improve the dynamic operations of the system, because the UE may dynamically update multiple beam pair links to improve performance based on a detected beam failure for a downlink connection.

In some examples, the wireless network may configure the UE with multiple CCs. The UE may use the same or different beam pair links for communicating in different CCs. In some cases, specific CCs may be associated with one another. For example, a first CC may be associated with a second CC contiguous in frequency to the first CC. The association may indicate that a beam failure for the first CC may indicate a possible beam failure for the second CC. That is, due to the relative closeness of the first and second CCs in frequency, interference, blocking, or other factors negatively affecting a beam pair link in the first CC may be relatively likely to also negatively affect a beam pair link in the second CC. The UE may detect a beam failure for a first beam pair link used in a first CC and may transmit a BFRQ in response to detecting the beam failure for the first CC. In some examples, the BFRQ may indicate a first replacement network beam for the failed beam pair link used in the first CC based on the detected beam failure for the first CC. The UE may additionally determine a second network beam for a second beam pair link used in a second CC associated with the first CC (e.g., within a threshold frequency range from the first CC) and based on the beam failure for the first CC. In some cases, the BFRQ may further indicate the second network beam for the second CC. Alternatively, the BFRQ may indicate the first replacement network beam for the first CC, and the UE and the wireless network may store associations from the first network beam for the first CC to one or more additional network beams for one or more additional CCs. Accordingly, the UE and wireless network may determine additional replacement network beams for additional CCs based on the first network beam for the first CC indicated in the BFRQ. The UE may receive, in response to the BFRQ, a BFRR, and the UE and base station may update beam pair links based on the BFRR. The base station may communicate on the first CC using the first network beam and on the second CC using the second network beam based on the BFRR.

Techniques, systems, and devices described herein support the use of one BFRQ to request multiple network beam replacements for multiple CCs in response to detection of a beam failure for a single beam pair link used in a first CC. For example, based on the beam failure for the first CC, the UE may predict likely beam failure for one or more additional CCs associated with the one CC, which may increase efficiency in resource utilization and reduce latency in requesting replacement base station beams. That is, using the BFRQ to request replacement network beams for multiple respective CCs may allow a UE to maintain the compatibility of active beam pair links and reduce the quantity of beam failure recovery reference signals (BFR-RSs) monitored in associated CCs in order to detect beam failures. Using a single BFRQ (e.g., as compared to using multiple BFRQs) may reduce channel overhead and processing overhead for beam failure recovery procedures at the UE. Additionally, or alternatively, requesting multiple network beams in the BFRQ for multiple CCs without detecting multiple beam failures may improve the dynamic operations of the system. The UE may dynamically update multiple beam pair links to improve performance based on a detected beam failure for a first beam pair link in a first CC.

Aspects of the disclosure are initially described in the context of wireless communications systems and process flows. Aspects of the disclosure are further illustrated by and described with reference to apparatus diagrams, system diagrams, and flowcharts that relate to reporting multiple replacement beams in BFRQs.

FIG. 1 illustrates an example of a wireless communications system 100 that supports reporting multiple replacement beams in BFRQs in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network entity 105, entity of a core network 130, apparatus, device, or computing system configured to perform any techniques described herein. For example, a network node may be a UE 115. As another example, a network node may be a base station or other network entity 105. As another example, a first network node may be configured to communicate with a second network node or a third network node. In one aspect of this example, the first network node may be a UE 115, the second network node may be a base station, and the third network node may be a UE 115. In another aspect of this example, the first network node may be a UE 115, the second network node may be a base station, and the third network node may be a base station. In yet other aspects of this example, the first, second, and third network nodes may be different. Similarly, reference to a UE 115, a base station, a network entity 105, an apparatus, a device, or a computing system may include disclosure of the UE 115, base station, network entity 105, apparatus, device, or computing system being a network node. For example, disclosure that a UE 115 is configured to receive information from a network entity 105 also discloses that a first network node is configured to receive information from a second network node. In this example, consistent with this disclosure, the first network node may refer to a first UE 115, a first base station, a first network entity 105, a first apparatus, a first device, or a first computing system configured to receive the information; and the second network node may refer to a second UE 115, a second base station, a second network entity 105, a second apparatus, a second device, or a second computing system.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links. A UE 115 may communicate with the core network 130 through a communication link 155.

One or more of the network entities 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130.

User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a base station).

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations, may be implemented via additional or alternative wireless devices, including IAB nodes 104, distributed units (DUs) 165, centralized units (CUs) 160, radio units (RUs) 170, or any other network entities 105. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more network entities 105 may include CUs 160, DUs 165, and RUs 170 and may be referred to as donor base stations or IAB donors. One or more DUs 165 (e.g., and/or RUs 170) associated with a donor base station may be partially controlled by CUs 160 associated with the donor base station. The one or more donor base stations (e.g., IAB donors) may be in communication with one or more additional base stations (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of network entities 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a network entity 105 may additionally or alternatively be performed by components of the disaggregated RAN architecture (e.g., IAB nodes, DUs, CUs, etc.).

In some wireless communications systems 100, a UE 115 may establish a beam-formed connection for communications with a network entity 105. The network entity 105 may serve a primary cell (PCell), a secondary cell (SCell), or a primary and secondary cell (PSCell). In some examples, the UE 115 may monitor one or more channel metrics to determine whether a communication beam (e.g., a downlink beam, an uplink beam, or both) fails. For example, if a channel metric for a beam fails to satisfy a threshold, the UE 115 may detect a beam failure. In some examples, a beam failure may correspond to a failure of a beam pair (e.g., a pair including a UE beam and a network beam). For example, a beam pair may include a UE receive beam and a network transmit beam for downlink transmissions, or a beam pair may include a UE transmit beam and a network receive beam for uplink transmissions. The UE may detect failure of a beam pair link based on a failure of a UE beam, a network beam, or both. In some examples, the UE 115 may monitor for beam failure detection (BFD) reference signals (RSs) to determine whether a beam failure is detected. The UE 115 may detect beam failure if the channel quality for a currently active communication beam falls below a threshold (e.g., due to interference, blocking, UE mobility). Detecting a beam failure may trigger the UE 115 to transmit a BFRQ to the network entity 105 to indicate a new beam to replace the failed beam (e.g., a new network beam, a new UE beam, a new beam pair, or any combination thereof).

In some examples, the beam failure may occur on a PCell or PSCell, and the UE 115 may transmit the BFRQ to the network entity 105 (e.g., a base station or other network entity) servicing the PCell or PSCell in one or more contention-free random access (CFRA) resources. That is, the network may configure the UE 115 with UE-specific CFRA resources for transmitting a BFRQ. The UE 115 may select a new beam (e.g., a q_new beam, based on an NBI-RS received at the UE 115) and may indicate the new beam using the BFRQ. In some examples, the BFRQ may include a field indicating the new beam (e.g., a new beam index, a channel state information (CSI) RS index corresponding to the new beam, a synchronization signal block (SSB) index corresponding to the new beam). In some other examples, the BFRQ may be an example of a random access channel (RACH) message, and the RACH preamble for the BFRQ may indicate that the RACH message is a beam failure detection message, may indicate a new beam (e.g., q_new beam) for the UE 115, or both. Additionally, or alternatively, the resources on which the BFRQ is transmitted may indicate the new beam. For example, the UE 115 may indicate the new beam by transmitting the BFRQ using the new beam or a RACH beam associated with the new beam. Additionally, or alternatively, the network may configure the UE 115 with specific resources (e.g., time resources, frequency resources) to indicate different beams. For example, the UE 115 may transmit the BFRQ in a specific frequency resource, time resource, or some combination of these or other resources to indicate the new beam, and the network entity 105 receiving the BFRQ may determine the new beam based on the resources in which the BFRQ is received. The new beam may be an example of a communication beam at the UE 115, a communication beam at the network entity 105, a beam pair between the UE 115 and the network entity 105, or some combination thereof.

In response to the BFRQ, the network entity 105 may transmit a BFRR to the UE 115. The BFRR may indicate that the BFRQ was received and that the UE 115 and network entity 105 may switch to the indicated new beam for communications. The network entity 105 may transmit the BFRR as physical downlink control channel (PDCCH) signaling from a configured synchronization signal (SS) set using the new beam (e.g., a new downlink beam at the network entity 105, a new downlink beam at the UE 115, or both). In some examples, the UE 115 may monitor for the BFRR according to a delay from the BFRQ transmission. For example, the UE 115 may start monitoring the PDCCH four slots after sending the BFRQ (e.g., as a physical RACH (PRACH)). If the UE 115 receives the BFRR and the BFRR indicates a confirmation of the BFRQ and the new beam, the BFRR may trigger a beam reset procedure at the UE 115.

The beam reset procedure may involve the network entity 105 and UE 115 deactivating a first beam (e.g., the beam with the failure detected) and activating a second beam (e.g., the new beam indicated by the BFRQ). The UE 115, the network entity 105, or both may perform the beam reset procedure following a delay after the UE 115 receives the BFRR. For example, the UE 115 may trigger beam reset behavior twenty-eight symbols after receiving the last symbol of the BFRR. The UE 115 may reset the failed beam (e.g., a PDCCH CORESET 0 beam) to the new beam (e.g., q_new beam). Additionally, the UE 115 may reset the PUCCH spatial filter using the new beam (e.g., spatial parameters for q_new beam) and may reset power control parameters to configured parameters at the UE 115, default parameters at the UE 115, parameters corresponding to the new beam, or some combination thereof.

In some examples, the beam failure may occur on an SCell, and the UE 115 may transmit the BFRQ to the network entity 105 servicing a corresponding PCell. For example, if the UE 115 is connected with a PCell and one or more SCells for communications with a wireless network, and the UE 115 detects a beam failure for an SCell, the UE 115 may transmit the BFRQ to the PCell using a maintained connection (e.g., if beam failure is not detected for the PCell). Additionally, or alternatively, the UE 115 may transmit the BFRQ to an SCell if the SCell is configured to support physical uplink control channel (PUCCH) signaling.

For example, the UE 115 may transmit the BFRQ to a network entity 105 on a cell which supports beam failure recovery uplink signaling (e.g., BFRQs). In some examples, the UE 115 may transmit the BFRQ using a two-part procedure. In a first operation, the UE 115 may transmit a PUCCH scheduling request (SR) corresponding to a link recovery request (LRR) to the network entity 105 if the UE 115 does not currently have an uplink grant for a beam failure recovery MAC control element (CE). In a second operation, the UE 115 may transmit a beam failure recovery MAC-CE scheduled by an uplink grant (e.g., an uplink grant received in response to the LRR or received otherwise, such as a periodic uplink grant). The beam failure recovery MAC-CE may indicate an identifier (ID) of the SCell with the failed beam, may indicate a new beam (e.g., q_new beam) to replace the failed beam, may indicate a HARQ ID, or any combination thereof. The network entity 105 serving a cell that supports beam failure recovery uplink signaling may receive the MAC-CE and determine the BFRQ (e.g., the failed beam, the new beam) indicated by the MAC-CE.

In response to the BFRQ, the network entity 105 may transmit a BFRR to the UE 115. The network entity 105 serving the cell that supports beam failure recovery uplink signaling (e.g., a PCell, a PSCell, an SCell) may transmit an uplink grant scheduling a new transmission with the same HARQ ID as the beam failure recovery MAC-CE. The matching HARQ IDs may indicate that the uplink grant is a BFRR in response to the beam failure recovery MAC-CE. The UE 115 receiving the uplink grant may determine that the network entity 105 received the BFRQ and confirms a beam reset to the indicated new beam for communications. The uplink grant (e.g., the BFRR) may trigger a beam reset procedure at the UE 115.

The UE 115, the network entity 105, or both may perform the beam reset procedure following a delay after the UE 115 receives the BFRR. For example, the UE 115 may trigger beam reset behavior twenty-eight symbols after receiving the last symbol of the BFRR. The UE 115 may reset the failed beam (e.g., a PDCCH beam for CORESETs on the failed SCell) to the new beam (e.g., q_new beam). In some cases, the UE 115 may apply the new beam to multiple failed SCells. For example, the UE 115 may deactivate the failed beam and activate the new beam as part of the beam reset procedure. Additionally, the UE 115 may reset the PUCCH spatial filter using the new beam (e.g., spatial parameters for q_new beam) and may reset power control parameters to configured parameters at the UE 115, default parameters at the UE 115, parameters corresponding to the new beam, or some combination thereof. Additionally, or alternatively, the UE 115 may reset a subcarrier spacing (SCS) for the SCell based on the beam reset procedure. For example, the UE 115 may reset the SCS to a smallest SCS configuration (e.g., of twenty-eight symbols) of one or more active downlink BWPs for PDCCH reception, physical downlink shared channel (PDSCH) reception, or both for the SCell with the failed beam. Accordingly, the UE 115 and the network entity 105 may update beam-based connections to resolve detected beam failures and maintain communications between the UE 115 and the wireless network via the network entity 105.

In some wireless communications systems 100, the UE 115 may communicate with different TRPs using different beams (e.g., different beam pairs), communicate using different downlink and uplink beams (e.g., different downlink and uplink beam pairs), communicate using different beams (e.g., different beam pairs) in different CCs, or any combination thereof. If the UE 115 detects a single beam failure (e.g., for a first TRP, a first link direction, such as downlink, or a first CC), the UE 115 may determine a new beam to activate in place of the failed beam. The single beam failure may correspond to a failure of a beam pair link between the UE 115 and a network entity 105. Additionally, the UE 115 may determine one or more additional beams (e.g., for a different TRP, different link direction, or different CC than the failed beam) that are compatible with the determined new beam based on the single beam failure. The UE 115 may transmit a BFRQ to the wireless network (e.g., a network entity 105), the BFRQ indicating the new beam and the one or more additional beams. The UE 115 may receive, in response, a BFRR and may perform beam reset procedures to switch to using the new beam (e.g., a new beam pair) and at least one of the additional beams (e.g., additional beam pairs) for communicating with the wireless network. Accordingly, the UE 115 may update an active beam (e.g., an active beam pair link) in response to a beam failure detection while maintaining compatibility with other concurrently active beams (e.g., active beam pair links) at the UE 115. The UE 115 may perform such procedures using a communications manager 101, for example. Additionally, or alternatively, the wireless network may support such procedures using a communications manager 102 at a network entity 105, for example.

Figure 2:
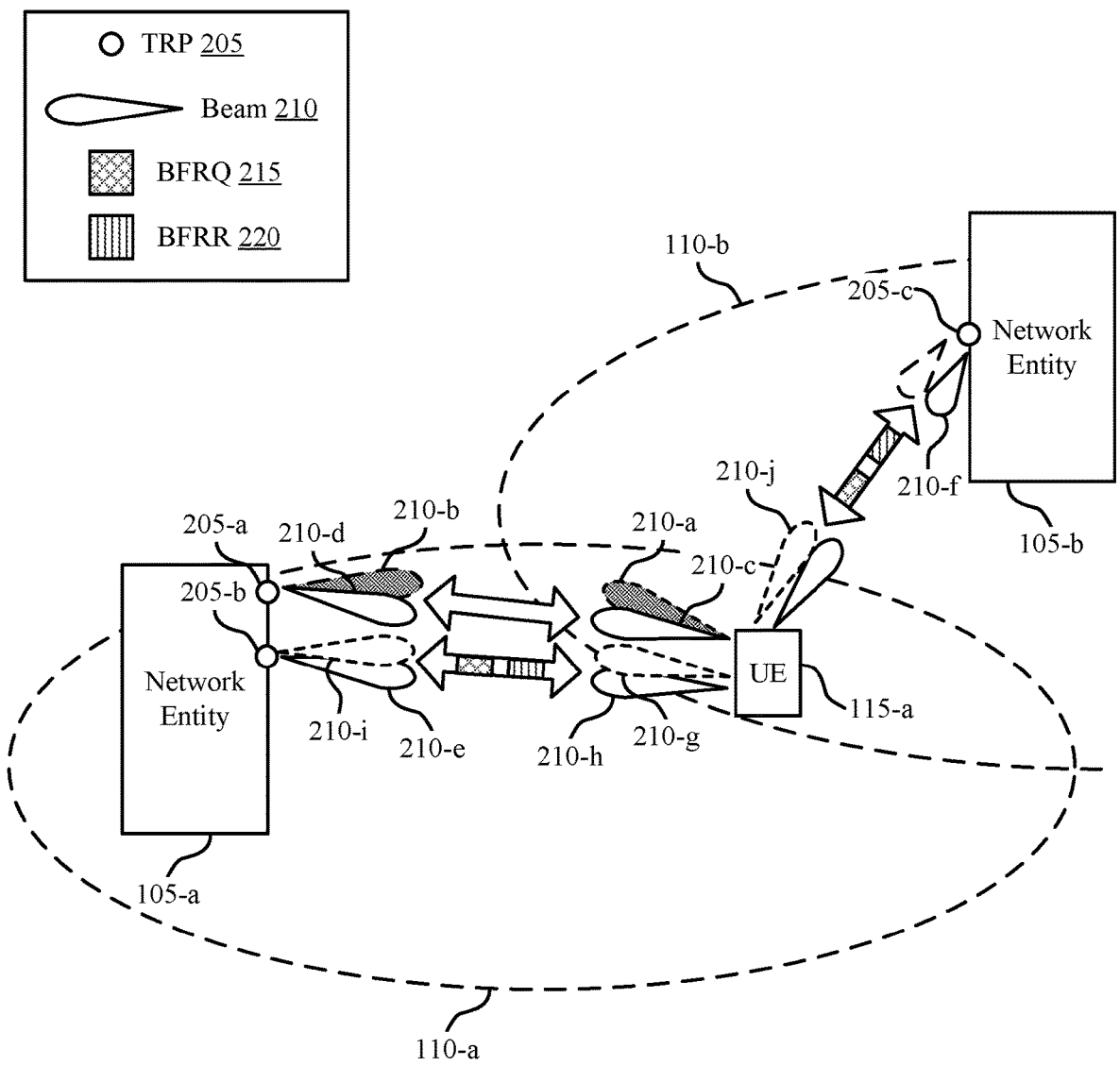

FIG. 2 illustrates an example of a wireless communications system 200 that supports reporting multiple replacement beams in BFRQs in accordance with one or more aspects of the present disclosure. The wireless communications system 200 may include a network entity 105-a, a network entity 105-b, and a UE 115-a, which may be examples of the corresponding devices described with reference to FIG. 1. The network entity 105-a may support a geographic coverage area 110-a, and the network entity 105-b may support a geographic coverage area 110-b. In some examples, the UE 115-a may support mTRP communications. For example, the UE 115-a may concurrently maintain beam-based connections with multiple TRPs 205, for example, at the same network entity 105 or across different network entities 105. In some cases, if the UE 115-a detects a beam failure for a first beam pair link (e.g., including a network beam 210-b and a UE beam 210-a) corresponding to a first TRP 205-a at the network-side, the UE 115-a may indicate a new beam 210 (e.g., a beam 210-d) for the first TRP 205-a. However, in some examples, due to supported TCI states or other information, the UE 115-a may further indicate a new beam 210 (e.g., a beam 210-e or a beam 210-f) for a second TRP 205 (e.g., a TRP 205-b or a TRP 205-c) based on the beam failure for the first TRP 205-a, for example, even if no beam failure is detected for the second TRP 205.

In some examples, different TRPs 205 may have specific dedicated BFD-RS sets and dedicated beam failure recovery processes. For example, the UE 115-a, the network entities 105, or both may support one-to-one associations between a BFD-RS set and a TRP 205. The UE 115-a may monitor for BFD-RSs from the multiple BFD-RS sets to detect whether a beam 210 fails for one or more of the TRPs 205. For example, if the signal quality for a BFD-RS falls below a threshold quality, the UE 115-a may determine that a quality for the corresponding beam 210 (e.g., the corresponding beam pair link) may also fall below a communication quality threshold. If a beam quality falls below a quality threshold, the beam 210 may be referred to as a "failed" beam (e.g., due to signal quality between the UE 115-*a* and the corresponding TRP 205 deteriorating below a signal quality threshold). As such, the UE 115-*a* may use the BFD-RSs to detect whether a beam 210 has failed.

If the UE 115-*a* detects a beam failure for a TRP 205 (e.g., a beam failure for a beam pair link between the UE 115-*a* and the TRP 205), some systems may support a two-part process for transmitting a BFRQ 215 (e.g., similar to beam failure recovery for an SCell, as described with reference to FIG. 1). For example, the UE 115-*a* may transmit a PUCCH-SR, a MAC-CE, or both to indicate the BFRQ 215. A network entity 105 may configure the UE 115-*a* with one or more (e.g., up to two, or some other threshold quantity) PUCCH-SRs to use for per-TRP 205 BFRQ 215. An association of a PUCCH-SR resource with a TRP 205 may be based on a capability of the UE 115-*a*. For example, if the UE 115-*a* fails to support such an association, the UE capability may support the UE 115-*a* selecting a PUCCH-SR resource with which to report a beam failure for a TRP 205. The PUCCH-SR may trigger a network entity 105 to provide resources for the UE 115-*a* to transmit a MAC-CE for the BFRQ 215. Using such resources, the UE 115-*a* may transmit a MAC-CE indicating the ID of the failed cell, an ID of the failed TRP 205, a new beam for resetting the connection with the TRP 205, or any combination thereof. Additionally, or alternatively, if a PUCCH-SR resource is not configured for requesting MAC-CE resources to indicate a BFRQ 215, the UE 115-*a* may use CFRA or contention-based random access (CBRA) to report a TRP-specific BFRQ 215. The network (e.g., via a network entity 105) may respond to the BFRQ 215 with a BFRR 220. In some examples, the BFRR 220 may be an example of an uplink grant scheduling a new transmission with the same HARQ ID as the beam failure recovery MAC-CE, or the BFRR 220 may be an example of a PDCCH in a configured SS set if the BFRQ 215 is transmitted using CFRA procedures. However, such systems may support indicating a single new beam (e.g., corresponding to a single new beam pair link) in a beam failure recovery MAC-CE, which may introduce inefficiencies into the systems. For example, the UE 115-*a* may increase channel overhead and processing overhead due to transmitting multiple BFRQs 215 to indicate multiple new beams 210 (e.g., in response to multiple beam failures or in response to a single beam failure that may affect multiple TRPs 205).

The wireless communications system 200 may support the UE 115-*a* reporting multiple new beams in a single BFRQ 215 (e.g., in response to detecting a single beam failure for a single TRP 205). In some examples, the UE 115-*a* may indicate multiple beams 210 in the BFRQ 215 using multiple CSI-RS indexes, multiple SSB indexes, multiple beam indexes, or some combination thereof. For example, a reported CSI-RS index may correspond to a specific new beam (e.g., the beam used to receive the corresponding CSI-RS) or a reported SSB index may correspond to a specific new beam (e.g., the beam used to receive the corresponding SSB). If the UE 115-*a* receives a BFRR 220 in response to a BFRQ 215 indicating multiple new beams 210, the UE 115-*a* may autonomously reset multiple beams 210 (e.g., deactivating one or more currently active beams 210 and activating one or more new beams indicated in the BFRQ 215). For example, the UE 115-*a* may reset multiple beam pair links based on detecting a beam failure for a single beam pair link.

If the UE 115-*a* communicates with the wireless network according to an mTRP configuration, the UE 115-*a* may support specific sets of beams 210 for concurrent connection with the wireless network. The wireless network may configure the UE 115-*a* with a set of TCI state codepoints, where each TCI state codepoint corresponds to multiple TCI states (e.g., a pair of TCI states) supported for concurrent use at the UE 115-*a*. A TCI state may correspond to a specific TRP 205; for example, the UE 115-*a* may apply a first TCI state to communications with a first TRP 205-*a* and may apply a second TCI state to communications with a second TRP 205-*b*. The first TRP 205-*a* and the second TRP 205-*b* may correspond to a same device in the wireless network (e.g., a same network entity 105-*a*) or the first TRP 205-*a* and the second TRP 205-*c* may correspond to different devices in the wireless network (e.g., a network entity 105-*a* and a network entity 105-*b*, respectively). The configuration of the TCI codepoints may be based on which beams 210 may be concurrently used by the UE 115-*a*. For example, the network may configure the UE 115-*a* with TCI codepoints that correspond to beams 210 for different TRPs 205 that can be concurrently received by the UE 115-*a* if the UE 115-*a* is operating in an SDM scheme, and the network may refrain from configuring the UE 115-*a* with TCI codepoints that correspond to beams 210 for different TRPs 205 that do not support concurrent reception at the UE 115-*a* for the SDM scheme. Support for concurrent reception between beams 210 may depend on one or more capabilities of the UE 115-*a*, one or more channel realizations, the communication scheme of the UE 115-*a* (e.g., SDM, FDM, TDM), or a combination thereof. A channel realization may indicate any combination of parameters or metrics associated with a channel (e.g., channel quality, spatial metrics, or other channel information). In some examples, the UE 115-*a* may report, to the network, a list of beams (e.g., UE beams, network beams, beam pair links, or some combination thereof) supported by the UE 115-*a* (e.g., for SDM operations) in a UE capability message, a beam report (e.g., an enhanced group beam report), or some other signaling.

In some cases, depending on the schemes supported by the UE 115-*a* for receiving from multiple TRPs 205, the UE 115-*a* may support a subset of beam combinations between the TRPs 205. For example, the UE 115-*a* may support a beam combination of the beam 210-*a* for communicating with the first TRP 205-*a* and the beam 210-*g* for communicating with the second TRP 205-*b*, but the UE 115-*a* may fail to support a beam combination of the beam 210-*c* for communicating with the first TRP 205-*a* and the beam 210-*g* for communicating with the second TRP 205-*b*. Accordingly, if the UE 115-*a* determines to switch from the beam 210-*a* to the beam 210-*c* for communicating with the first TRP 205-*a* (e.g., in response to detecting a beam failure for the beam 210-*a*, the beam 210-*b*, or the beam pair link corresponding to the beam 210-*a* and the beam 210-*b*), the UE 115-*a* may determine to also switch from the beam 210-*g* to the beam 210-*h* for communicating with the second TRP 205-*b* (e.g., if the UE 115-*a* supports the beam combination of the beam 210-*c* and the beam 210-*h*) based on the supported beam combinations. For example, even if a beam failure is not detected for the beam 210-*g*, the UE 115-*a* may determine to switch from the beam 210-*g* to the beam 210-*h* for the second TRP 205-*b* based on the detected beam failure for the first TRP 205-*a* and based on the supported beam configurations (e.g., UE beam configurations) for the UE 115-*a*.

The UE 115-*a* may detect a beam failure for the beam pair link (e.g., including the beam 210-*a* and the beam 210-*b*) used for communicating with the first TRP 205-*a*. The UE 115-*a* may select a new beam 210-*c*, a new beam 210-*d*, or a new beam pair link including the new beam 210-*c* and the new beam 210-*d* for communicating with the first TRP 205-*a* (e.g., based on receiving an NBI-RS associated with the new beam 210-*c*, the new beam 210-*d*, or both that satisfies a criteria, such as having the greatest signal strength of the received NBI-RSs for the first TRP 205-*a*). The UE 115-*a* may report the selected new beam 210-*c*, the selected new beam 210-*d*, or the selected new beam pair link to the network using a BFRQ 215. Additionally, based on the subset of beam configurations supported by the UE 115-*a* for different TRPs 205, the UE 115-*a* may also report one or more additional beams 210 for communicating with another TRP 205 that can be paired with the selected new beam 210. For example, the UE 115-*a* may select one additional beam to report (e.g., a beam with a greatest signal strength of the received NBI-RSs for a second TRP 205-*b*) that can be used with the selected new beam, or the UE 115-*a* may report multiple beams 210 for the second TRP 205-*b* that can be used with the selected new beam 210 for the first TRP 205-*a*. The BFRQ 215 may include indications of the multiple beams 210. In some examples, the BFRQ 215 may further include indicated associations between the selected beams 210 and the corresponding TRPs 205. For example, the BFRQ 215 may include a field (e.g., a beam index field, a CSI-RS index field) indicating the new beam 210-*d* for the failed TRP 205-*a* and may include a field (e.g., a beam index field, a CSI-RS index field) indicating a new beam 210-*e* for an additional TRP 205-*b* (e.g., a TRP 205 that did not fail). In this way, the UE 115-*a* may ensure that switching to the new beam 210-*d* for the failed TRP 205-*a* does not cause a disruption of communications with the second TRP 205-*b*, for example, if the currently active beam 210-*i* for the second TRP 205-*b* is incompatible with the new beam 210-*d* for the first TRP 205-*a* (e.g., for SDM operations or other operations). In some cases, such techniques may be used if the UE 115-*a* is operating using single-downlink control information (s-DCI) mTRP, in which one TRP 205 is used by the UE 115-*a* for receiving DCI.

The UE 115-*a* may transmit the BFRQ 215 to the network, for example, via the second TRP 205-*b*. If the second TRP 205-*b* does not fail, the UE 115-*a* may maintain a connection with the network via the second TRP 205-*b* (e.g., even if a beam failure is detected for the first TRP 205-*a*) and may use the maintained connection for transmitting the BFRQ 215 indicating multiple new beams 210 for multiple TRPs 205. The network (e.g., a network entity 105-*a*) may receive the BFRQ 215, may determine the requested new beams 210 based on the information indicated in the BFRQ 215, and may respond with a BFRR 220 to the UE 115-*a* confirming switching to the indicated new beams 210. In some examples, if the BFRQ 215 indicates multiple options for a new beam for the second TRP 205-*b*, the BFRR 220 may indicate a selection of a new beam 210 for the second TRP 205-*b*. The UE 115-*a* may switch to communicating using the indicated new beams 210 in response to the BFRR 220. For example, the UE 115-*a* may apply a reported beam after a delay (e.g., twenty-eight symbols) from receiving the BFRR 220. Applying the reported beam may involve the UE 115-*a* deactivating a previous beam pair (e.g., the beam 210-*a* and the beam 210-*b*) and activating a new beam pair (e.g., the beam 210-*c* and the beam 210-*d*) in a CC associated with the beam failure event or in a set of CCs that are configured within a common TCI state configuration of the failed CC. Because the BFRQ 215, the BFRR 220, or both indicate multiple beams (e.g., corresponding to multiple beam pairs), the UE 115-*a* may additionally deactivating another beam pair (e.g., the beam 210-*g* and the beam 210-*i*) and additionally activate another beam pair (e.g., the beam 210-*h* and the beam 210-*e*). The UE 115-*a* may use the activated beams 210 to communicate with multiple TRPs 205 of the network. Accordingly, the UE 115-*a* may switch away from a failed beam 210-*a* to a working beam 210-*c* (e.g., from a failed beam pair to a working beam pair) and may ensure that other active beams 210 corresponding to other TRPs 205 are compatible with the new working beam 210-*c*.

As illustrated in FIG. 2, the first TRP 205-*a* and the second TRP 205 may be located at a same device in the wireless network (e.g., a same network entity 105-*a*) or at different devices in the wireless network (e.g., a first network entity 105-*a* and a second network entity 105-*b*). For example, the UE 115-*a* may communicate with a first TRP 205-*a* at a first network entity 105-*a* using a first beam 210-*a* and with a second TRP 205-*c* at a second network entity 105-*b* using a second beam 210-*j*. If the UE 115-*a* detects a beam failure for the first beam 210-*a*, the UE 115-*a* may determine a new beam 210-*d* for the first TRP 205-*a* and may determine a corresponding new beam 210-*f* compatible with the new beam 210-*d* for the second TRP 205-*c*. The UE 115-*a* may indicate the determined new beam 210-*d* and the determined new beam 210-*f* in a BFRQ 215 (e.g., transmitted to the second network entity 105-*b*).

FIG. 3 illustrates an example of a wireless communications system 300 that supports reporting multiple replacement beams in BFRQs in accordance with one or more aspects of the present disclosure. The wireless communications system 300 may include a network entity 105-*c* and a UE 115-*b*, which may be examples of the corresponding devices described with reference to FIGS. 1 and 2. The network entity 105-*c* may support a geographic coverage area 110-*c*. In some examples, the UE 115-*b* may support separate uplink and downlink TCI states. For example, the UE 115-*b* may concurrently use a downlink-specific beam corresponding to a first TCI state for receiving downlink signaling and an uplink-specific beam corresponding to a second TCI state for transmitting uplink signaling. In some cases, if the UE 115-*b* detects a beam failure for a downlink beam pair, the UE 115-*b* may indicate a new downlink beam (e.g., a downlink network beam, a downlink UE beam, or a downlink beam pair). However, in some examples, due to supported TCI states for uplink and downlink beam pairs, the UE 115-*b* may further indicate a new uplink beam (e.g., an uplink network beam, an uplink UE beam, or an uplink UE beam pair) based on the beam failure for the downlink beam pair, for example, even if no beam failure is detected for an uplink beam pair.

A UE 115-*b* may support one or more modes for communicating using TCI states. In some examples, the UE 115-*b* may communicate with a network entity 105-*c* using a joint downlink and uplink TCI state. The UE 115-*b* may use a single TCI for uplink and downlink communications and—correspondingly—may use a same communication beam 305 for uplink and downlink. However, in some other examples, the UE 115-*b* may communicate with the network entity 105-*c* using separate downlink and uplink TCI states and—correspondingly—a separate downlink beam pair corresponding to the downlink TCI state and uplink beam pair corresponding to the uplink TCI state. The UE 115-*b* may support some combinations of uplink and downlink TCI states and may fail to support other combinations of uplink and downlink TCI states. Specifically, if the UE 115-*b* includes a permissible exposure threshold (e.g., an MPE value), the UE 115-*b* may support specific combinations of uplink and downlink beams or beam pairs to satisfy (e.g., remain below) the permissible exposure threshold.

The UE 115-*b* may monitor downlink channel metrics to determine whether a downlink beam pair fails. For example, the UE 115-*b* may monitor BFD-RSs for CORESET beams corresponding to downlink communications to detect whether a downlink beam pair fails (e.g., falls below a quality threshold). In some cases, however, the UE 115-*b* may refrain from monitoring for uplink beam pair failures (e.g., due to not supporting reception of RSs on uplink beams). If the UE 115-*b* detects a downlink beam pair failure, the uplink beam pair may or may not also fail. In some cases, an active downlink beam pair (e.g., including a beam 305-*a* and a beam 305-*b*) may fail, while an active uplink beam pair (e.g., including a beam 305-*e* and a beam 305-*f*) may maintain a connection with the wireless network. However, the active uplink beam pair may not be compatible with a new downlink beam or beam pair (e.g., including a beam 305-*c* and a beam 305-*d*) selected to replace the failed downlink beam pair. For example, due to an MPE threshold, the new downlink beam or beam pair may not be usable for uplink communications, and the first uplink beam pair may or may not be compatible with the new downlink beam or beam pair. To ensure compatibility between active uplink and downlink beams pairs at the UE 115-*b*, the UE 115-*b* may determine one or more new uplink beams or new uplink beam pairs (e.g., including a beam 305-*g* and a beam 305-*h*) based on detecting the failure of the downlink beam pair and based on determining a new downlink beam or beam pair (e.g., the beam 305-*d*, the beam 305-*c*, or the beam pair including the beam 305-*c* and the beam 305-*d*).

In response to detecting a downlink beam failure, the UE 115-*b* may report at least a new downlink beam 305-*d* and an uplink beam 305-*h* as replacement beams in a BFRQ 310 (e.g., a MAC-CE, a RACH message). For example, the UE 115-*b* may report the requested uplink beam 305-*h* (e.g., using a beam index, a CSI-RS index) despite the UE 115-*b* not detecting an uplink beam failure (e.g., based on refraining from monitoring for uplink beam failure). The network entity 105-*c* may receive the BFRQ 310 and may determine the new downlink beam 305-*d* and uplink beam 305-*h* based on the indications in the BFRQ 310. The network entity 105-*c* may respond to the BFRQ 310 with a BFRR 315. The UE 115-*b* may receive the BFRR 315 and perform a beam reset procedure. For example, after a delay (e.g., twenty-eight symbols) following reception of the BFRR 315, the UE 115-*b* may apply the reported beam configuration (e.g., the downlink beam 305-*d* and the uplink beam 305-*h*) for communications with the network entity 105-*c*. In some examples, the beam reset procedure may involve the UE 115-*b* resetting the downlink beam 305-*d* for dedicated PDCCH communications, PDSCH communications, or both. Additionally, or alternatively, the beam reset procedure may involve the UE 115-*b* resetting the uplink beam 305-*h* for dedicated PUCCH communications, PUSCH communications, or both. Additionally, the beam reset procedure may take place in a CC associated with the beam failure event or in a set of CCs that are configured within a common TCI state configuration of the failed CC. In a common TCI state configuration, the multiple involved CCs may share the same TCI state pool as well as the same TCI state update/activation signaling.

Using such techniques, the UE 115-*b* may reset a downlink beam pair and maintain compatibility with a concurrently active uplink beam pair based on downlink beam failure detection. Such techniques may allow the UE 115-*b* to determine uplink and downlink beam configurations in order to meet MPE thresholds affected by uplink TCI states, downlink TCI states, or both.

Figure 4:
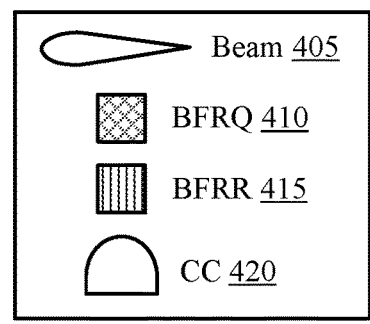

FIG. 4 illustrates an example of a wireless communications system 400 that supports reporting multiple replacement beams in BFRQs in accordance with one or more aspects of the present disclosure. The wireless communications system 400 may include a network entity 105-*d* and a UE 115-*c*, which may be examples of the corresponding devices described with reference to FIGS. 1 through 3. The network entity 105-*d* may support a geographic coverage area 110-*d*. In some examples, the UE 115-*c* may support different beams 405 for different CCs 420, for example, based on beam squint effects. However, beam failure in a first CC 420-*a* may indicate potential beam failure in an associated CC 420-*b* (e.g., a CC 420-*b* contiguous in frequency to the first CC 420-*a*). To support improved beam failure indication, the UE 115-*c* may indicate multiple beams 405 in a BFRQ 410 in response to detecting a beam failure in a first CC 420-*a*.

The network entity 105-*d* may configure the UE 115-*c* with multiple CCs 420 in a frequency range (e.g., frequency range 4 (FR4) or another frequency range). Some frequency ranges may support different bandwidth parameters. For example, a UE 115-*c* operating in a relatively higher frequency range (e.g., FR4) may support relatively larger bandwidths than other frequencies. Additionally, the UE 115-*c* may be configured with multiple CCs 420 (e.g., in adjacent frequencies) within the frequency range, such as a first CC 420-*a*, a second CC 420-*b*, and a third CC 420-*c*.

In some frequency ranges, beams 405 may experience beam squint effects. For example, applying the same beamforming vector (e.g., beamforming configuration, which may be based on a corresponding TCI state) across different frequencies may result in different beam shapes and different beam angles. Accordingly, in different frequencies (e.g., CCs 420 or frequency ranges), the beam 405 with the greatest channel or signal quality metrics may be different. Beam squint may occur if the UE 115-*c* is performing beamforming in a relatively wideband frequency (e.g., in FR4) using a relatively large antenna array for a corresponding aperture size, which may cause each individual beam to cover a relatively narrower area and—correspondingly—be relatively more directional (e.g., provide strong coverage for a specific direction, rather than provide relatively weaker coverage for a relatively wider range of directions). This may be referred to as "beam squint." For such relatively narrow beams, the angles of the beams may be slightly different in different sub-bands (e.g., corresponding to different CCs 420). As such, the UE 115-*c* may determine to communicate using different beams 405 in different CCs 420 corresponding to different sub-bands to improve the connection quality for the different CCs 420.

If the UE 115-*c* detects a beam failure in a first CC 420-*a*, the UE 115-*c* may determine that associated CCs 420 (e.g., CCs 420 adjacent in frequency, CCs 420 within a threshold frequency range from the first CC 420-*a*) may also be affected. For example, the UE 115-*c* may communicate with the network entity 105-*d* using a first beam 405-*a* in a first CC 420-*a* and may communicate with the network entity 105-*d* using a second beam 405-*b* in a second CC 420-*b*. The first beam 405-*a* corresponding to the first CC 420-*a* and the second beam 405-*b* corresponding to the second CC 420-*b* may be examples of "squinted" beams. For example, based on beam squint effects, the first beam 405-*a* (e.g., a first "squinted" beam) and the second beam 405-*b* (e.g., a second "squinted" beam) may be relatively more directional than other beams (e.g., relatively wider beams in different frequency ranges, such as a beam 405-*g*). The first CC 420-*a* and the second CC 420-*b* may be associated based on the first CC 420-*a* being within a threshold frequency range from the second CC 420-*b*. However, a third CC 420-*c* may not be associated with the first CC 420-*a* based on the third CC 420-*c* not being within the threshold frequency range of the first CC 420-*a*. The UE 115-*c* may determine that a cause for the beam failure at the first CC 420-*a*, such as beam blockage, interference, or the like, may similarly affect the one or more associated CCs 420 due to the relative proximity of the associated CCs 420 in frequency. Accordingly, the UE 115-*c* may determine to perform beam failure recovery for the associated CCs 420 in addition to the CC 420-*a* in which the beam failure was detected.

In some cases, the UE 115-*c* may store a CC list indicate the associations between CCs 420. For example, the list may include CC IDs and sets of CC IDs associated with the respective CC IDs. If a beam failure is detected for a first CC 420-*a*, the UE 115-*c* may reference the stored CC list to determine which other CCs 420 are associated with the CC 420-*a* (e.g., based on which set of CC IDs is associated with the CC ID for the CC 420-*a*).

The UE 115-*c* may generate a BFRQ 410 in response to detecting the beam failure for the first CC 420-*a*. The generated BFRQ 410 may further indicate beam failure recovery for the CCs 420 associated with the first CC 420-*a* (e.g., from the list). However, the UE 115-*c* may determine different beams 405 for the associated CCs 420, for example, due to beam squint affects (e.g., due to the relatively narrow beams corresponding to different beam directions). That is, if the UE 115-*c* uses a relatively coarse (e.g., wide) beam 405, the beam 405 may provide coverage for multiple CCs 420. In contrast, if the UE 115-*c* uses relatively narrow beams 405, the beams 405 may provide coverage for specific CCs 420. That is, the UE 115-*c* may select different beams 405 for communications in different CCs 420 based on the different beam directions. As such, the UE 115-*c* may determine a first beam 405-*c* to replace the beam 405-*a* for the first CC 420-*a* and may determine a second beam 405-*d* to replace the beam 405-*b* for the second CC 420-*b*.

In some examples, the UE 115-*c* may report multiple new beams 405 (e.g., q_new beams) in the BFRQ 410. For example, the BFRQ 410 may include an indication of the first beam 405-*c* and the second beam 405-*d* (or, similarly, a first beam 405-*e* and a second beam 405-*f*), as well as applicable CCs 420, BWPs, or both corresponding to the multiple beams 405. In some cases, the BFRQ 410 may include a field indicating a first beam 405 (e.g., the field indicating the beam index) and a field indicating a set of CCs 420, BWPs, or both applicable to the first beam 405 (e.g., for which the UE 115-*c*, the network entity 105-*d*, or both may activate the first beam 405). Accordingly, the UE 115-*c* may indicate multiple replacement beams 405 and the corresponding CCs 420 for the replacement beams 405 in a single BFRQ 410 in response to a single detected beam failure for a CC 420, such as the first CC 420-*a*. The network entity 105-*d* may receive the BFRQ 410, determine the indicated replacement beams 405 and corresponding CCs 420, and transmit a BFRR 415 in response. The UE 115-*c* may receive the BFRR 415 and reset the beams for the associated CCs 420 in response to receiving the BFRR 415 (e.g., after a delay, such as twenty-eight symbols).

Alternatively, in some other examples, the UE 115-*c* may report a single new beam 405 in the BFRQ 410. For example, the UE 115-*c* may detect a beam failure for the first CC 420-*a* and may determine a new beam 405 for the first CC 420-*a* (e.g., the beam 405-*e*, the beam 405-*c*, or the beam pair including the beam 405-*e* and the beam 405-*c*). The UE 115-*c* may transmit the BFRQ 410 indicating the beam failure for the first CC 420-*a* and the first new beam 405. In some cases, beam squint effects may be predictable. For example, the UE 115-*c* and the network entity 105-*d* may predict how different beams 405 in different CCs 420 are associated. Accordingly, the network entity 105-*d* may configure a table, a rule, a heuristic, or some other method for deriving beams 405 for associated CCs 420 based on an indicated beam 405 (e.g., using the beam index) for a first CC 420-*a*. Using such methods, the network entity 105-*d* may receive the BFRQ 410 indicating the beam 405 for the CC 420-*a* and may derive one or more additional beams 405 for one or more associated CCs 420. The relevant CC 420-*a* for the BFRQ 410 may be indicated in the BFRQ 410 (e.g., in the MAC-CE) or may be determined based on network entity signaling, a configured rule, or some other parameter. The network entity 105-*d* may derive the beam 405-*f*, the beam 405-*d*, or the beam pair including the beam 405-*f* and the beam 405-*d* for the associated CC 420-*b* using the indicated beam 405 for the CC 420-*a*. The network entity 105-*d* may configure the UE 115-*c* with the same table, rule, heuristic, or other method to ensure coordination between the UE 115-*c* and the network entity 105-*d*. The network entity 105-*d* may transmit a BFRR 415 to the UE 115-*c* in response to the BFRQ 410 that indicates one new beam 405 (e.g., the beam 405-*e*, the beam 405-*c*, or the beam pair including the beam 405-*e* and the beam 405-*c*), and the UE 115-*c* may perform beam reset procedures for multiple beams 405 in response to the BFRR 415 using the information (e.g., table, rule, heuristic) to derive the additional beams 405 for the associated CCs 420, such as the beam 405-*f*, the beam 405-*d*, or the beam pair including the beam 405-*f* and the beam 405-*d* for the associated CC 420-*b*.

Figure 5:
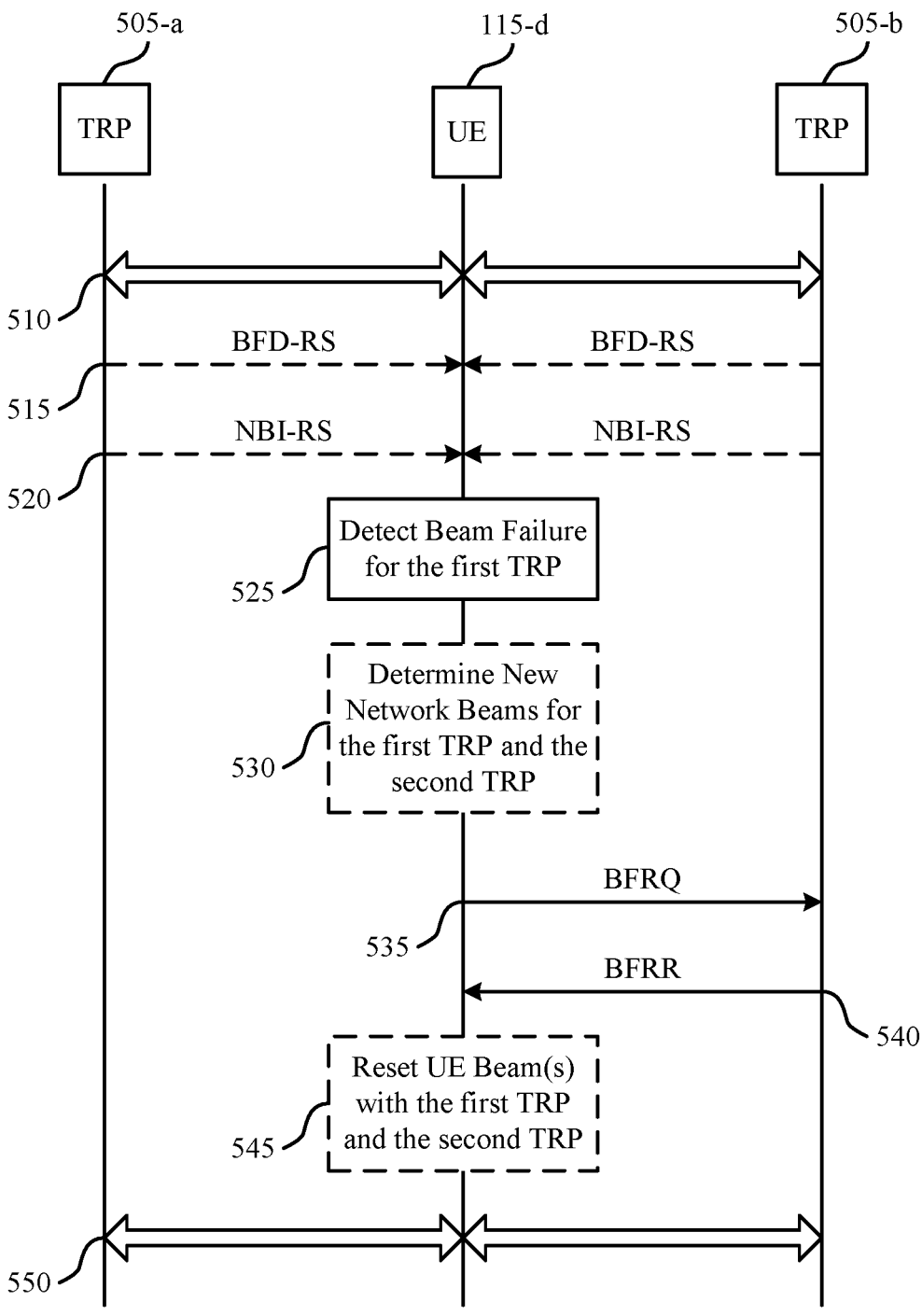
FIGS. 5 through 7 illustrate examples of process flows that support reporting multiple replacement beams in BFRQs in accordance with one or more aspects of the present disclosure.

FIG. 5 illustrates an example of a process flow 500 that supports reporting multiple replacement beams in BFRQs in accordance with one or more aspects of the present disclosure. The process flow 500 may include a UE 115-*d* and multiple TRPs, which may be examples of a UE 115 and TRPs described with reference to FIGS. 1 through 4. The TRP 505-*a* and the TRP 505-*b* may be associated with a device of a wireless network. For example, the TRP 505-*a* and the TRP 505-*b* may be located at a same network entity 105 or may be located at different network entities 105. The UE 115-*d* may support mTRP communications, such that the UE 115-*d* may concurrently communicate with the TRP 505-*a* using a first beam pair (e.g., an uplink beam pair, a downlink beam pair, or a combination thereof) and with the TRP 505-*b* using a second beam pair (e.g., an uplink beam pair, a downlink beam pair, or a combination thereof). The UE 115-*d* may support reporting multiple replacement beams for multiple TRPs based on detection of a beam failure for a single TRP. Alternative examples of the following may be performed, where some processes are performed in a different order than described or are not performed at all. In some examples, processes may include additional features not mentioned below, or further processes may be added.

At 510, the UE 115-*d* may communicate with multiple TRPs, such as the TRP 505-*a* and the TRP 505-*b*. The UE 115-*d* may communicate with the TRP 505-*a* using a beam pair corresponding to a first TCI state and may communicate with the TRP 505-*b* using a beam pair corresponding to a second TCI state. The UE 115-*d* may support these beams as a UE beam configuration based on supporting the first TCI state and the second TCI state together (e.g., according to a TCI state codepoint). For example, the UE 115-*d* may store a list of TCI state codepoints supported by the UE 115-*d*, where the list includes TCI states corresponding to beam configurations or combinations that the UE 115-*d* may use for concurrent reception in an SDM scheme. In some cases, the UE 115-*d* may transmit signaling to the wireless network indicating beam configurations supported by the UE 115-*d*.

At 515, the UE 115-*d* may monitor for BFD-RSs from the TRP 505-*a*, the TRP 505-*b*, or both. For example, the UE 115-*d* may receive a BFD-RS corresponding to a currently active beam pair and may measure a channel metric (e.g., a received signal strength indicator (RSSI), a reference signal received power (RSRP), a signal-to-noise ratio (SNR), or another channel metric) associated with the BFD-RS. If the channel metric for the BFD-RS fails to satisfy a threshold, the UE 115-*d* may determine a beam failure for the beam pair link corresponding to the BFD-RS. The UE 115-*d* may detect a beam failure using the BFD-RSs.

At 520, the UE 115-*d* may monitor for NBI-RSs from the TRP 505-*a*, the TRP 505-*b*, or both. For example, the UE 115-*d* may receive NBI-RSs corresponding to respective beams and may measure channel metrics for the NBI-RSs. If the UE 115-*d* detects a beam failure for a TRP, the UE 115-*d* may use the channel metrics for the received NBI-RSs to determine a replacement beam or beam pair for the failed beam pair link. For example, the UE 115-*d* may select a beam for the TRP corresponding to an NBI-RS with a greatest signal metric of the received NBI-RSs.

At 525, the UE 115-*d* may detect a beam failure for the TRP 505-*a*, for example, based on a BFD-RS received at 515. At 530, the UE 115-*d* may determine a new beam for the TRP 505-*a* based on an NBI-RS received at 520. Additionally, the UE 115-*d* may determine a new beam for the TRP 505-*b*, for example, even if the UE 115-*d* did not detect a beam failure for the TRP 505-*b*. The UE 115-*d* may determine the new beam for the TRP 505-*b* based on an NBI-RS received at 520 and a TCI state codepoint stored at the UE 115-*d* that supports a beam configuration including the new beam for the TRP 505-*a* and the new beam for the TRP 505-*b*.

At 535, the UE 115-*d* may transmit a first signal including a BFRQ in response to detecting the beam failure for the TRP 505-*a*. The BFRQ may indicate a first network beam for the TRP 505-*a* based on the beam failure for the TRP 505-*a*. Additionally, the BFRQ may indicate a second network beam for the TRP 505-*b* based on the first network beam and a UE beam configuration supported by the UE 115-*d* (e.g., according to a TCI state codepoint supported at the UE 115-*d*). For example, the UE beam configuration may indicate one or more UE beams that the UE 115-*d* supports using concurrently corresponding to the first network beam and the second network beam. In some examples, the UE 115-*d* may transmit the BFRQ to the TRP 505-*b*, for example, based on the UE 115-*d* maintaining a beam-based connection with the TRP 505-*b* concurrent to detecting the beam failure for the TRP 505-*a* and concurrent to transmitting the first signaling including the BFRQ. A device in the wireless network including the TRP 505-*b* may receive the BFRQ indicating the multiple beams.

At 540, the device in the wireless network may respond to the BFRQ with a BFRR. The device may transmit a BFRR to the UE 115-*d* to confirm reception of the BFRQ and to confirm resetting the beams to the beams indicated in the BFRQ. The UE 115-*d* may receive, in response to the BFRQ, a second signal including the BFRR.

At 545, the UE 115-*d* may reset beams with the TRP 505-*a* and the TRP 505-*b* in response to the BFRR. For example, the UE 115-*d* may deactivate beams previously used for communicating with the TRP 505-*a* and the TRP 505-*b* and may activate one or more UE beams corresponding to the first network beam and the second network beam indicated in the BFRQ. For example, the UE 115-*d* may activate one UE beam corresponding to both the first and second network beams, or the UE 115-*d* may activate a first UE beam corresponding to the first network beam and may activate a second UE beam corresponding to the second network beam. The UE 115-*d* may reset the beams following a delay after receiving the BFRR. For example, the UE 115-*d* may initiate a timer in response to receiving the second signaling including the BFRR to apply the delay. The UE 115-*d* may activate the beams (e.g., the one or more UE beams for the TRP 505-*a* and the TRP 505-*b*) based on an expiration of the timer.

At 550, the UE 115-*d* may communicate with the TRP 505-*a* and the TRP 505-*b* using the one or more UE beams based on the BFRR (e.g., based on resetting the beams in response to the BFRR). The communicating may involve the UE 115-*d* receiving, via a transceiver, a downlink signal from the TRP 505-*a* using the first beam, from the TRP 505-*b* using the second beam, or both. Additionally, or alternatively, the communicating may involve the UE 115-*d* transmitting, via a transceiver, an uplink signal to the TRP 505-*a* using the first beam, to the TRP 505-*b* using the second beam, or both.

Figure 6:
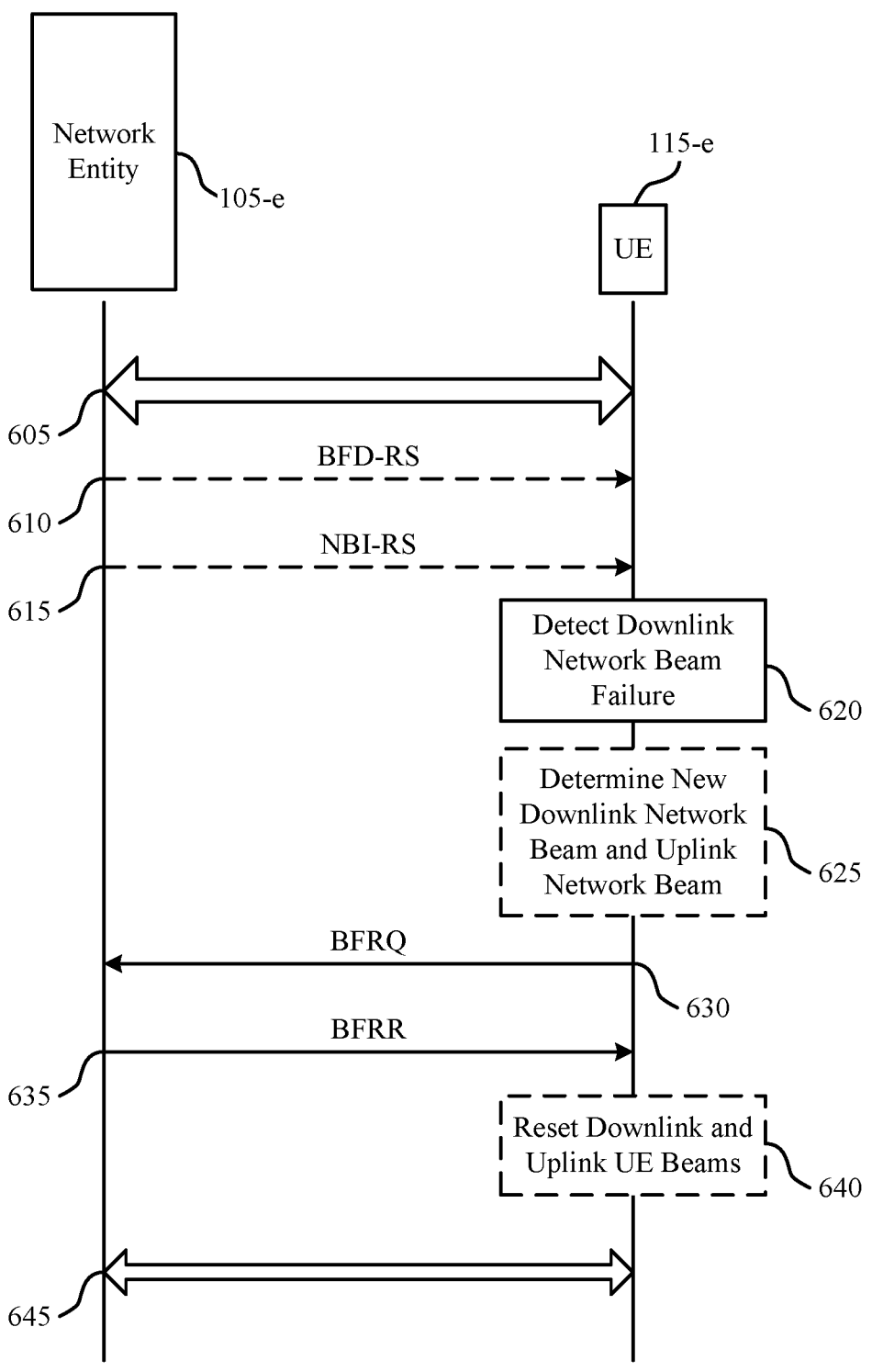

FIG. 6 illustrates an example of a process flow 600 that supports reporting multiple replacement beams in BFRQs in accordance with one or more aspects of the present disclosure. The process flow 600 may include a UE 115-*e* and a network entity 105-*e* described with reference to FIGS. 1 through 5. The UE 115-*e* may support separate uplink and downlink beam pairs for communicating with the network entity 105-*e*. The UE 115-*e* may report multiple replacement beams (e.g., a downlink network beam and an uplink network beam) based on detection of a downlink beam failure. Alternative examples of the following may be performed, where some processes are performed in a different order than described or are not performed at all. In some examples, processes may include additional features not mentioned below, or further processes may be added.

At 605, the UE 115-*e* may communicate with the network entity 105-*e* using a separate uplink beam pair and downlink beam pair. The UE 115-*e* may support these beam pairs as a beam configuration based on supporting a first uplink TCI state corresponding to the uplink beam pair and a second downlink TCI state corresponding to the downlink beam pair (e.g., according to a TCI state codepoint). For example, the UE 115-*e* may store a list of TCI state codepoints supported by the UE 115-*e*, where the list includes TCI states corresponding to uplink/downlink beam configurations that the UE 115-*e* may use for concurrent communications. In some cases, the UE 115-*e* may transmit signaling to the network entity 105-*e* indicating a set of beam configurations supported by the UE 115-*e*.

At 610, the UE 115-*e* may monitor for BFD-RSs from the network entity 105-*e*. For example, the UE 115-*e* may receive a BFD-RS corresponding to the currently active downlink beam pair and may measure a channel metric associated with the BFD-RS. If the channel metric for the BFD-RS fails to satisfy a threshold, the UE 115-*e* may determine a beam failure for the downlink beam pair corresponding to the BFD-RS. The UE 115-*e* may detect a downlink beam failure using one or more BFD-RS s.

At 615, the UE 115-*e* may monitor for NBI-RSs from the network entity 105-*e*. For example, the UE 115-*e* may receive NBI-RSs corresponding to respective downlink beams, respective uplink beams, or a combination thereof and may measure channel metrics for the NBI-RSs. If the UE 115-*e* detects a downlink beam failure, the UE 115-*e* may use the channel metrics for the received NBI-RSs to determine a replacement downlink beam or downlink beam pair for the failed beam or beam pair.

At 620, the UE 115-*e* may detect a downlink beam failure, for example, based on a BFD-RS received at 610. At 625, the UE 115-*e* may determine a new downlink beam based on an NBI-RS received at 615. Additionally, the UE 115-*e* may determine a new uplink beam, for example, even if the UE 115-*e* did not detect an uplink beam failure. The UE 115-*e* may determine the new uplink beam based on an NBI-RS received at 610, a TCI state codepoint stored at the UE 115-*e* that supports an uplink/downlink beam configuration, or both. In some examples, the UE 115-*e* may select the new uplink beam based on a permissible exposure threshold (e.g., an MPE threshold) for the UE 115-*e*.

At 630, the UE 115-*e* may transmit a first signal including a BFRQ in response to detecting the downlink beam failure. The BFRQ may indicate a downlink network beam based on the downlink beam failure. Additionally, the BFRQ may indicate an uplink network beam based on the downlink network beam and a beam configuration supported by the UE 115-*e* (e.g., according to a TCI state codepoint supported at the UE 115-*e*). In some examples, the UE 115-*e* may transmit the BFRQ to the network entity 105-*e* using a maintained uplink beam pair link with the network entity 105-*e*.

At 635, the network entity 105-*e* may respond to the BFRQ with a BFRR. The network entity 105-*e* may transmit the BFRR to the UE 115-*e* to confirm reception of the BFRQ and to confirm resetting the beams to the uplink and downlink network beams indicated in the BFRQ. The UE 115-*e* may receive, in response to the BFRQ, a second signal including the BFRR.

At 640, the UE 115-*e* may reset beams with the network entity 105-*e* in response to the BFRR. For example, the UE 115-*e* may deactivate an uplink UE beam and a downlink UE beam previously used for communicating with the network entity 105-*e* and may activate a downlink UE beam and an uplink UE beam corresponding to the network beams indicated in the BFRQ. The UE 115-*e* may reset the beams following a delay after receiving the BFRR. For example, the UE 115-*e* may initiate a timer in response to receiving the second signaling including the BFRR to apply the delay. The UE 115-*e* may activate the beam configuration (e.g., the new downlink UE beam and the new uplink UE beam) based on an expiration of the timer.

At 645, the UE 115-*e* may communicate using the downlink beam pair and the uplink beam pair based on the BFRR (e.g., based on resetting the beams in response to the BFRR). The communicating may involve the UE 115-*e* receiving, via a transceiver, a downlink signal from the network entity 105-*e* using the downlink beam pair. Additionally, or alternatively, the communicating may involve the UE 115-*e* transmitting, via a transceiver, an uplink signal to the network entity 105-*e* using the uplink beam pair.

Figure 7:
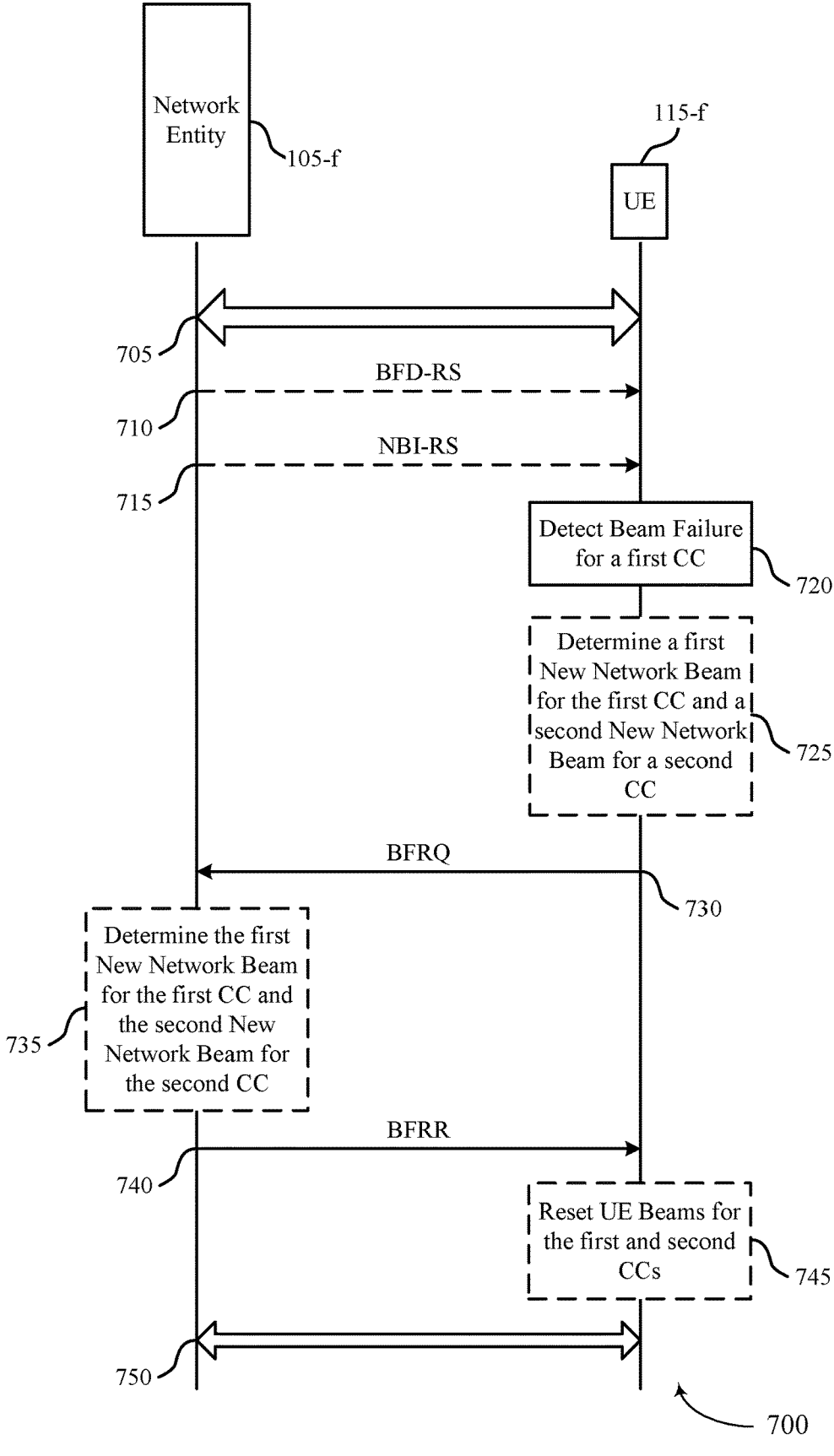

FIG. 7 illustrates an example of a process flow 700 that supports reporting multiple replacement beams in BFRQs in accordance with one or more aspects of the present disclosure. The process flow 700 may include a UE 115-*f* and a network entity 105-*f* described with reference to FIGS. 1 through 6. The UE 115-*f* may support using different beam pairs for communications in different CCs, for example, due to beam squint effects as described with reference to FIG. 4. The UE 115-*f* may report multiple respective replacement beams for different CCs based on detection of a beam failure in one CC. Alternatively, the UE 115-*f* and the network entity 105-*f* may derive multiple replacement beams for associated CCs in response to a BFRQ indicating a single replacement beam for a CC. Alternative examples of the following may be performed, where some processes are performed in a different order than described or are not performed at all. In some examples, processes may include additional features not mentioned below, or further processes may be added.

At 705, the UE 115-*f* may communicate with the network entity 105-*f* using one or more beams across multiple CCs. For example, the UE 115-*f* may use a single, relatively coarse beam or beam pair for communicating in a first CC and a second CC, or the UE 115-*f* may use a first beam or first beam pair for communicating in a first CC and may use a second beam or second beam pair for communicating in a second CC (e.g., based on beam squint effects for the first beam and the second beam).

At 710, the UE 115-*f* may monitor for BFD-RSs from the network entity 105-*f*. For example, the UE 115-*f* may receive a BFD-RS corresponding to a currently active beam pair link for a first CC and may measure a channel metric associated with the BFD-RS. If the channel metric for the BFD-RS fails to satisfy a threshold, the UE 115-*f* may determine a beam failure for the first CC corresponding to the BFD-RS.

At 715, the UE 115-*f* may monitor for NBI-RSs from the network entity 105-*f*. For example, the UE 115-*f* may receive NBI-RSs corresponding to respective beams and may measure channel metrics for the NBI-RSs. If the UE 115-*f* detects a beam failure, the UE 115-*f* may use the channel metrics for the received NBI-RSs to determine a replacement beam for the failed beam pair link for the corresponding specific CC.

At 720, the UE 115-*f* may detect a beam failure for a first CC, for example, based on a BFD-RS received at 710. At 725, the UE 115-*f* may determine a new beam for the first CC based on an NBI-RS received at 715. Additionally, the UE 115-*f* may determine a new beam for an associated CC, such as a second CC, for example, even if the UE 115-*f* did not detect a beam failure for the second CC. The UE 115-*f* may determine the new beam for the second CC based on an NBI-RS received at 710, a prediction of a beam squint effect, or both.

At 730, the UE 115-*f* may transmit a first signal including a BFRQ in response to detecting the beam failure for the first CC. The BFRQ may indicate a first network beam for the first CC based on the beam failure for the first CC. Additionally, in some examples, the BFRQ may indicate a second network beam for the second CC associated with the first CC based on the beam failure for the first CC. The network entity 105-*f* may receive the BFRQ.

In some examples, at 735, the network entity 105-*f* may determine the second network beam for the second CC associated with the first CC based on the beam failure for the first CC. For example, the UE 115-*f* may indicate the first network beam for the first CC in the BFRQ. The network entity 105-*f* may store a table, a rule, or some other method for deriving one or more additional network beams for one or more CCs associated with the first CC and may derive the one or more additional network beams based on the received BFRQ. Alternatively, the BFRQ may include indications of the one or more additional network beams for the one or more associated CCs.

At 740, the network entity 105-*f* may transmit, and the UE 115-*f* may receive, a second signal including a BFRR in response to the BFRQ. At 745, the UE 115-*f* may reset respective beams for multiple CCs in response to receiving the BFRR. For example, the UE 115-*f* may activate a first UE beam for the first CC corresponding to the first network beam indicated in the BFRQ. Additionally, the UE 115-*f* may activate a second UE beam for the second CC associated with the first CC. The second UE beam may correspond to the second network beam indicated in the BFRQ, or the UE 115-*f* may determine the second UE beam using a table, a rule, or some other method based on the first UE beam, the first network beam, or both for the first CC.

At 750, the UE 115-*f* may communicate on the first CC using the first UE beam and on the second CC using the second UE beam based on the BFRR (e.g., based on the beam reset procedure). The communicating may involve the UE 115-*f* receiving, via a transceiver, a downlink signal from the network entity 105-*f* using the first UE beam, the second UE beam, or both. Additionally, or alternatively, the communicating may involve the UE 115-*f* transmitting, via a transceiver, an uplink signal to the network entity 105-*f* using the first UE beam, the second UE beam, or both.

FIG. 8 shows a block diagram 800 of a device 805 that supports reporting multiple replacement beams in BFRQs in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to reporting multiple replacement beams in beam failure recovery requests). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reporting multiple replacement beams in beam failure recovery requests). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of reporting multiple replacement beams in beam failure recovery requests as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for transmitting first signaling including a beam failure recovery request in response to detecting a beam failure for a first transmission/reception point, the beam failure recovery request indicating a first beam for the first transmission/reception point based on the beam failure for the first transmission/reception point, and the beam failure recovery request indicating a second beam for a second transmission/reception point based on the first beam and a beam pair supported by the UE. The communications manager 820 may be configured as or otherwise support a means for receiving, in response to the beam failure recovery request, second signaling including a beam failure recovery response. The communications manager 820 may be configured as or otherwise support a means for communicating with the first transmission/reception point using the first beam and with the second transmission/reception point using the second beam based on the beam failure recovery response.

Additionally, or alternatively, the communications manager 820 may support wireless communications at a UE in accordance with examples as disclosed herein. For example, the communications manager 820 may be configured as or otherwise support a means for transmitting first signaling including a beam failure recovery request in response to detecting a downlink beam failure, the beam failure recovery request indicating a downlink beam based on the downlink beam failure, and the beam failure recovery request further indicating an uplink beam based on the downlink beam. The communications manager 820 may be configured as or otherwise support a means for receiving, in response to the beam failure recovery request, second signaling including a beam failure recovery response. The communications manager 820 may be configured as or otherwise support a means for communicating using the downlink beam and the uplink beam based on the beam failure recovery response.

Additionally, or alternatively, the communications manager 820 may support wireless communications at a UE in accordance with examples as disclosed herein. For example, the communications manager 820 may be configured as or otherwise support a means for transmitting first signaling including a beam failure recovery request in response to detecting a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. The communications manager 820 may be configured as or otherwise support a means for receiving, in response to the beam failure recovery request, second signaling including a beam failure recovery response. The communications manager 820 may be configured as or otherwise support a means for communicating on the first component carrier using the first beam and on the second component carrier using the second beam based on the beam failure recovery response.

Additionally, or alternatively, the communications manager 820 may support wireless communications at a UE in accordance with examples as disclosed herein. For example, the communications manager 820 may be configured as or otherwise support a means for transmitting first signaling including a beam failure recovery request in response to detecting a beam failure for a first component carrier, the beam failure recovery request indicating a first beam for the first component carrier based on the beam failure for the first component carrier. The communications manager 820 may be configured as or otherwise support a means for receiving, in response to the beam failure recovery request, second signaling including a beam failure recovery response. The communications manager 820 may be configured as or otherwise support a means for communicating on the first component carrier using the first beam and on a second component carrier using a second beam based on the beam failure recovery response, the second beam being based on the first beam and an association between the first component carrier and the second component carrier.

Figure 9:
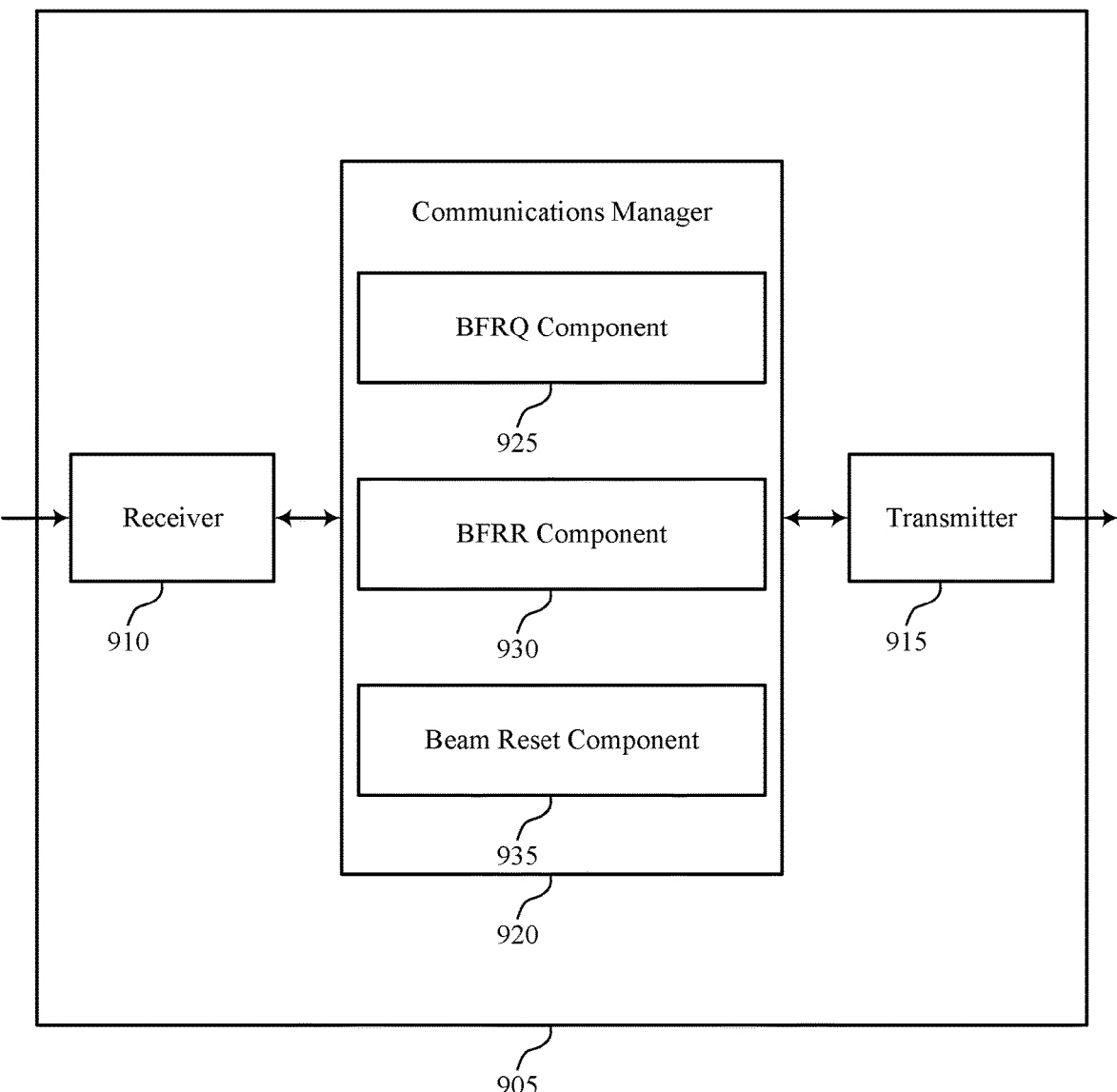

FIG. 9 shows a block diagram 900 of a device 905 that supports reporting multiple replacement beams in BFRQs in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reporting multiple replacement beams in beam failure recovery requests). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reporting multiple replacement beams in beam failure recovery requests). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reporting multiple replacement beams in beam failure recovery requests as described herein. For example, the communications manager 920 may include an BFRQ component 925, an BFRR component 930, a beam reset component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The BFRQ component 925 may be configured as or otherwise support a means for transmitting first signaling including a beam failure recovery request in response to detecting a beam failure for a first transmission/reception point, the beam failure recovery request indicating a first beam for the first transmission/reception point based on the beam failure for the first transmission/reception point, and the beam failure recovery request indicating a second beam for a second transmission/reception point based on the first beam and a beam pair supported by the UE. The BFRR component 930 may be configured as or otherwise support a means for receiving, in response to the beam failure recovery request, second signaling including a beam failure recovery response. The beam reset component 935 may be configured as or otherwise support a means for communicating with the first transmission/reception point using the first beam and with the second transmission/reception point using the second beam based on the beam failure recovery response.

Additionally, or alternatively, the communications manager 920 may support wireless communications at a UE in accordance with examples as disclosed herein. The BFRQ component 925 may be configured as or otherwise support a means for transmitting first signaling including a beam failure recovery request in response to detecting a downlink beam failure, the beam failure recovery request indicating a downlink beam based on the downlink beam failure, and the beam failure recovery request further indicating an uplink beam based on the downlink beam. The BFRR component 930 may be configured as or otherwise support a means for receiving, in response to the beam failure recovery request, second signaling including a beam failure recovery response. The beam reset component 935 may be configured as or otherwise support a means for communicating using the downlink beam and the uplink beam based on the beam failure recovery response.

Additionally, or alternatively, the communications manager 920 may support wireless communications at a UE in accordance with examples as disclosed herein. The BFRQ component 925 may be configured as or otherwise support a means for transmitting first signaling including a beam failure recovery request in response to detecting a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. The BFRR component 930 may be configured as or otherwise support a means for receiving, in response to the beam failure recovery request, second signaling including a beam failure recovery response. The beam reset component 935 may be configured as or otherwise support a means for communicating on the first component carrier using the first beam and on the second component carrier using the second beam based on the beam failure recovery response.

Additionally, or alternatively, the communications manager 920 may support wireless communications at a UE in accordance with examples as disclosed herein. The BFRQ component 925 may be configured as or otherwise support a means for transmitting first signaling including a beam failure recovery request in response to detecting a beam failure for a first component carrier, the beam failure recovery request indicating a first beam for the first component carrier based on the beam failure for the first component carrier. The BFRR component 930 may be configured as or otherwise support a means for receiving, in response to the beam failure recovery request, second signaling including a beam failure recovery response. The beam reset component 935 may be configured as or otherwise support a means for communicating on the first component carrier using the first beam and on a second component carrier using a second beam based on the beam failure recovery response, the second beam being based on the first beam and an association between the first component carrier and the second component carrier.

Figure 10:
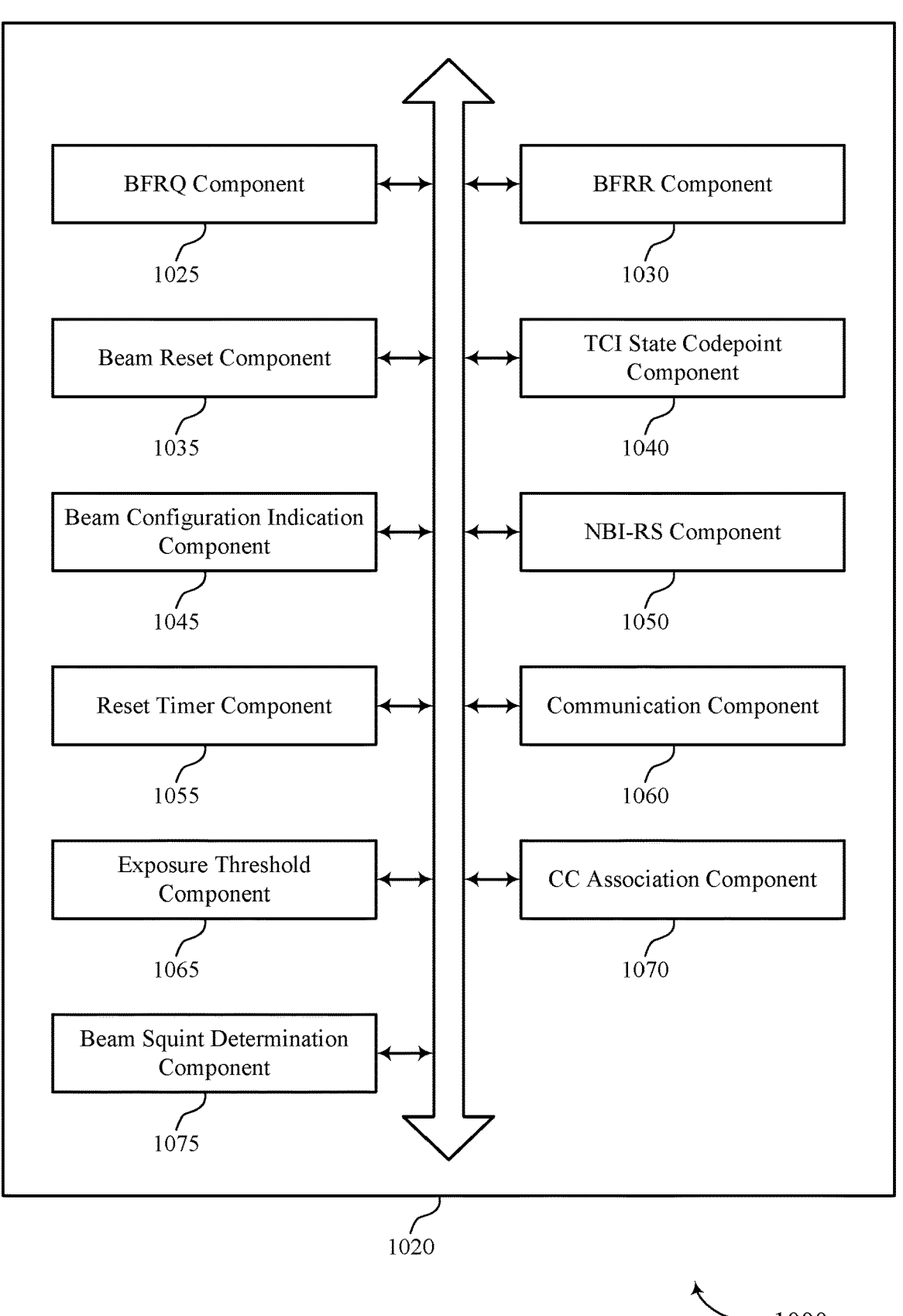
FIG. 10 shows a block diagram of a communications manager that supports reporting multiple replacement beams in BFRQs in accordance with one or more aspects of the present disclosure.

FIG. 10 shows a block diagram 1000 of a communications manager 1020 that supports reporting multiple replacement beams in BFRQs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of reporting multiple replacement beams in beam failure recovery requests as described herein. For example, the communications manager 1020 may include an BFRQ component 1025, an BFRR component 1030, a beam reset component 1035, a TCI state codepoint component 1040, a beam pair indication component 1045, an NBI-RS component 1050, a reset timer component 1055, a communication component 1060, an exposure threshold component 1065, a CC association component 1070, a beam squint determination component 1075, or any combination thereof. Each of these components may communicate, directly or indirectly, with one another (e.g., via one or more buses).

The communications manager 1020 may support wireless communications at a UE in accordance with examples as disclosed herein. The BFRQ component 1025 may be configured as or otherwise support a means for transmitting first signaling including a beam failure recovery request in response to detecting a beam failure for a first transmission/reception point, the beam failure recovery request indicating a first beam for the first transmission/reception point based on the beam failure for the first transmission/reception point, and the beam failure recovery request indicating a second beam for a second transmission/reception point based on the first beam and a beam pair supported by the UE. The BFRR component 1030 may be configured as or otherwise support a means for receiving, in response to the beam failure recovery request, second signaling including a beam failure recovery response. The beam reset component 1035 may be configured as or otherwise support a means for communicating with the first transmission/reception point using the first beam and with the second transmission/reception point using the second beam based on the beam failure recovery response.

In some examples, the TCI state codepoint component 1040 may be configured as or otherwise support a means for storing a transmission configuration indicator state codepoint including a first transmission configuration indicator state for the first transmission/reception point and a second transmission configuration indicator state for the second transmission/reception point, the beam pair supported by the UE including the first beam based on the first transmission configuration indicator state and the second beam based on the second transmission configuration indicator state.

In some examples, the beam pair indication component 1045 may be configured as or otherwise support a means for transmitting third signaling indicating a set of multiple beam pairs supported by the UE, the set of multiple beam pairs including at least the beam pair supported by the UE.

In some examples, the beam pair indication component 1045 may be configured as or otherwise support a means for determining the set of multiple beam pairs supported by the UE based on the first transmission/reception point, the second transmission/reception point, a capability of the UE, a first channel between the UE and the first transmission/reception point, a second channel between the UE and the second transmission/reception point, a multiplexing scheme for the UE, or a combination thereof.

In some examples, the NBI-RS component 1050 may be configured as or otherwise support a means for receiving a new beam identification reference signal using the first beam. In some examples, the NBI-RS component 1050 may be configured as or otherwise support a means for determining the first beam based on the new beam identification reference signal, the beam failure recovery request indicating the first beam based on the determining.

In some examples, the beam reset component 1035 may be configured as or otherwise support a means for maintaining a connection with the second transmission/reception point concurrent to detecting the beam failure for the first transmission/reception point and concurrent to transmitting the first signaling including the beam failure recovery request indicating the second beam for the second transmission/reception point.

In some examples, the beam pair indication component 1045 may be configured as or otherwise support a means for supporting the beam pair based on the UE supporting concurrent reception using the first beam and the second beam in a spatial-division multiplexing scheme.

In some examples, the reset timer component 1055 may be configured as or otherwise support a means for initiating a timer in response to receiving the second signaling including the beam failure recovery response. In some examples, the reset timer component 1055 may be configured as or otherwise support a means for activating the beam pair based on an expiration of the timer, the communicating with the first transmission/reception point using the first beam and with the second transmission/reception point using the second beam being further based on activating the beam pair.

In some examples, receiving, via a transceiver, downlink signaling from the first transmission/reception point using the first beam or from the second transmission/reception point using the second beam or both. In some examples, transmitting, via the transceiver, uplink signaling to the first transmission/reception point using the first beam or to the second transmission/reception point using the second beam or both.

Additionally, or alternatively, the communications manager 1020 may support wireless communications at a UE in accordance with examples as disclosed herein. In some examples, the BFRQ component 1025 may be configured as or otherwise support a means for transmitting first signaling including a beam failure recovery request in response to detecting a downlink beam failure, the beam failure recovery request indicating a downlink beam based on the downlink beam failure, and the beam failure recovery request further indicating an uplink beam based on the downlink beam. In some examples, the BFRR component 1030 may be configured as or otherwise support a means for receiving, in response to the beam failure recovery request, second signaling including a beam failure recovery response. In some examples, the beam reset component 1035 may be configured as or otherwise support a means for communicating using the downlink beam and the uplink beam based on the beam failure recovery response.

In some examples, the exposure threshold component 1065 may be configured as or otherwise support a means for determining the uplink beam further based on a permissible exposure threshold for the UE.

In some examples, the NBI-RS component 1050 may be configured as or otherwise support a means for receiving a new beam identification reference signal using the downlink beam. In some examples, the NBI-RS component 1050 may be configured as or otherwise support a means for determining the downlink beam based on the new beam identification reference signal, the beam failure recovery request indicating the downlink beam based on the determining.

In some examples, the reset timer component 1055 may be configured as or otherwise support a means for initiating a timer in response to receiving the second signaling including the beam failure recovery response. In some examples, the reset timer component 1055 may be configured as or otherwise support a means for activating the downlink beam and the uplink beam based on an expiration of the timer, the communicating using the downlink beam and the uplink beam being further based on activating the downlink beam and the uplink beam.

In some examples, receiving, via a transceiver, downlink signaling using the downlink beam. In some examples, transmitting, via the transceiver, uplink signaling using the uplink beam.

Additionally, or alternatively, the communications manager 1020 may support wireless communications at a UE in accordance with examples as disclosed herein. In some examples, the BFRQ component 1025 may be configured as or otherwise support a means for transmitting first signaling including a beam failure recovery request in response to detecting a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. In some examples, the BFRR component 1030 may be configured as or otherwise support a means for receiving, in response to the beam failure recovery request, second signaling including a beam failure recovery response. In some examples, the beam reset component 1035 may be configured as or otherwise support a means for communicating on the first component carrier using the first beam and on the second component carrier using the second beam based on the beam failure recovery response.

In some examples, the CC association component 1070 may be configured as or otherwise support a means for determining an association between the first component carrier and the second component carrier based on the second component carrier being within a frequency range from the first component carrier, the beam failure recovery request indicating the second beam based on the association between the first component carrier and the second component carrier.

In some examples, the CC association component 1070 may be configured as or otherwise support a means for determining an association between the first component carrier and the second component carrier based on a configured component carrier list including the first component carrier and the second component carrier, the beam failure recovery request indicating the second beam based on the association between the first component carrier and the second component carrier.

In some examples, the beam failure recovery request further indicates a first association between the first beam and the first component carrier and a second association between the second beam and the second component carrier.

In some examples, the beam failure recovery request further indicates a first association between the first beam and a first bandwidth part corresponding to the first component carrier and a second association between the second beam and a second bandwidth part corresponding to the second component carrier.

In some examples, the beam failure recovery request further indicates one or more additional beams for one or more additional component carriers associated with the first component carrier based on the beam failure for the first component carrier.

In some examples, the beam squint determination component 1075 may be configured as or otherwise support a means for determining the second beam based on a beam width of the first beam failing to satisfy a threshold beam width.

In some examples, the beam squint determination component 1075 may be configured as or otherwise support a means for determining that the first beam fails to support communications on the second component carrier according to a beam squint effect for the first beam based on the beam width of the first beam failing to satisfy the threshold beam width.

In some examples, the NBI-RS component 1050 may be configured as or otherwise support a means for receiving a new beam identification reference signal on the first component carrier using the first beam. In some examples, the NBI-RS component 1050 may be configured as or otherwise support a means for determining the first beam based on the new beam identification reference signal, the beam failure recovery request indicating the first beam based on the determining.

In some examples, the reset timer component 1055 may be configured as or otherwise support a means for initiating a timer in response to receiving the second signaling including the beam failure recovery response. In some examples, the reset timer component 1055 may be configured as or otherwise support a means for activating the first beam and the second beam based on an expiration of the timer, the communicating on the first component carrier using the first beam and on the second component carrier using the second beam being further based on activating the first beam and the second beam.

In some examples, receiving, via a transceiver, downlink signaling on the first component carrier using the first beam or on the second component carrier using the second beam or both. In some examples, transmitting, via the transceiver, uplink signaling on the first component carrier using the first beam or on the second component carrier using the second beam or both.

Additionally, or alternatively, the communications manager 1020 may support wireless communications at a UE in accordance with examples as disclosed herein. In some examples, the BFRQ component 1025 may be configured as or otherwise support a means for transmitting first signaling including a beam failure recovery request in response to detecting a beam failure for a first component carrier, the beam failure recovery request indicating a first beam for the first component carrier based on the beam failure for the first component carrier. In some examples, the BFRR component 1030 may be configured as or otherwise support a means for receiving, in response to the beam failure recovery request, second signaling including a beam failure recovery response. In some examples, the beam reset component 1035 may be configured as or otherwise support a means for communicating on the first component carrier using the first beam and on a second component carrier using a second beam based on the beam failure recovery response, the second beam being based on the first beam and an association between the first component carrier and the second component carrier.

In some examples, the CC association component 1070 may be configured as or otherwise support a means for storing a table or a rule or both associating the first component carrier with the second component carrier. In some examples, the CC association component 1070 may be configured as or otherwise support a means for determining the second beam based on the table or the rule or both and the first beam for the first component carrier.

Figure 11:
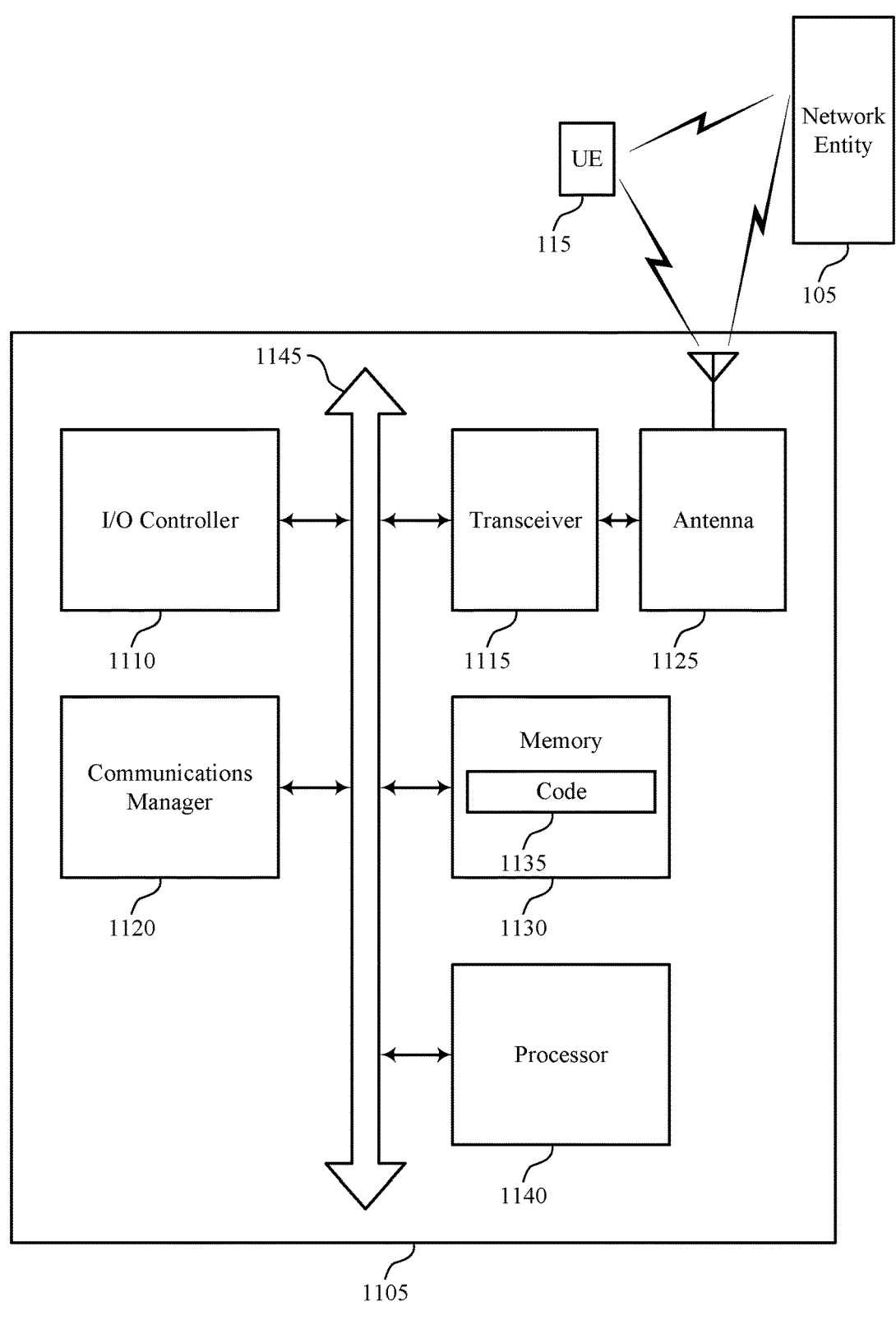
FIG. 11 shows a diagram of a system including a device that supports reporting multiple replacement beams in BFRQs in accordance with one or more aspects of the present disclosure.

FIG. 11 shows a diagram of a system 1100 including a device 1105 that supports reporting multiple replacement beams in BFRQs in accordance with one or more aspects of the present disclosure. The device 1105 may be an example of or include the components of a device 805, a device 905, or a UE 115 as described herein. The device 1105 may communicate wirelessly with one or more network entities 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reporting multiple replacement beams in beam failure recovery requests). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for transmitting first signaling including a beam failure recovery request in response to detecting a beam failure for a first transmission/reception point, the beam failure recovery request indicating a first beam for the first transmission/reception point based on the beam failure for the first transmission/reception point, and the beam failure recovery request indicating a second beam for a second transmission/reception point based on the first beam and a beam pair supported by the UE. The communications manager 1120 may be configured as or otherwise support a means for receiving, in response to the beam failure recovery request, second signaling including a beam failure recovery response. The communications manager 1120 may be configured as or otherwise support a means for communicating with the first transmission/reception point using the first beam and with the second transmission/reception point using the second beam based on the beam failure recovery response.

Additionally, or alternatively, the communications manager 1120 may support wireless communications at a UE in accordance with examples as disclosed herein. For example, the communications manager 1120 may be configured as or otherwise support a means for transmitting first signaling including a beam failure recovery request in response to detecting a downlink beam failure, the beam failure recovery request indicating a downlink beam based on the downlink beam failure, and the beam failure recovery request further indicating an uplink beam based on the downlink beam. The communications manager 1120 may be configured as or otherwise support a means for receiving, in response to the beam failure recovery request, second signaling including a beam failure recovery response. The communications manager 1120 may be configured as or otherwise support a means for communicating using the downlink beam and the uplink beam based on the beam failure recovery response.

Additionally, or alternatively, the communications manager 1120 may support wireless communications at a UE in accordance with examples as disclosed herein. For example, the communications manager 1120 may be configured as or otherwise support a means for transmitting first signaling including a beam failure recovery request in response to detecting a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. The communications manager 1120 may be configured as or otherwise support a means for receiving, in response to the beam failure recovery request, second signaling including a beam failure recovery response. The communications manager 1120 may be configured as or otherwise support a means for communicating on the first component carrier using the first beam and on the second component carrier using the second beam based on the beam failure recovery response.

Additionally, or alternatively, the communications manager 1120 may support wireless communications at a UE in accordance with examples as disclosed herein. For example, the communications manager 1120 may be configured as or otherwise support a means for transmitting first signaling including a beam failure recovery request in response to detecting a beam failure for a first component carrier, the beam failure recovery request indicating a first beam for the first component carrier based on the beam failure for the first component carrier. The communications manager 1120 may be configured as or otherwise support a means for receiving, in response to the beam failure recovery request, second signaling including a beam failure recovery response. The communications manager 1120 may be configured as or otherwise support a means for communicating on the first component carrier using the first beam and on a second component carrier using a second beam based on the beam failure recovery response, the second beam being based on the first beam and an association between the first component carrier and the second component carrier.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of reporting multiple replacement beams in beam failure recovery requests as described herein, or the processor 1140 and the memory 1130 may be otherwise configured to perform or support such operations.

Figure 12:
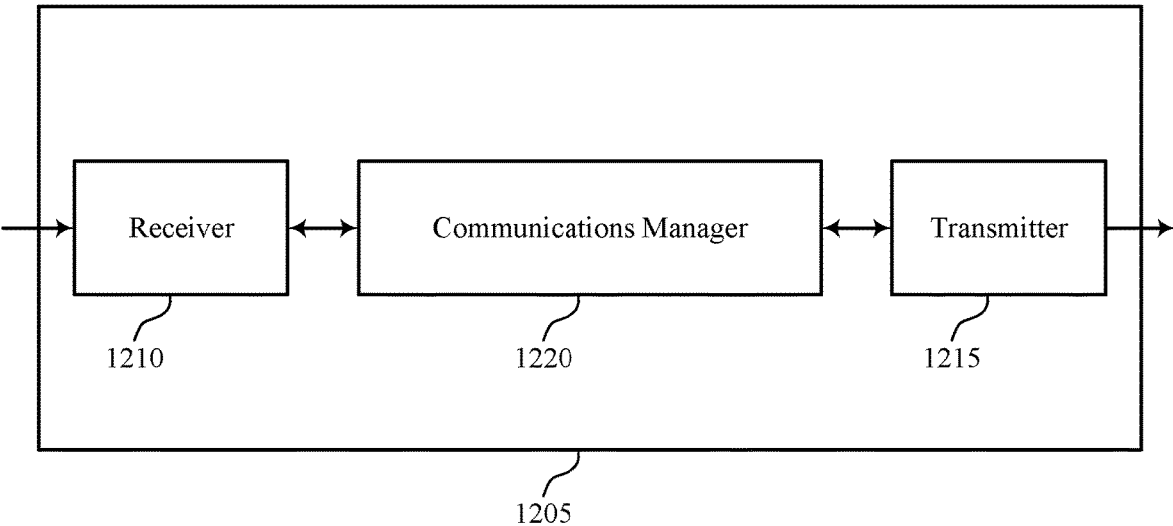
FIGS. 12 and 13 show block diagrams of devices that support reporting multiple replacement beams in BFRQs in accordance with one or more aspects of the present disclosure.

FIG. 12 shows a block diagram 1200 of a device 1205 that supports reporting multiple replacement beams in BFRQs in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to reporting multiple replacement beams in beam failure recovery requests). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to reporting multiple replacement beams in beam failure recovery requests). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of reporting multiple replacement beams in beam failure recovery requests as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry).

The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a device in a wireless network in accordance with examples as disclosed herein. For example, the communications manager 1220 may be configured as or otherwise support a means for receiving, from a UE, first signaling including a beam failure recovery request indicating a beam failure for a first transmission/reception point, the beam failure recovery request further indicating a first beam for the first transmission/reception point based on the beam failure for the first transmission/reception point, and the beam failure recovery request further indicating a second beam for a second transmission/reception point based on the first beam and a beam pair supported by the UE. The communications manager 1220 may be configured as or otherwise support a means for transmitting, to the UE and in response to the beam failure recovery request, second signaling including a beam failure recovery response. The communications manager 1220 may be configured as or otherwise support a means for communicating with the UE using the first beam or the second beam or both based on the beam failure recovery response.

Additionally, or alternatively, the communications manager 1220 may support wireless communications at a device in a wireless network in accordance with examples as disclosed herein. For example, the communications manager 1220 may be configured as or otherwise support a means for receiving, from a UE, first signaling including a beam failure recovery request indicating a downlink beam failure, the beam failure recovery request indicating a downlink beam based on the downlink beam failure, and the beam failure recovery request indicating an uplink beam based on the downlink beam. The communications manager 1220 may be configured as or otherwise support a means for transmitting, to the UE and in response to the beam failure recovery request, second signaling including a beam failure recovery response. The communications manager 1220 may be configured as or otherwise support a means for communicating with the UE using the downlink beam or the uplink beam or both based on the beam failure recovery response.

Additionally, or alternatively, the communications manager 1220 may support wireless communications at a device in a wireless network in accordance with examples as disclosed herein. For example, the communications manager 1220 may be configured as or otherwise support a means for receiving, from a UE, first signaling including a beam failure recovery request indicating a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. The communications manager 1220 may be configured as or otherwise support a means for transmitting, to the UE and in response to the beam failure recovery request, second signaling including a beam failure recovery response. The communications manager 1220 may be configured as or otherwise support a means for communicating with the UE on the first component carrier using the first beam or on the second component carrier using the second beam or both based on the beam failure recovery response.

Additionally, or alternatively, the communications manager 1220 may support wireless communications at a device in a wireless network in accordance with examples as disclosed herein. For example, the communications manager 1220 may be configured as or otherwise support a means for receiving, from a UE, first signaling including a beam failure recovery request indicating a beam failure for a first component carrier, the beam failure recovery request indicating a first beam for the first component carrier based on the beam failure for the first component carrier. The communications manager 1220 may be configured as or otherwise support a means for transmitting, to the UE and in response to the beam failure recovery request, second signaling including a beam failure recovery response. The communications manager 1220 may be configured as or otherwise support a means for communicating with the UE on the first component carrier using the first beam and on a second component carrier using a second beam based on the beam failure recovery response, the second beam being based on the first beam and an association between the first component carrier and the second component carrier.

Figure 13:

FIG. 13 shows a block diagram 1300 of a device 1305 that supports reporting multiple replacement beams in BFRQs in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to reporting multiple replacement beams in beam failure recovery requests). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to reporting multiple replacement beams in beam failure recovery requests). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of reporting multiple replacement beams in beam failure recovery requests as described herein. For example, the communications manager 1320 may include an BFRQ component 1325, an BFRR component 1330, a beam reset component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a device in a wireless network in accordance with examples as disclosed herein. The BFRQ component 1325 may be configured as or otherwise support a means for receiving, from a UE, first signaling including a beam failure recovery request indicating a beam failure for a first transmission/reception point, the beam failure recovery request further indicating a first beam for the first transmission/reception point based on the beam failure for the first transmission/reception point, and the beam failure recovery request further indicating a second beam for a second transmission/reception point based on the first beam and a beam pair supported by the UE. The BFRR component 1330 may be configured as or otherwise support a means for transmitting, to the UE and in response to the beam failure recovery request, second signaling including a beam failure recovery response. The beam reset component 1335 may be configured as or otherwise support a means for communicating with the UE using the first beam or the second beam or both based on the beam failure recovery response.

Additionally, or alternatively, the communications manager 1320 may support wireless communications at a device in a wireless network in accordance with examples as disclosed herein. The BFRQ component 1325 may be configured as or otherwise support a means for receiving, from a UE, first signaling including a beam failure recovery request indicating a downlink beam failure, the beam failure recovery request indicating a downlink beam based on the downlink beam failure, and the beam failure recovery request indicating an uplink beam based on the downlink beam. The BFRR component 1330 may be configured as or otherwise support a means for transmitting, to the UE and in response to the beam failure recovery request, second signaling including a beam failure recovery response. The beam reset component 1335 may be configured as or otherwise support a means for communicating with the UE using the downlink beam or the uplink beam or both based on the beam failure recovery response.

Additionally, or alternatively, the communications manager 1320 may support wireless communications at a device in a wireless network in accordance with examples as disclosed herein. The BFRQ component 1325 may be configured as or otherwise support a means for receiving, from a UE, first signaling including a beam failure recovery request indicating a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. The BFRR component 1330 may be configured as or otherwise support a means for transmitting, to the UE and in response to the beam failure recovery request, second signaling including a beam failure recovery response. The beam reset component 1335 may be configured as or otherwise support a means for communicating with the UE on the first component carrier using the first beam or on the second component carrier using the second beam or both based on the beam failure recovery response.

Additionally, or alternatively, the communications manager 1320 may support wireless communications at a device in a wireless network in accordance with examples as disclosed herein. The BFRQ component 1325 may be configured as or otherwise support a means for receiving, from a UE, first signaling including a beam failure recovery request indicating a beam failure for a first component carrier, the beam failure recovery request indicating a first beam for the first component carrier based on the beam failure for the first component carrier. The BFRR component 1330 may be configured as or otherwise support a means for transmitting, to the UE and in response to the beam failure recovery request, second signaling including a beam failure recovery response. The beam reset component 1335 may be configured as or otherwise support a means for communicating with the UE on the first component carrier using the first beam and on a second component carrier using a second beam based on the beam failure recovery response, the second beam being based on the first beam and an association between the first component carrier and the second component carrier.

Figure 14:
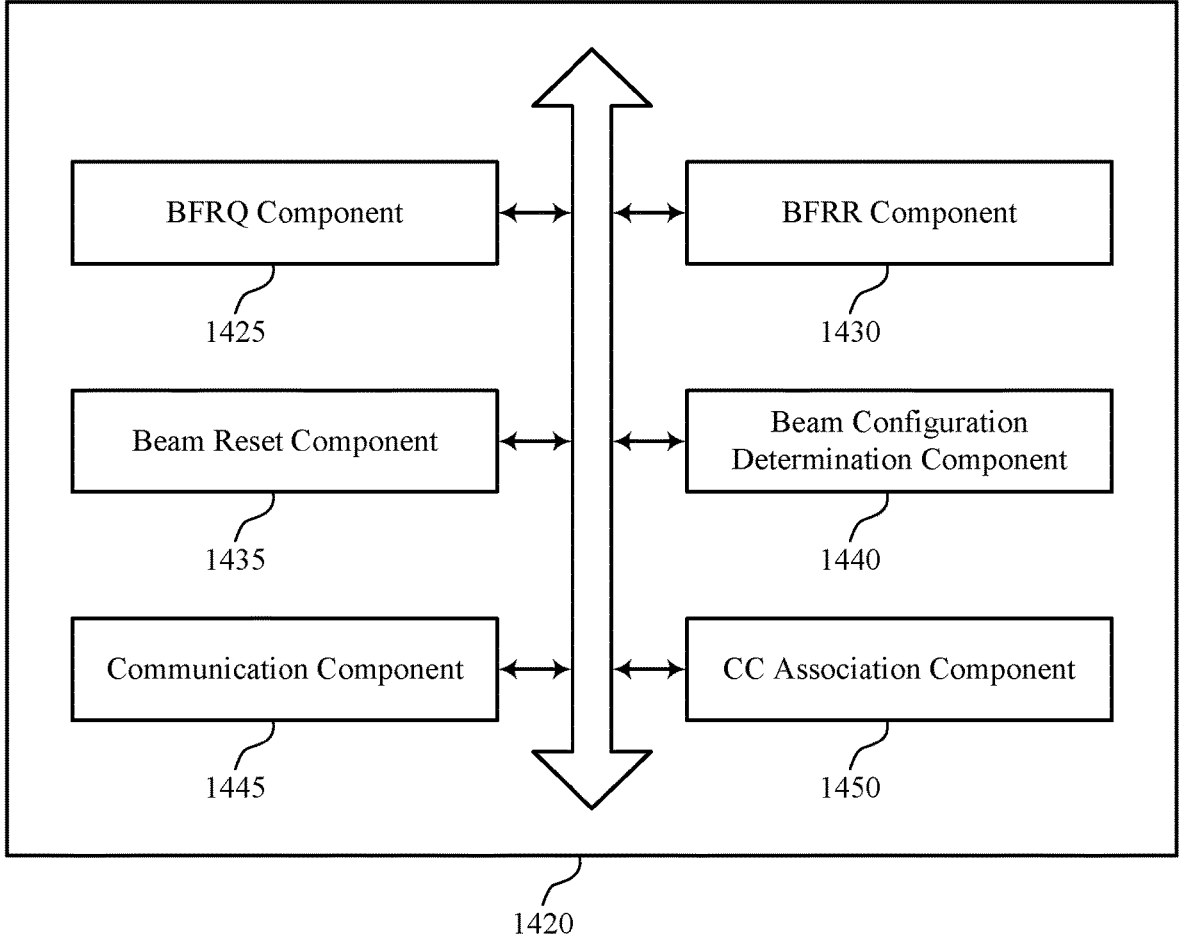
FIG. 14 shows a block diagram of a communications manager that supports reporting multiple replacement beams in BFRQs in accordance with one or more aspects of the present disclosure.

FIG. 14 shows a block diagram 1400 of a communications manager 1420 that supports reporting multiple replacement beams in BFRQs in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of reporting multiple replacement beams in beam failure recovery requests as described herein. For example, the communications manager 1420 may include an BFRQ component 1425, an BFRR component 1430, a beam reset component 1435, a beam pair determination component 1440, a communication component 1445, a CC association component 1450, or any combination thereof. Each of these components may communicate, directly or indirectly, with one another (e.g., via one or more buses).

The communications manager 1420 may support wireless communications at a device in a wireless network in accordance with examples as disclosed herein. The BFRQ component 1425 may be configured as or otherwise support a means for receiving, from a UE, first signaling including a beam failure recovery request indicating a beam failure for a first transmission/reception point, the beam failure recovery request further indicating a first beam for the first transmission/reception point based on the beam failure for the first transmission/reception point, and the beam failure recovery request further indicating a second beam for a second transmission/reception point based on the first beam and a beam pair supported by the UE. The BFRR component 1430 may be configured as or otherwise support a means for transmitting, to the UE and in response to the beam failure recovery request, second signaling including a beam failure recovery response. The beam reset component 1435 may be configured as or otherwise support a means for communicating with the UE using the first beam or the second beam or both based on the beam failure recovery response.

In some examples, the beam pair determination component 1440 may be configured as or otherwise support a means for receiving, from the UE, third signaling indicating a set of multiple beam pairs supported by the UE, the set of multiple beam pairs including at least the beam pair supported by the UE.

In some examples, communicating, via a transceiver, with the UE using the first beam based on the device in the wireless network including the first transmission/reception point.

In some examples, communicating, via a transceiver, with the UE using the second beam based on the device in the wireless network including the second transmission/reception point.

Additionally, or alternatively, the communications manager 1420 may support wireless communications at a device in a wireless network in accordance with examples as disclosed herein. In some examples, the BFRQ component 1425 may be configured as or otherwise support a means for receiving, from a UE, first signaling including a beam failure recovery request indicating a downlink beam failure, the beam failure recovery request indicating a downlink beam based on the downlink beam failure, and the beam failure recovery request indicating an uplink beam based on the downlink beam. In some examples, the BFRR component 1430 may be configured as or otherwise support a means for transmitting, to the UE and in response to the beam failure recovery request, second signaling including a beam failure recovery response. In some examples, the beam reset component 1435 may be configured as or otherwise support a means for communicating with the UE using the downlink beam or the uplink beam or both based on the beam failure recovery response.

In some examples, transmitting, via a transceiver, downlink signaling to the UE using the downlink beam based on the device in the wireless network including a transmission/reception point supporting the downlink beam.

In some examples, receiving, via a transceiver, uplink signaling from the UE using the uplink beam based on the device in the wireless network including a transmission/reception point supporting the uplink beam.

Additionally, or alternatively, the communications manager 1420 may support wireless communications at a device in a wireless network in accordance with examples as disclosed herein. In some examples, the BFRQ component 1425 may be configured as or otherwise support a means for receiving, from a UE, first signaling including a beam failure recovery request indicating a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. In some examples, the BFRR component 1430 may be configured as or otherwise support a means for transmitting, to the UE and in response to the beam failure recovery request, second signaling including a beam failure recovery response. In some examples, the beam reset component 1435 may be configured as or otherwise support a means for communicating with the UE on the first component carrier using the first beam or on the second component carrier using the second beam or both based on the beam failure recovery response.

In some examples, transmitting, via a transceiver, downlink signaling on the first component carrier using the first beam or on the second component carrier using the second beam or both. In some examples, receiving, via the transceiver, uplink signaling on the first component carrier using the first beam or on the second component carrier using the second beam or both.

Additionally, or alternatively, the communications manager 1420 may support wireless communications at a device in a wireless network in accordance with examples as disclosed herein. In some examples, the BFRQ component 1425 may be configured as or otherwise support a means for receiving, from a UE, first signaling including a beam failure recovery request indicating a beam failure for a first component carrier, the beam failure recovery request indicating a first beam for the first component carrier based on the beam failure for the first component carrier. In some examples, the BFRR component 1430 may be configured as or otherwise support a means for transmitting, to the UE and in response to the beam failure recovery request, second signaling including a beam failure recovery response. In some examples, the beam reset component 1435 may be configured as or otherwise support a means for communicating with the UE on the first component carrier using the first beam and on a second component carrier using a second beam based on the beam failure recovery response, the second beam being based on the first beam and an association between the first component carrier and the second component carrier.

In some examples, the CC association component 1450 may be configured as or otherwise support a means for storing a table or a rule or both associating the first component carrier with the second component carrier. In some examples, the CC association component 1450 may be configured as or otherwise support a means for determining the second beam based on the table or the rule or both and the first beam for the first component carrier.

Figure 15:
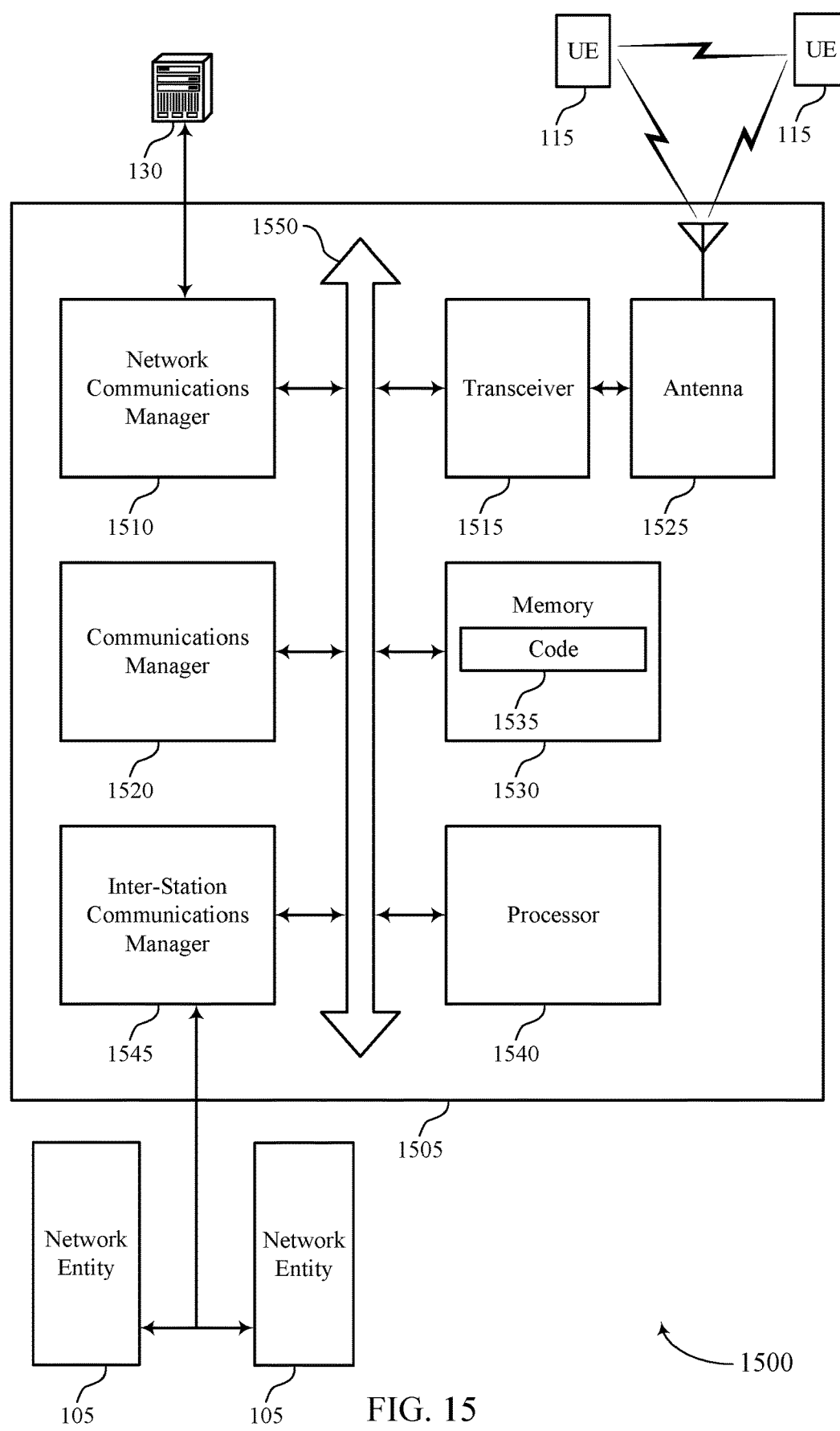
FIG. 15 shows a diagram of a system including a device that supports reporting multiple replacement beams in BFRQs in accordance with one or more aspects of the present disclosure.

FIG. 15 shows a diagram of a system 1500 including a device 1505 that supports reporting multiple replacement beams in BFRQs in accordance with one or more aspects of the present disclosure. The device 1505 may be an example of or include the components of a device 1205, a device 1305, or a network entity 105 as described herein. The device 1505 may communicate wirelessly with one or more network entities 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting reporting multiple replacement beams in beam failure recovery requests). For example, the device 1505 or a component of the device 1505 may include a processor 1540 and memory 1530 coupled with or to the processor 1540, the processor 1540 and memory 1530 configured to perform various functions described herein.

The inter-station communications manager 1545 may manage communications with other network entities 105, and may include a controller or scheduler for controlling communications with UEs 115 in cooperation with other network entities 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between network entities 105.

The communications manager 1520 may support wireless communications at a device in a wireless network in accordance with examples as disclosed herein. For example, the communications manager 1520 may be configured as or otherwise support a means for receiving, from a UE, first signaling including a beam failure recovery request indicating a beam failure for a first transmission/reception point, the beam failure recovery request further indicating a first beam for the first transmission/reception point based on the beam failure for the first transmission/reception point, and the beam failure recovery request further indicating a second beam for a second transmission/reception point based on the first beam and a beam pair supported by the UE. The communications manager 1520 may be configured as or otherwise support a means for transmitting, to the UE and in response to the beam failure recovery request, second signaling including a beam failure recovery response. The communications manager 1520 may be configured as or otherwise support a means for communicating with the UE using the first beam or the second beam or both based on the beam failure recovery response.

Additionally, or alternatively, the communications manager 1520 may support wireless communications at a device in a wireless network in accordance with examples as disclosed herein. For example, the communications manager 1520 may be configured as or otherwise support a means for receiving, from a UE, first signaling including a beam failure recovery request indicating a downlink beam failure, the beam failure recovery request indicating a downlink beam based on the downlink beam failure, and the beam failure recovery request indicating an uplink beam based on the downlink beam. The communications manager 1520 may be configured as or otherwise support a means for transmitting, to the UE and in response to the beam failure recovery request, second signaling including a beam failure recovery response. The communications manager 1520 may be configured as or otherwise support a means for communicating with the UE using the downlink beam or the uplink beam or both based on the beam failure recovery response.

Additionally, or alternatively, the communications manager 1520 may support wireless communications at a device in a wireless network in accordance with examples as disclosed herein. For example, the communications manager 1520 may be configured as or otherwise support a means for receiving, from a UE, first signaling including a beam failure recovery request indicating a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. The communications manager 1520 may be configured as or otherwise support a means for transmitting, to the UE and in response to the beam failure recovery request, second signaling including a beam failure recovery response. The communications manager 1520 may be configured as or otherwise support a means for communicating with the UE on the first component carrier using the first beam or on the second component carrier using the second beam or both based on the beam failure recovery response.

Additionally, or alternatively, the communications manager 1520 may support wireless communications at a device in a wireless network in accordance with examples as disclosed herein. For example, the communications manager 1520 may be configured as or otherwise support a means for receiving, from a UE, first signaling including a beam failure recovery request indicating a beam failure for a first component carrier, the beam failure recovery request indicating a first beam for the first component carrier based on the beam failure for the first component carrier. The communications manager 1520 may be configured as or otherwise support a means for transmitting, to the UE and in response to the beam failure recovery request, second signaling including a beam failure recovery response. The communications manager 1520 may be configured as or otherwise support a means for communicating with the UE on the first component carrier using the first beam and on a second component carrier using a second beam based on the beam failure recovery response, the second beam being based on the first beam and an association between the first component carrier and the second component carrier.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of reporting multiple replacement beams in beam failure recovery requests as described herein, or the processor 1540 and the memory 1530 may be otherwise configured to perform or support such operations.

FIG. 16 shows a flowchart illustrating a method 1600 that supports reporting multiple replacement beams in BFRQs in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting first signaling including a beam failure recovery request in response to detecting a beam failure for a first transmission/reception point, the beam failure recovery request indicating a first beam for the first transmission/reception point based on the beam failure for the first transmission/reception point, and the beam failure recovery request indicating a second beam for a second transmission/reception point based on the first beam and a beam pair supported by the UE. The operations of 1605 may be performed in accordance with examples as disclosed herein. In some examples, aspects of the operations of 1605 may be performed by an BFRQ component 1025 as described with reference to FIG. 10.

At 1610, the method may include receiving, in response to the beam failure recovery request, second signaling including a beam failure recovery response. The operations of 1610 may be performed in accordance with examples as disclosed herein. In some examples, aspects of the operations of 1610 may be performed by an BFRR component 1030 as described with reference to FIG. 10.

At 1615, the method may include communicating with the first transmission/reception point using the first beam and with the second transmission/reception point using the second beam based on the beam failure recovery response. The operations of 1615 may be performed in accordance with examples as disclosed herein. In some examples, aspects of the operations of 1615 may be performed by a beam reset component 1035 as described with reference to FIG. 10.

FIG. 17 shows a flowchart illustrating a method 1700 that supports reporting multiple replacement beams in BFRQs in accordance with one or more aspects of the present disclosure. The operations of the method 1700 may be implemented by a network entity or its components as described herein. For example, the operations of the method 1700 may be performed by a network entity 105 as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE, first signaling including a beam failure recovery request indicating a beam failure for a first transmission/reception point, the beam failure recovery request further indicating a first beam for the first transmission/reception point based on the beam failure for the first transmission/reception point, and the beam failure recovery request further indicating a second beam for a second transmission/reception point based on the first beam and a beam pair supported by the UE. The operations of 1705 may be performed in accordance with examples as disclosed herein. In some examples, aspects of the operations of 1705 may be performed by an BFRQ component 1425 as described with reference to FIG. 14.

At 1710, the method may include transmitting, to the UE and in response to the beam failure recovery request, second signaling including a beam failure recovery response. The operations of 1710 may be performed in accordance with examples as disclosed herein. In some examples, aspects of the operations of 1710 may be performed by an BFRR component 1430 as described with reference to FIG. 14.

At 1715, the method may include communicating with the UE using the first beam or the second beam or both based on the beam failure recovery response. The operations of 1715 may be performed in accordance with examples as disclosed herein. In some examples, aspects of the operations of 1715 may be performed by a beam reset component 1435 as described with reference to FIG. 14.

FIG. 18 shows a flowchart illustrating a method 1800 that supports reporting multiple replacement beams in BFRQs in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include transmitting first signaling including a beam failure recovery request in response to detecting a downlink beam failure, the beam failure recovery request indicating a downlink beam based on the downlink beam failure, and the beam failure recovery request further indicating an uplink beam based on the downlink beam. The operations of 1805 may be performed in accordance with examples as disclosed herein. In some examples, aspects of the operations of 1805 may be performed by an BFRQ component 1025 as described with reference to FIG. 10.

At 1810, the method may include receiving, in response to the beam failure recovery request, second signaling including a beam failure recovery response. The operations of 1810 may be performed in accordance with examples as disclosed herein. In some examples, aspects of the operations of 1810 may be performed by an BFRR component 1030 as described with reference to FIG. 10.

At 1815, the method may include communicating using the downlink beam and the uplink beam based on the beam failure recovery response. The operations of 1815 may be performed in accordance with examples as disclosed herein. In some examples, aspects of the operations of 1815 may be performed by a beam reset component 1035 as described with reference to FIG. 10.

FIG. 19 shows a flowchart illustrating a method 1900 that supports reporting multiple replacement beams in BFRQs in accordance with one or more aspects of the present disclosure. The operations of the method 1900 may be implemented by a network entity or its components as described herein. For example, the operations of the method 1900 may be performed by a network entity 105 as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include receiving, from a UE, first signaling including a beam failure recovery request indicating a downlink beam failure, the beam failure recovery request indicating a downlink beam based on the downlink beam failure, and the beam failure recovery request indicating an uplink beam based on the downlink beam. The operations of 1905 may be performed in accordance with examples as disclosed herein. In some examples, aspects of the operations of 1905 may be performed by an BFRQ component 1425 as described with reference to FIG. 14.

At 1910, the method may include transmitting, to the UE and in response to the beam failure recovery request, second signaling including a beam failure recovery response. The operations of 1910 may be performed in accordance with examples as disclosed herein. In some examples, aspects of the operations of 1910 may be performed by an BFRR component 1430 as described with reference to FIG. 14.

At 1915, the method may include communicating with the UE using the downlink beam or the uplink beam or both based on the beam failure recovery response. The operations of 1915 may be performed in accordance with examples as disclosed herein. In some examples, aspects of the operations of 1915 may be performed by a beam reset component 1435 as described with reference to FIG. 14.

FIG. 20 shows a flowchart illustrating a method 2000 that supports reporting multiple replacement beams in BFRQs in accordance with one or more aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2005, the method may include transmitting first signaling including a beam failure recovery request in response to detecting a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. The operations of 2005 may be performed in accordance with examples as disclosed herein. In some examples, aspects of the operations of 2005 may be performed by an BFRQ component 1025 as described with reference to FIG. 10.

At 2010, the method may include receiving, in response to the beam failure recovery request, second signaling including a beam failure recovery response. The operations of 2010 may be performed in accordance with examples as disclosed herein. In some examples, aspects of the operations of 2010 may be performed by an BFRR component 1030 as described with reference to FIG. 10.

At 2015, the method may include communicating on the first component carrier using the first beam and on the second component carrier using the second beam based on the beam failure recovery response. The operations of 2015 may be performed in accordance with examples as disclosed herein. In some examples, aspects of the operations of 2015 may be performed by a beam reset component 1035 as described with reference to FIG. 10.

FIG. 21 shows a flowchart illustrating a method 2100 that supports reporting multiple replacement beams in BFRQs in accordance with one or more aspects of the present disclosure. The operations of the method 2100 may be implemented by a network entity or its components as described herein. For example, the operations of the method 2100 may be performed by a network entity 105 as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include receiving, from a UE, first signaling including a beam failure recovery request indicating a beam failure for a first component carrier, the beam failure recovery request indicating a first beam for the first component carrier based on the beam failure for the first component carrier, and the beam failure recovery request indicating a second beam for a second component carrier associated with the first component carrier based on the beam failure for the first component carrier. The operations of 2105 may be performed in accordance with examples as disclosed herein. In some examples, aspects of the operations of 2105 may be performed by an BFRQ component 1425 as described with reference to FIG. 14.

At 2110, the method may include transmitting, to the UE and in response to the beam failure recovery request, second signaling including a beam failure recovery response. The operations of 2110 may be performed in accordance with examples as disclosed herein. In some examples, aspects of the operations of 2110 may be performed by an BFRR component 1430 as described with reference to FIG. 14.

At 2115, the method may include communicating with the UE on the first component carrier using the first beam or on the second component carrier using the second beam or both based on the beam failure recovery response. The operations of 2115 may be performed in accordance with examples as disclosed herein. In some examples, aspects of the operations of 2115 may be performed by a beam reset component 1435 as described with reference to FIG. 14.

FIG. 22 shows a flowchart illustrating a method 2200 that supports reporting multiple replacement beams in BFRQs in accordance with one or more aspects of the present disclosure. The operations of the method 2200 may be implemented by a UE or its components as described herein. For example, the operations of the method 2200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2205, the method may include transmitting first signaling including a beam failure recovery request in response to detecting a beam failure for a first component carrier, the beam failure recovery request indicating a first beam for the first component carrier based on the beam failure for the first component carrier. The operations of 2205 may be performed in accordance with examples as disclosed herein. In some examples, aspects of the operations of 2205 may be performed by an BFRQ component 1025 as described with reference to FIG. 10.

At 2210, the method may include receiving, in response to the beam failure recovery request, second signaling including a beam failure recovery response. The operations of 2210 may be performed in accordance with examples as disclosed herein. In some examples, aspects of the operations of 2210 may be performed by an BFRR component 1030 as described with reference to FIG. 10.

At 2215, the method may include communicating on the first component carrier using the first beam and on a second component carrier using a second beam based on the beam failure recovery response, the second beam being based on the first beam and an association between the first component carrier and the second component carrier. The operations of 2215 may be performed in accordance with examples as disclosed herein. In some examples, aspects of the operations of 2215 may be performed by a beam reset component 1035 as described with reference to FIG. 10.

FIG. 23 shows a flowchart illustrating a method 2300 that supports reporting multiple replacement beams in BFRQs in accordance with one or more aspects of the present disclosure. The operations of the method 2300 may be implemented by a network entity or its components as described herein. For example, the operations of the method 2300 may be performed by a network entity 105 as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2305, the method may include receiving, from a UE, first signaling including a beam failure recovery request indicating a beam failure for a first component carrier, the beam failure recovery request indicating a first beam for the first component carrier based on the beam failure for the first component carrier. The operations of 2305 may be performed in accordance with examples as disclosed herein. In some examples, aspects of the operations of 2305 may be performed by an BFRQ component 1425 as described with reference to FIG. 14.

At 2310, the method may include transmitting, to the UE and in response to the beam failure recovery request, second signaling including a beam failure recovery response. The operations of 2310 may be performed in accordance with examples as disclosed herein. In some examples, aspects of the operations of 2310 may be performed by an BFRR component 1430 as described with reference to FIG. 14.

At 2315, the method may include communicating with the UE on the first component carrier using the first beam and on a second component carrier using a second beam based on the beam failure recovery response, the second beam being based on the first beam and an association between the first component carrier and the second component carrier. The operations of 2315 may be performed in accordance with examples as disclosed herein. In some examples, aspects of the operations of 2315 may be performed by a beam reset component 1435 as described with reference to FIG. 14.

FIG. 24 shows a flowchart illustrating a method 2400 that supports reporting multiple replacement beams in beam failure recovery requests in accordance with one or more aspects of the present disclosure. The operations of the method 2400 may be implemented by a UE or its components as described herein. For example, the operations of the method 2400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2405, the method may include outputting a first signal that includes a beam failure recovery request in response to a detection of a beam failure of a beam pair link with a first transmission/reception point, the beam failure recovery request indicates a first network beam at the first transmission/reception point based on the beam failure of the beam pair link with the first transmission/reception point, and the beam failure recovery request indicates a second network beam at a second transmission/reception point based on the first network beam and a UE beam configuration supported by the UE that includes one or more UE beams corresponding to the first network beam and the second network beam. The operations of 2405 may be performed in accordance with examples as disclosed herein. In some examples, aspects of the operations of 2405 may be performed by a BFRQ component 1025 as described with reference to FIG. 10.

At 2410, the method may include obtaining, in response to the beam failure recovery request, a second signal that includes a beam failure recovery response. The operations of 2410 may be performed in accordance with examples as disclosed herein. In some examples, aspects of the operations of 2410 may be performed by a BFRR component 1030 as described with reference to FIG. 10.

At 2415, the method may include communicating with the first transmission/reception point and the second transmission/reception point via the one or more UE beams based on the beam failure recovery response. The operations of 2415 may be performed in accordance with examples as disclosed herein. In some examples, aspects of the operations of 2415 may be performed by a beam reset component 1035 as described with reference to FIG. 10.

Figure 25:
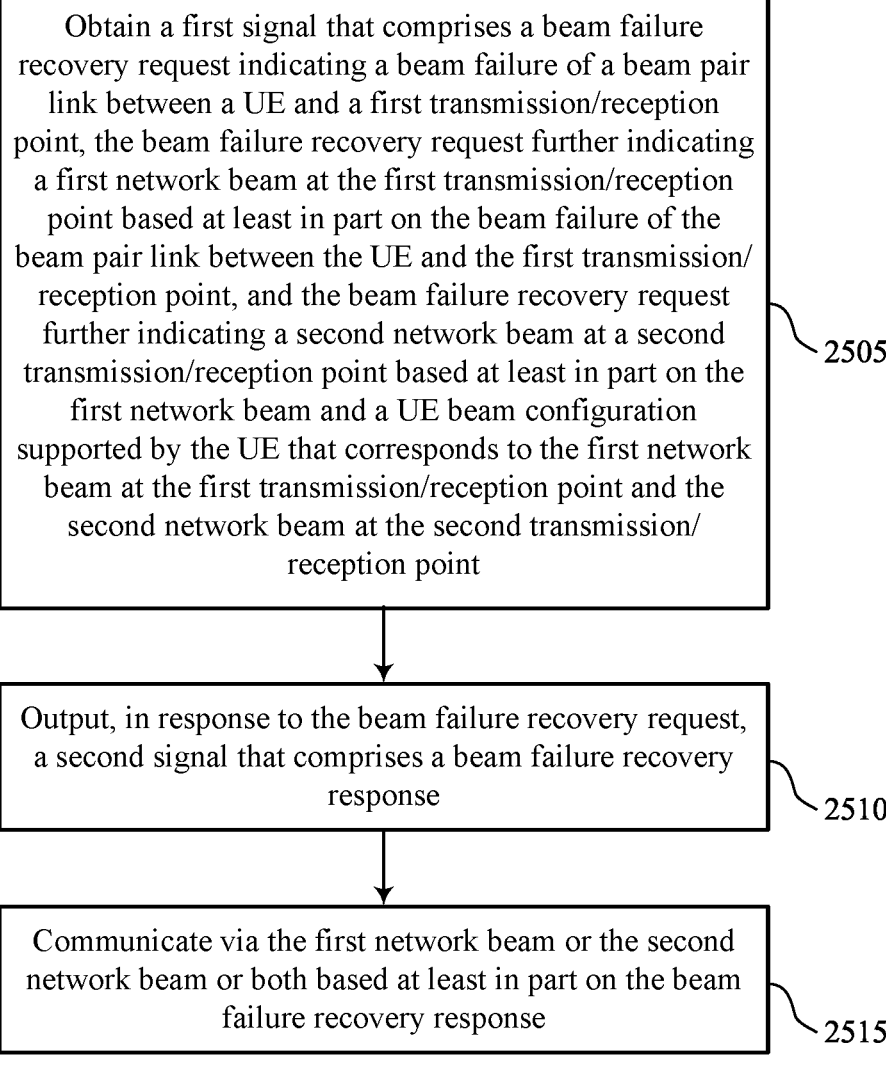

FIG. 25 shows a flowchart illustrating a method 2500 that supports reporting multiple replacement beams in beam failure recovery requests in accordance with one or more aspects of the present disclosure. The operations of the method 2500 may be implemented by a network entity or its components as described herein. For example, the operations of the method 2500 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2505, the method may include obtaining a first signal that includes a beam failure recovery request that indicates a beam failure of a beam pair link between a UE and a first transmission/reception point, the beam failure recovery request further indicates a first network beam at the first transmission/reception point based on the beam failure of the beam pair link between the UE and the first transmission/reception point, and the beam failure recovery request further indicates a second network beam at a second transmission/reception point based on the first network beam and a UE beam configuration supported by the UE that corresponds to the first network beam at the first transmission/reception point and the second network beam at the second transmission/reception point. The operations of 2505 may be performed in accordance with examples as disclosed herein. In some examples, aspects of the operations of 2505 may be performed by a BFRQ component 1425 as described with reference to FIG. 14.

At 2510, the method may include outputting, in response to the beam failure recovery request, a second signal that includes a beam failure recovery response. The operations of 2510 may be performed in accordance with examples as disclosed herein. In some examples, aspects of the operations of 2510 may be performed by a BFRR component 1430 as described with reference to FIG. 14.

At 2515, the method may include communicating via the first network beam or the second network beam or both based on the beam failure recovery response. The operations of 2515 may be performed in accordance with examples as disclosed herein. In some examples, aspects of the operations of 2515 may be performed by a beam reset component 1435 as described with reference to FIG. 14.

FIG. 26 shows a flowchart illustrating a method 2600 that supports reporting multiple replacement beams in beam failure recovery requests in accordance with one or more aspects of the present disclosure. The operations of the method 2600 may be implemented by a UE or its components as described herein. For example, the operations of the method 2600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2605, the method may include outputting a first signal that includes a beam failure recovery request in response to a detection of a beam failure of a downlink connection, the beam failure recovery request indicates a downlink network beam based on the beam failure of the downlink connection, and the beam failure recovery request further indicates an uplink network beam based on the downlink network beam. The operations of 2605 may be performed in accordance with examples as disclosed herein. In some examples, aspects of the operations of 2605 may be performed by BFRQ component 1025 as described with reference to FIG. 10.

At 2610, the method may include obtaining, in response to the beam failure recovery request, a second signal that includes a beam failure recovery response. The operations of 2610 may be performed in accordance with examples as disclosed herein. In some examples, aspects of the operations of 2610 may be performed by BFRR component 1030 as described with reference to FIG. 10.

At 2615, the method may include communicating via a downlink UE beam corresponding to the downlink network beam and via an uplink UE beam corresponding to the uplink network beam based on the beam failure recovery response. The operations of 2615 may be performed in accordance with examples as disclosed herein. In some examples, aspects of the operations of 2615 may be performed by a beam reset component 1035 as described with reference to FIG. 10.

FIG. 27 shows a flowchart illustrating a method 2700 that supports reporting multiple replacement beams in beam failure recovery requests in accordance with one or more aspects of the present disclosure. The operations of the method 2700 may be implemented by a network entity or its components as described herein. For example, the operations of the method 2700 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2705, the method may include obtaining a first signal that includes a beam failure recovery request that indicates a beam failure of a downlink connection with a UE, the beam failure recovery request indicates a downlink network beam based on the beam failure of the downlink connection, and the beam failure recovery request further indicates an uplink network beam based on the downlink network beam. The operations of 2705 may be performed in accordance with examples as disclosed herein. In some examples, aspects of the operations of 2705 may be performed by a BFRQ component 1425 as described with reference to FIG. 14.

At 2710, the method may include outputting, in response to the beam failure recovery request, a second signal that includes a beam failure recovery response. The operations of 2710 may be performed in accordance with examples as disclosed herein. In some examples, aspects of the operations of 2710 may be performed by a BFRR component 1430 as described with reference to FIG. 14.

At 2715, the method may include communicating via the downlink network beam or the uplink network beam or both based on the beam failure recovery response. The operations of 2715 may be performed in accordance with examples as disclosed herein. In some examples, aspects of the operations of 2715 may be performed by a beam reset component 1435 as described with reference to FIG. 14.

FIG. 28 shows a flowchart illustrating a method 2800 that supports reporting multiple replacement beams in beam failure recovery requests in accordance with one or more aspects of the present disclosure. The operations of the method 2800 may be implemented by a UE or its components as described herein. For example, the operations of the method 2800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2805, the method may include outputting a first signal that includes a beam failure recovery request in response to a detection of a beam failure of a beam pair link for a first component carrier, the beam failure recovery request indicates a first network beam for the first component carrier based on the beam failure of the beam pair link for the first component carrier, and the beam failure recovery request further indicates a second network beam for a second component carrier associated with the first component carrier based on the beam failure of the beam pair link for the first component carrier. The operations of 2805 may be performed in accordance with examples as disclosed herein. In some examples, aspects of the operations of 2805 may be performed by a BFRQ component 1025 as described with reference to FIG. 10.

At 2810, the method may include obtaining, in response to the beam failure recovery request, a second signal that includes a beam failure recovery response. The operations of 2810 may be performed in accordance with examples as disclosed herein. In some examples, aspects of the operations of 2810 may be performed by a BFRR component 1030 as described with reference to FIG. 10.

At 2815, the method may include communicating via the first component carrier and via the second component carrier in accordance with one or more UE beams that correspond to the first network beam and the second network beam based on the beam failure recovery response. The operations of 2815 may be performed in accordance with examples as disclosed herein. In some examples, aspects of the operations of 2815 may be performed by a beam reset component 1035 as described with reference to FIG. 10.

FIG. 29 shows a flowchart illustrating a method 2900 that supports reporting multiple replacement beams in beam failure recovery requests in accordance with one or more aspects of the present disclosure. The operations of the method 2900 may be implemented by a network entity or its components as described herein. For example, the operations of the method 2900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2905, the method may include obtaining a first signal that includes a beam failure recovery request that indicates a beam failure of a beam pair link with a UE for a first component carrier, the beam failure recovery request indicates a first network beam for the first component carrier based on the beam failure of the beam pair link for the first component carrier, and the beam failure recovery request further indicates a second network beam for a second component carrier associated with the first component carrier based on the beam failure of the beam pair link for the first component carrier. The operations of 2905 may be performed in accordance with examples as disclosed herein. In some examples, aspects of the operations of 2905 may be performed by a BFRQ component 1425 as described with reference to FIG. 14.

At 2910, the method may include outputting, in response to the beam failure recovery request, a second signal that includes a beam failure recovery response. The operations of 2910 may be performed in accordance with examples as disclosed herein. In some examples, aspects of the operations of 2910 may be performed by a BFRR component 1430 as described with reference to FIG. 14.

At 2915, the method may include communicating via the first component carrier in accordance with the first network beam or via the second component carrier in accordance with the second network beam or both based on the beam failure recovery response. The operations of 2915 may be performed in accordance with examples as disclosed herein. In some examples, aspects of the operations of 2915 may be performed by a beam reset component 1435 as described with reference to FIG. 14.

The following provides an overview of aspects of the present disclosure:

Aspect 1: A method for wireless communications at a UE, comprising: outputting a first signal that comprises a beam failure recovery request in response to a detection of a beam failure of a beam pair link with a first transmission/reception point, the beam failure recovery request indicates a first network beam at the first transmission/reception point based at least in part on the beam failure of the beam pair link with the first transmission/reception point, and the beam failure recovery request indicates a second network beam at a second transmission/reception point based at least in part on the first network beam and a UE beam configuration supported by the UE that comprises one or more UE beams corresponding to the first network beam and the second network beam; obtaining, in response to the beam failure recovery request, a second signal that comprises a beam failure recovery response; and communicating with the first transmission/reception point and the second transmission/reception point via the one or more UE beams based at least in part on the beam failure recovery response.

Aspect 2: The method of aspect 1, further comprising: storing a transmission configuration indicator state codepoint that comprises a first transmission configuration indicator state for the first transmission/reception point and a second transmission configuration indicator state for the second transmission/reception point; and determining the second network beam based at least in part on the first transmission configuration indicator state that corresponds to the first network beam and the second transmission configuration indicator state that corresponds to the second network beam.

Aspect 3: The method of any of aspects 1 through 2, further comprising: outputting a third signal indicating a plurality of network beam configurations that correspond to respective UE beam configurations supported by the UE, wherein the respective UE beam configurations comprise at least the UE beam configuration supported by the UE.

Aspect 4: The method of aspect 3, further comprising: determining the plurality of network beam configurations based at least in part on the first transmission/reception point, the second transmission/reception point, a capability of the UE, a first channel associated with the UE and the first transmission/reception point, a second channel associated with the UE and the second transmission/reception point, a multiplexing scheme for the UE, or a combination thereof.

Aspect 5: The method of any of aspects 1 through 4, further comprising: obtaining a new beam identification reference signal that corresponds to the first network beam; and determine the first network beam based at least in part on the new beam identification reference signal, wherein the beam failure recovery request indicates the first network beam based at least in part on the determination.

Aspect 6: The method of any of aspects 1 through 5, further comprising: maintaining a second beam pair link with the second transmission/reception point concurrent to the detection of the beam failure of the beam pair link with the first transmission/reception point and concurrent to the first signal that comprises the beam failure recovery request being output.

Aspect 7: The method of any of aspects 1 through 6, further comprising: supporting the UE beam configuration based at least in part on the UE supporting concurrent reception via a first UE beam of the UE beam configuration that corresponds to the first network beam and a second UE beam of the UE beam configuration that corresponds to the second network beam in a spatial-division multiplexing scheme.

Aspect 8: The method of any of aspects 1 through 7, further comprising: initiating a timer in response to the obtained second signal that comprises the beam failure recovery response; and activating the UE beam configuration based at least in part on an expiration of the timer, the communication with the first transmission/reception point and the second transmission/reception point via the one or more UE beams being further based at least in part on the activation of the UE beam configuration.

Aspect 9: The method of any of aspects 1 through 8, wherein, to communicate with the first transmission/reception point and the second transmission/reception point, the method further comprises: obtaining, via a transceiver, a downlink signal from the first transmission/reception point or from the second transmission/reception point or both; and outputting, via the transceiver, an uplink signal to the first transmission/reception point or to the second transmission/reception point or both.

Aspect 10: A method for wireless communications at a device in a wireless network, comprising: obtaining a first signal that comprises a beam failure recovery request that indicates a beam failure of a beam pair link between a UE and a first transmission/reception point, the beam failure recovery request further indicates a first network beam at the first transmission/reception point based at least in part on the beam failure of the beam pair link between the UE and the first transmission/reception point, and the beam failure recovery request further indicates a second network beam at a second transmission/reception point based at least in part on the first network beam and a UE beam configuration supported by the UE that corresponds to the first network beam at the first transmission/reception point and the second network beam at the second transmission/reception point; outputting, in response to the beam failure recovery request, a second signal that comprises a beam failure recovery response; and communicating via the first network beam or the second network beam or both based at least in part on the beam failure recovery response.

Aspect 11: The method of aspect 10, further comprising: obtaining a third signal that indicates a plurality of network beam configurations corresponding to respective UE beam configurations supported by the UE; and determining the UE beam configuration supported by the UE based at least in part on the indicated plurality of network beam configurations.

Aspect 12: The method of any of aspects 10 through 11, wherein, to communicate, the method further comprises: communicating via a transceiver and via the first network beam based at least in part on the device in the wireless network comprising the first transmission/reception point.

Aspect 13: The method of any of aspects 10 through 12, wherein, to communicate, the method further comprises: communicating via a transceiver and via the second network beam based at least in part on the device in the wireless network comprising the second transmission/reception point.

Aspect 14: A method for wireless communications at a UE, comprising: outputting a first signal that comprises a beam failure recovery request in response to a detection of a beam failure of a downlink connection, the beam failure recovery request indicates a downlink network beam based at least in part on the beam failure of the downlink connection, and the beam failure recovery request further indicates an uplink network beam based at least in part on the downlink network beam; obtaining, in response to the beam failure recovery request, a second signal that comprises a beam failure recovery response; and communicating via a downlink UE beam corresponding to the downlink network beam and via an uplink UE beam corresponding to the uplink network beam based at least in part on the beam failure recovery response.

Aspect 15: The method of aspect 14, further comprising: determining the uplink network beam further based at least in part on a permissible exposure threshold for the UE.

Aspect 16: The method of any of aspects 14 through 15, wherein, to communicate via the downlink UE beam and the uplink UE beam, the method further comprises: obtaining, via a transceiver, a downlink signal via the downlink UE beam; and outputting, via the transceiver, an uplink signal via the uplink UE beam.

Aspect 17: A method for wireless communications at a device in a wireless network, comprising: obtaining a first signal that comprises a beam failure recovery request that indicates a beam failure of a downlink connection with a UE, the beam failure recovery request indicates a downlink network beam based at least in part on the beam failure of the downlink connection, and the beam failure recovery request further indicates an uplink network beam based at least in part on the downlink network beam; outputting, in response to the beam failure recovery request, a second signal that comprises a beam failure recovery response; and communicating via the downlink network beam or the uplink network beam or both based at least in part on the beam failure recovery response.

Aspect 18: The method of aspect 17, wherein, to communicate, the method further comprises: outputting, via a transceiver, a downlink signal via the downlink network beam based at least in part on the device in the wireless network comprising a transmission/reception point that supports the downlink network beam.

Aspect 19: The method of any of aspects 17 through 18, wherein, to communicate, the method further comprises: obtaining, via a transceiver, an uplink signal via the uplink network beam based at least in part on the device in the wireless network comprising a transmission/reception point that supports the uplink network beam.

Aspect 20: A method for wireless communications at a UE, comprising: outputting a first signal that comprises a beam failure recovery request in response to a detection of a beam failure of a beam pair link for a first component carrier, the beam failure recovery request indicates a first network beam for the first component carrier based at least in part on the beam failure of the beam pair link for the first component carrier, and the beam failure recovery request further indicates a second network beam for a second component carrier associated with the first component carrier based at least in part on the beam failure of the beam pair link for the first component carrier; obtaining, in response to the beam failure recovery request, a second signal that comprises a beam failure recovery response; and communicating via the first component carrier and via the second component carrier in accordance with one or more UE beams that correspond to the first network beam and the second network beam based at least in part on the beam failure recovery response.

Aspect 21: The method of aspect 20, further comprising: determining an association between the first component carrier and the second component carrier based at least in part on the second component carrier being within a frequency range from the first component carrier, wherein the beam failure recovery request indicates the second network beam based at least in part on the association between the first component carrier and the second component carrier.

Aspect 22: The method of any of aspects 20 through 21, further comprising: determining an association between the first component carrier and the second component carrier based at least in part on a configured component carrier list that comprises the first component carrier and the second component carrier, wherein the beam failure recovery request indicates the second network beam based at least in part on the association between the first component carrier and the second component carrier.

Aspect 23: The method of any of aspects 20 through 22, wherein the beam failure recovery request further indicates a first association between the first network beam and the first component carrier and a second association between the second network beam and the second component carrier.

Aspect 24: The method of any of aspects 20 through 22, wherein the beam failure recovery request further indicates a first association between the first network beam and a first bandwidth part that corresponds to the first component carrier and a second association between the second network beam and a second bandwidth part that corresponds to the second component carrier.

Aspect 25: The method of any of aspects 20 through 24, wherein the beam failure recovery request further indicates one or more additional network beams for one or more additional component carriers associated with the first component carrier based at least in part on the beam failure of the beam pair link for the first component carrier.

Aspect 26: The method of any of aspects 20 through 25, further comprising: determining the second network beam based at least in part on a beam width of the first network beam that fails to satisfy a threshold beam width.

Aspect 27: The method of aspect 26, further comprising: determining that the first network beam fails to support communications via the second component carrier according to a beam squint effect for the first network beam based at least in part on the beam width of the first network beam that fails to satisfy the threshold beam width.

Aspect 28: The method of any of aspects 20 through 27, wherein, to communicate via the first component carrier and via the second component carrier, the method further comprises: obtaining, via a transceiver, a downlink signal via the first component carrier or via the second component carrier or both; and outputting, via the transceiver, an uplink signal via the first component carrier or via the second component carrier or both.

Aspect 29: A method for wireless communications at a device in a wireless network, comprising: obtaining a first signal that comprises a beam failure recovery request that indicates a beam failure of a beam pair link with a UE for a first component carrier, the beam failure recovery request indicates a first network beam for the first component carrier based at least in part on the beam failure of the beam pair link for the first component carrier, and the beam failure recovery request further indicates a second network beam for a second component carrier associated with the first component carrier based at least in part on the beam failure of the beam pair link for the first component carrier; outputting, in response to the beam failure recovery request, a second signal that comprises a beam failure recovery response; and communicating via the first component carrier in accordance with the first network beam or via the second component carrier in accordance with the second network beam or both based at least in part on the beam failure recovery response.

Aspect 30: The method of aspect 29, wherein, to communicate, the method further comprises: outputting, via a transceiver, a downlink signal via the first component carrier in accordance with the first network beam or via the second component carrier in accordance with the second network beam or both; and obtaining, via the transceiver, an uplink signal via the first component carrier in accordance with the first network beam or via the second component carrier in accordance with the second network beam or both.

Aspect 31: An apparatus for wireless communications at a UE, comprising a processor; and memory coupled with the processor, the processor configured to perform a method of any of aspects 1 through 9.

Aspect 32: An apparatus for wireless communications at a UE, comprising at least one means for performing a method of any of aspects 1 through 9.

Aspect 33: A non-transitory computer-readable medium storing code for wireless communications at a UE, the code comprising instructions executable by a processor to perform a method of any of aspects 1 through 9.

Aspect 34: An apparatus for wireless communications at a device in a wireless network, comprising a processor; and memory coupled with the processor, the processor configured to perform a method of any of aspects 10 through 13.

Aspect 35: An apparatus for wireless communications at a device in a wireless network, comprising at least one means for performing a method of any of aspects 10 through 13.

Aspect 36: A non-transitory computer-readable medium storing code for wireless communications at a device in a wireless network, the code comprising instructions executable by a processor to perform a method of any of aspects 10 through 13.

Aspect 37: An apparatus for wireless communications at a UE, comprising a processor; and memory coupled with the processor, the processor configured to perform a method of any of aspects 14 through 16.

Aspect 38: An apparatus for wireless communications at a UE, comprising at least one means for performing a method of any of aspects 14 through 16.

Aspect 39: A non-transitory computer-readable medium storing code for wireless communications at a UE, the code comprising instructions executable by a processor to perform a method of any of aspects 14 through 16.

Aspect 40: An apparatus for wireless communications at a device in a wireless network, comprising a processor; and memory coupled with the processor, the processor configured to perform a method of any of aspects 17 through 19.

Aspect 41: An apparatus for wireless communications at a device in a wireless network, comprising at least one means for performing a method of any of aspects 17 through 19.

Aspect 42: A non-transitory computer-readable medium storing code for wireless communications at a device in a wireless network, the code comprising instructions executable by a processor to perform a method of any of aspects 17 through 19.

Aspect 43: An apparatus for wireless communications at a UE, comprising a processor; and memory coupled with the processor, the processor configured to perform a method of any of aspects 20 through 28.

Aspect 44: An apparatus for wireless communications at a UE, comprising at least one means for performing a method of any of aspects 20 through 28.

Aspect 45: A non-transitory computer-readable medium storing code for wireless communications at a UE, the code comprising instructions executable by a processor to perform a method of any of aspects 20 through 28.

Aspect 46: An apparatus for wireless communications at a device in a wireless network, comprising a processor; and memory coupled with the processor, the processor configured to perform a method of any of aspects 29 through 30.

Aspect 47: An apparatus for wireless communications at a device in a wireless network, comprising at least one means for performing a method of any of aspects 29 through 30.

Aspect 48: A non-transitory computer-readable medium storing code for wireless communications at a device in a wireless network, the code comprising instructions executable by a processor to perform a method of any of aspects 29 through 30.

Aspect 49: A method for wireless communications at a UE, comprising: transmitting first signaling comprising a beam failure recovery request in response to detecting a beam failure for a first transmission/reception point, the beam failure recovery request indicating a first beam for the first transmission/reception point based at least in part on the beam failure for the first transmission/reception point, and the beam failure recovery request indicating a second beam for a second transmission/reception point based at least in part on the first beam and a beam pair supported by the UE; receiving, in response to the beam failure recovery request, second signaling comprising a beam failure recovery response; and communicating with the first transmission/reception point using the first beam and with the second transmission/reception point using the second beam based at least in part on the beam failure recovery response.

Aspect 50: The method of aspect 49, further comprising: storing a transmission configuration indicator state codepoint comprising a first transmission configuration indicator state for the first transmission/reception point and a second transmission configuration indicator state for the second transmission/reception point, the beam pair supported by the UE comprising the first beam based at least in part on the first transmission configuration indicator state and the second beam based at least in part on the second transmission configuration indicator state.

Aspect 51: The method of any of aspects 49 through 50, further comprising: transmitting third signaling indicating a plurality of beam pairs supported by the UE, the plurality of beam pairs comprising at least the beam pair supported by the UE.

Aspect 52: The method of aspect 51, further comprising: determining the plurality of beam pairs supported by the UE based at least in part on the first transmission/reception point, the second transmission/reception point, a capability of the UE, a first channel between the UE and the first transmission/reception point, a second channel between the UE and the second transmission/reception point, a multiplexing scheme for the UE, or a combination thereof.

Aspect 53: The method of any of aspects 49 through 52, further comprising: receiving a new beam identification reference signal using the first beam; and determining the first beam based at least in part on the new beam identification reference signal, the beam failure recovery request indicating the first beam based at least in part on the determining.

Aspect 54: The method of any of aspects 49 through 53, further comprising: maintaining a connection with the second transmission/reception point concurrent to detecting the beam failure for the first transmission/reception point and concurrent to transmitting the first signaling comprising the beam failure recovery request indicating the second beam for the second transmission/reception point.

Aspect 55: The method of any of aspects 49 through 54, further comprising: supporting the beam pair based at least in part on the UE supporting concurrent reception using the first beam and the second beam in a spatial-division multiplexing scheme.

Aspect 56: The method of any of aspects 49 through 55, further comprising: initiating a timer in response to receiving the second signaling comprising the beam failure recovery response; and activating the beam pair based at least in part on an expiration of the timer, the communicating with the first transmission/reception point using the first beam and with the second transmission/reception point using the second beam being further based at least in part on activating the beam pair.

Aspect 57: The method of any of aspects 49 through 56, the communicating comprising: receiving, via a transceiver, downlink signaling from the first transmission/reception point using the first beam or from the second transmission/reception point using the second beam or both; and transmitting, via the transceiver, uplink signaling to the first transmission/reception point using the first beam or to the second transmission/reception point using the second beam or both.

Aspect 58: A method for wireless communications at a device in a wireless network, comprising: receiving, from a UE, first signaling comprising a beam failure recovery request indicating a beam failure for a first transmission/reception point, the beam failure recovery request further indicating a first beam for the first transmission/reception point based at least in part on the beam failure for the first transmission/reception point, and the beam failure recovery request further indicating a second beam for a second transmission/reception point based at least in part on the first beam and a beam pair supported by the UE; transmitting, to the UE and in response to the beam failure recovery request, second signaling comprising a beam failure recovery response; and communicating with the UE using the first beam or the second beam or both based at least in part on the beam failure recovery response.

Aspect 59: The method of aspect 58, further comprising: receiving, from the UE, third signaling indicating a plurality of beam pairs supported by the UE, the plurality of beam pairs comprising at least the beam pair supported by the UE.

Aspect 60: The method of any of aspects 58 through 59, the communicating comprising: communicating, via a transceiver, with the UE using the first beam based at least in part on the device in the wireless network comprising the first transmission/reception point.

Aspect 61: The method of any of aspects 58 through 60, the communicating comprising: communicating, via a transceiver, with the UE using the second beam based at least in part on the device in the wireless network comprising the second transmission/reception point.

Aspect 62: A method for wireless communications at a UE, comprising: transmitting first signaling comprising a beam failure recovery request in response to detecting a downlink beam failure, the beam failure recovery request indicating a downlink beam based at least in part on the downlink beam failure, and the beam failure recovery request further indicating an uplink beam based at least in part on the downlink beam; receiving, in response to the beam failure recovery request, second signaling comprising a beam failure recovery response; and communicating using the downlink beam and the uplink beam based at least in part on the beam failure recovery response.

Aspect 63: The method of aspect 62, further comprising: determining the uplink beam further based at least in part on a permissible exposure threshold for the UE.

Aspect 64: The method of any of aspects 62 through 63, further comprising: receiving a new beam identification reference signal using the downlink beam; and determining the downlink beam based at least in part on the new beam identification reference signal, the beam failure recovery request indicating the downlink beam based at least in part on the determining.

Aspect 65: The method of any of aspects 62 through 64, further comprising: initiating a timer in response to receiving the second signaling comprising the beam failure recovery response; and activating the downlink beam and the uplink beam based at least in part on an expiration of the timer, the communicating using the downlink beam and the uplink beam being further based at least in part on activating the downlink beam and the uplink beam.

Aspect 66: The method of any of aspects 62 through 65, the communicating comprising: receiving, via a transceiver, downlink signaling using the downlink beam; and transmitting, via the transceiver, uplink signaling using the uplink beam.

Aspect 67: A method for wireless communications at a device in a wireless network, comprising: receiving, from a UE, first signaling comprising a beam failure recovery request indicating a downlink beam failure, the beam failure recovery request indicating a downlink beam based at least in part on the downlink beam failure, and the beam failure recovery request indicating an uplink beam based at least in part on the downlink beam; transmitting, to the UE and in response to the beam failure recovery request, second signaling comprising a beam failure recovery response; and communicating with the UE using the downlink beam or the uplink beam or both based at least in part on the beam failure recovery response.

Aspect 68: The method of aspect 67, the communicating comprising: transmitting, via a transceiver, downlink signaling to the UE using the downlink beam based at least in part on the device in the wireless network comprising a transmission/reception point supporting the downlink beam.

Aspect 69: The method of any of aspects 67 through 68, the communicating comprising: receiving, via a transceiver, uplink signaling from the UE using the uplink beam based at least in part on the device in the wireless network comprising a transmission/reception point supporting the uplink beam.

Aspect 70: A method for wireless communications at a UE, comprising: transmitting first signaling comprising a beam failure recovery request in response to detecting a beam failure for a first component carrier, the beam failure recovery request indicating a first beam for the first component carrier based at least in part on the beam failure for the first component carrier, and the beam failure recovery request indicating a second beam for a second component carrier associated with the first component carrier based at least in part on the beam failure for the first component carrier; receiving, in response to the beam failure recovery request, second signaling comprising a beam failure recovery response; and communicating on the first component carrier using the first beam and on the second component carrier using the second beam based at least in part on the beam failure recovery response.

Aspect 71: The method of aspect 70, further comprising: determining an association between the first component carrier and the second component carrier based at least in part on the second component carrier being within a frequency range from the first component carrier, the beam failure recovery request indicating the second beam based at least in part on the association between the first component carrier and the second component carrier.

Aspect 72: The method of any of aspects 70 through 71, further comprising: determining an association between the first component carrier and the second component carrier based at least in part on a configured component carrier list comprising the first component carrier and the second component carrier, the beam failure recovery request indicating the second beam based at least in part on the association between the first component carrier and the second component carrier.

Aspect 73: The method of any of aspects 70 through 72, wherein the beam failure recovery request further indicates a first association between the first beam and the first component carrier and a second association between the second beam and the second component carrier.

Aspect 74: The method of any of aspects 70 through 73, wherein the beam failure recovery request further indicates a first association between the first beam and a first bandwidth part corresponding to the first component carrier and a second association between the second beam and a second bandwidth part corresponding to the second component carrier.

Aspect 75: The method of any of aspects 70 through 74, wherein the beam failure recovery request further indicates one or more additional beams for one or more additional component carriers associated with the first component carrier based at least in part on the beam failure for the first component carrier.

Aspect 76: The method of any of aspects 70 through 75, further comprising: determining the second beam based at least in part on a beam width of the first beam failing to satisfy a threshold beam width.

Aspect 77: The method of aspect 76, further comprising: determining that the first beam fails to support communications on the second component carrier according to a beam squint effect for the first beam based at least in part on the beam width of the first beam failing to satisfy the threshold beam width.

Aspect 78: The method of any of aspects 70 through 77, further comprising: receiving a new beam identification reference signal on the first component carrier using the first beam; and determining the first beam based at least in part on the new beam identification reference signal, the beam failure recovery request indicating the first beam based at least in part on the determining.

Aspect 79: The method of any of aspects 70 through 78, further comprising: initiating a timer in response to receiving the second signaling comprising the beam failure recovery response; and activating the first beam and the second beam based at least in part on an expiration of the timer, the communicating on the first component carrier using the first beam and on the second component carrier using the second beam being further based at least in part on activating the first beam and the second beam.

Aspect 80: The method of any of aspects 70 through 79, the communicating comprising: receiving, via a transceiver, downlink signaling on the first component carrier using the first beam or on the second component carrier using the second beam or both; and transmitting, via the transceiver, uplink signaling on the first component carrier using the first beam or on the second component carrier using the second beam or both.

Aspect 81: A method for wireless communications at a device in a wireless network, comprising: receiving, from a UE, first signaling comprising a beam failure recovery request indicating a beam failure for a first component carrier, the beam failure recovery request indicating a first beam for the first component carrier based at least in part on the beam failure for the first component carrier, and the beam failure recovery request indicating a second beam for a second component carrier associated with the first component carrier based at least in part on the beam failure for the first component carrier; transmitting, to the UE and in response to the beam failure recovery request, second signaling comprising a beam failure recovery response; and communicating with the UE on the first component carrier using the first beam or on the second component carrier using the second beam or both based at least in part on the beam failure recovery response.

Aspect 82: The method of aspect 81, the communicating comprising: transmitting, via a transceiver, downlink signaling on the first component carrier using the first beam or on the second component carrier using the second beam or both; and receiving, via the transceiver, uplink signaling on the first component carrier using the first beam or on the second component carrier using the second beam or both.

Aspect 83: A method for wireless communications at a UE, comprising: transmitting first signaling comprising a beam failure recovery request in response to detecting a beam failure for a first component carrier, the beam failure recovery request indicating a first beam for the first component carrier based at least in part on the beam failure for the first component carrier; receiving, in response to the beam failure recovery request, second signaling comprising a beam failure recovery response; and communicating on the first component carrier using the first beam and on a second component carrier using a second beam based at least in part on the beam failure recovery response, the second beam being based at least in part on the first beam and an association between the first component carrier and the second component carrier.

Aspect 84: The method of aspect 83, further comprising: storing a table or a rule or both associating the first component carrier with the second component carrier; and determining the second beam based at least in part on the table or the rule or both and the first beam for the first component carrier.

Aspect 85: A method for wireless communications at a device in a wireless network, comprising: receiving, from a UE, first signaling comprising a beam failure recovery request indicating a beam failure for a first component carrier, the beam failure recovery request indicating a first beam for the first component carrier based at least in part on the beam failure for the first component carrier; transmitting, to the UE and in response to the beam failure recovery request, second signaling comprising a beam failure recovery response; and communicating with the UE on the first component carrier using the first beam and on a second component carrier using a second beam based at least in part on the beam failure recovery response, the second beam being based at least in part on the first beam and an association between the first component carrier and the second component carrier.

Aspect 86: The method of aspect 85, further comprising: storing a table or a rule or both associating the first component carrier with the second component carrier; and determining the second beam based at least in part on the table or the rule or both and the first beam for the first component carrier.

Aspect 87: An apparatus for wireless communications at a UE, comprising: a processor; and memory coupled with the processor, the processor and memory configured to perform a method of any of aspects 49 through 57.

Aspect 88: An apparatus for wireless communications at a UE, comprising at least one means for performing a method of any of aspects 49 through 57.

Aspect 89: A non-transitory computer-readable medium storing code for wireless communications at a UE, the code comprising instructions executable by a processor to perform a method of any of aspects 49 through 57.

Aspect 90: An apparatus for wireless communications at a device in a wireless network, comprising: a processor; and memory coupled with the processor, the processor and memory configured to perform a method of any of aspects 58 through 61.

Aspect 91: An apparatus for wireless communications at a device in a wireless network, comprising at least one means for performing a method of any of aspects 58 through 61.

Aspect 92: A non-transitory computer-readable medium storing code for wireless communications at a device in a wireless network, the code comprising instructions executable by a processor to perform a method of any of aspects 58 through 61.

Aspect 93: An apparatus for wireless communications at a UE, comprising: a processor; and memory coupled with the processor, the processor and memory configured to perform a method of any of aspects 62 through 66.

Aspect 94: An apparatus for wireless communications at a UE, comprising at least one means for performing a method of any of aspects 62 through 66.

Aspect 95: A non-transitory computer-readable medium storing code for wireless communications at a UE, the code comprising instructions executable by a processor to perform a method of any of aspects 62 through 66.

Aspect 96: An apparatus for wireless communications at a device in a wireless network, comprising: a processor; and memory coupled with the processor, the processor and memory configured to perform a method of any of aspects 67 through 69.

Aspect 97: An apparatus for wireless communications at a device in a wireless network, comprising at least one means for performing a method of any of aspects 67 through 69.

Aspect 98: A non-transitory computer-readable medium storing code for wireless communications at a device in a wireless network, the code comprising instructions executable by a processor to perform a method of any of aspects 67 through 69.

Aspect 99: An apparatus for wireless communications at a UE, comprising: a processor; and memory coupled with the processor, the processor and memory configured to perform a method of any of aspects 70 through 80.

Aspect 100: An apparatus for wireless communications at a UE, comprising at least one means for performing a method of any of aspects 70 through 80.

Aspect 101: A non-transitory computer-readable medium storing code for wireless communications at a UE, the code comprising instructions executable by a processor to perform a method of any of aspects 70 through 80.

Aspect 102: An apparatus for wireless communications at a device in a wireless network, comprising: a processor; and memory coupled with the processor, the processor and memory configured to perform a method of any of aspects 81 through 82.

Aspect 103: An apparatus for wireless communications at a device in a wireless network, comprising at least one means for performing a method of any of aspects 81 through 82.

Aspect 104: A non-transitory computer-readable medium storing code for wireless communications at a device in a wireless network, the code comprising instructions executable by a processor to perform a method of any of aspects 81 through 82.

Aspect 105: An apparatus for wireless communications at a UE, comprising: a processor; and memory coupled with the processor, the processor and memory configured to perform a method of any of aspects 83 through 84.

Aspect 106: An apparatus for wireless communications at a UE, comprising at least one means for performing a method of any of aspects 83 through 84.

Aspect 107: A non-transitory computer-readable medium storing code for wireless communications at a UE, the code comprising instructions executable by a processor to perform a method of any of aspects 83 through 84.

Aspect 108: An apparatus for wireless communications at a device in a wireless network, comprising: a processor; and memory coupled with the processor, the processor and memory configured to perform a method of any of aspects 85 through 86.

Aspect 109: An apparatus for wireless communications at a device in a wireless network, comprising at least one means for performing a method of any of aspects 85 through 86.

Aspect 110: A non-transitory computer-readable medium storing code for wireless communications at a device in a wireless network, the code comprising instructions executable by a processor to perform a method of any of aspects 85 through 86.

It should be noted that the methods described herein describe possible implementations, and that the operations may be rearranged or otherwise modified and that other implementations are possible. Further, aspects from two or more of the methods may be combined.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more memories; and one or more processors coupled with the one or more memories and configured to cause the UE to:

output a first signal that comprises a beam failure recovery request in response to a detection of a beam failure of a beam pair link with a first transmission/reception point, wherein the beam failure recovery request indicates a first network beam at the first transmission/reception point based at least in part on the beam failure of the beam pair link with the first transmission/reception point, and the beam failure recovery request indicates a second network beam at a second transmission/reception point based at least in part on the first network beam and a UE beam configuration supported by the UE that comprises one or more UE beams corresponding to the first network beam and the second network beam;

obtain, in response to the beam failure recovery request, a second signal that comprises a beam failure recovery response; and communicate with the first transmission/reception point and the second transmission/reception point via the one or more UE beams based at least in part on the beam failure recovery response.

2. The apparatus of claim 1, wherein the one or more processors are further configured to cause the UE to:

store a transmission configuration indicator state code-point that comprises a first transmission configuration indicator state for the first transmission/reception point and a second transmission configuration indicator state for the second transmission/reception point; and determine the second network beam based at least in part on the first transmission configuration indicator state that corresponds to the first network beam and the second transmission configuration indicator state that corresponds to the second network beam.

3. The apparatus of claim 1, wherein the one or more processors are further configured to cause the UE to:

output a third signal to indicate a plurality of network beam configurations that correspond to respective UE beam configurations supported by the UE, wherein the respective UE beam configurations comprise at least the UE beam configuration supported by the UE.

4. The apparatus of claim 3, wherein the one or more processors are further configured to cause the UE to:

determine the plurality of network beam configurations based at least in part on the first transmission/reception point, the second transmission/reception point, a capability of the UE, a first channel associated with the UE and the first transmission/reception point, a second channel associated with the UE and the second transmission/reception point, a multiplexing scheme for the UE, or a combination thereof.

5. The apparatus of claim 1, wherein the one or more processors are further configured to cause the UE to:

obtain a new beam identification reference signal that corresponds to the first network beam; and determine the first network beam based at least in part on the new beam identification reference signal, wherein the beam failure recovery request indicates the first network beam based at least in part on the determination.

6. The apparatus of claim 1, wherein the one or more processors are further configured to cause the UE to:

maintain a second beam pair link with the second transmission/reception point concurrent to the detection of the beam failure of the beam pair link with the first transmission/reception point and concurrent to the first signal that comprises the beam failure recovery request being output.

7. The apparatus of claim 1, wherein the one or more processors are further configured to cause the UE to:

support the UE beam configuration based at least in part on the UE supporting concurrent reception via a first UE beam of the UE beam configuration that corresponds to the first network beam and a second UE beam of the UE beam configuration that corresponds to the second network beam in a spatial-division multiplexing scheme.

8. The apparatus of claim 1, wherein the one or more processors are further configured to cause the UE to:

initiate a timer in response to the obtained second signal that comprises the beam failure recovery response; and activate the UE beam configuration based at least in part on an expiration of the timer, the communication with the first transmission/reception point and the second transmission/reception point via the one or more UE beams being further based at least in part on the activation of the UE beam configuration.

9. The apparatus of claim 1, further comprising a transceiver, wherein, to communicate with the first transmission/ reception point and the second transmission/reception point, the one or more processors are configured to cause the UE to:

obtain, via the transceiver, a downlink signal from the first transmission/reception point or from the second transmission/reception point or both; and output, via the transceiver, an uplink signal to the first transmission/reception point or to the second transmission/reception point or both.

10. An apparatus for wireless communications at a device in a wireless network, comprising:

one or more memories; and one or more processors coupled with the one or more memories and configured to cause the device in the wireless network to:

obtain a first signal comprising a beam failure recovery request that indicates a beam failure of a beam pair link between a user equipment (UE) and a first transmission/reception point, wherein the beam failure recovery request further indicates a first network beam at the first transmission/reception point based at least in part on the beam failure of the beam pair link between the UE and the first transmission/reception point, and the beam failure recovery request further indicates a second network beam at a second transmission/reception point based at least in part on the first network beam and a UE beam configuration supported by the UE that corresponds to the first network beam at the first transmission/reception point and the second network beam at the second transmission/reception point;

output, in response to the beam failure recovery request, a second signal that comprises a beam failure recovery response; and communicate via the first network beam or the second network beam or both based at least in part on the beam failure recovery response.

11. The apparatus of claim 10, wherein the one or more processors are further configured to cause the device in the wireless network to:

obtain a third signal that indicates a plurality of network beam configurations corresponding to respective UE beam configurations supported by the UE; and determine the UE beam configuration supported by the UE based at least in part on the indicated plurality of network beam configurations.

12. The apparatus of claim 10, further comprising a transceiver, wherein, to communicate, the one or more processors are configured to cause the device in the wireless network to:

communicate via the transceiver and via the first network beam based at least in part on the device in the wireless network comprising the first transmission/reception point.

13. The apparatus of claim 10, further comprising a transceiver, wherein, to communicate, the one or more processors are configured to cause the device in the wireless network to:

communicate via the transceiver and via the second network beam based at least in part on the device in the wireless network comprising the second transmission/reception point.

14. A method for wireless communication at a user equipment (UE), comprising:

outputting a first signal that comprises a beam failure recovery request in response to a detection of a beam failure of a beam pair link with a first transmission/ reception point, wherein the beam failure recovery request indicates a first network beam at the first transmission/reception point based at least in part on the beam failure of the beam pair link with the first transmission/reception point, and the beam failure recovery request indicates a second network beam at a second transmission/reception point based at least in part on the first network beam and a UE beam configuration supported by the UE that comprises one or more UE beams corresponding to the first network beam and the second network beam;

obtaining, in response to the beam failure recovery request, a second signal that comprises a beam failure recovery response; and communicating with the first transmission/reception point and the second transmission/reception point via the one or more UE beams based at least in part on the beam failure recovery response.

15. The method of claim 14, further comprising:

storing a transmission configuration indicator state codepoint that comprises a first transmission configuration indicator state for the first transmission/reception point and a second transmission configuration indicator state for the second transmission/reception point; and determining the second network beam based at least in part on the first transmission configuration indicator state that corresponds to the first network beam and the second transmission configuration indicator state that corresponds to the second network beam.

16. The method of claim 14, further comprising:

outputting a third signal to indicate a plurality of network beam configurations that correspond to respective UE beam configurations supported by the UE, wherein the respective UE beam configurations comprise at least the UE beam configuration supported by the UE.

17. The method of claim 16, further comprising:

determining the plurality of network beam configurations based at least in part on the first transmission/reception point, the second transmission/reception point, a capability of the UE, a first channel associated with the UE and the first transmission/reception point, a second channel associated with the UE and the second transmission/reception point, a multiplexing scheme for the UE, or a combination thereof.

18. The method of claim 14, further comprising:

obtaining a new beam identification reference signal that corresponds to the first network beam; and determining the first network beam based at least in part on the new beam identification reference signal, wherein the beam failure recovery request indicates the first network beam based at least in part on the determination.

19. The method of claim 14, further comprising:

maintaining a second beam pair link with the second transmission/reception point concurrent to the detection of the beam failure of the beam pair link with the first transmission/reception point and concurrent to the first signal that comprises the beam failure recovery request being output.

20. The method of claim 14, further comprising:

supporting the UE beam configuration based at least in part on the UE supporting concurrent reception via a first UE beam of the UE beam configuration that corresponds to the first network beam and a second UE beam of the UE beam configuration that corresponds to the second network beam in a spatial-division multiplexing scheme.

21. The method of claim 14, further comprising:

initiating a timer in response to the obtained second signal that comprises the beam failure recovery response; and activating the UE beam configuration based at least in part on an expiration of the timer, the communication with the first transmission/reception point and the second transmission/reception point via the one or more UE beams being further based at least in part on the activation of the UE beam configuration.

22. The method of claim 14, wherein the communicating comprises:

obtaining a downlink signal from the first transmission/reception point or from the second transmission/reception point or both; and outputting an uplink signal to the first transmission/reception point or to the second transmission/reception point or both.

23. A method for wireless communication at a device in a wireless network, comprising:

obtaining a first signal comprising a beam failure recovery request that indicates a beam failure of a beam pair link between a user equipment (UE) and a first transmission/reception point, wherein the beam failure recovery request further indicates a first network beam at the first transmission/reception point based at least in part on the beam failure of the beam pair link between the UE and the first transmission/reception point, and the beam failure recovery request further indicates a second network beam at a second transmission/reception point based at least in part on the first network beam and a UE beam configuration supported by the UE that corresponds to the first network beam at the first transmission/reception point and the second network beam at the second transmission/reception point;

outputting, in response to the beam failure recovery request, a second signal that comprises a beam failure recovery response; and communicating via the first network beam or the second network beam or both based at least in part on the beam failure recovery response.

24. The method of claim 23, further comprising:

obtaining a third signal that indicates a plurality of network beam configurations corresponding to respective UE beam configurations supported by the UE; and determining the UE beam configuration supported by the UE based at least in part on the indicated plurality of network beam configurations.

25. The method of claim 23, wherein the communicating comprises:

communicating via the first network beam based at least in part on the device in the wireless network comprising the first transmission/reception point.

26. The method of claim 23, wherein the communicating comprises:

communicating via the second network beam based at least in part on the device in the wireless network comprising the second transmission/reception point.

27. A non-transitory computer-readable medium storing code for wireless communication at a user equipment (UE), the code comprising instructions executable by at least one processor to cause the UE to:

output a first signal that comprises a beam failure recovery request in response to a detection of a beam failure of a beam pair link with a first transmission/reception point, wherein the beam failure recovery request indicates a first network beam at the first transmission/reception point based at least in part on the beam failure of the beam pair link with the first transmission/reception point, and the beam failure recovery request indicates a second network beam at a second transmission/reception point based at least in part on the first network beam and a UE beam configuration supported by the UE that comprises one or more UE beams corresponding to the first network beam and the second network beam;

obtain, in response to the beam failure recovery request, a second signal that comprises a beam failure recovery response; and communicate with the first transmission/reception point and the second transmission/reception point via the one or more UE beams based at least in part on the beam failure recovery response.

28. The non-transitory computer-readable medium of claim 27, wherein the instructions are further executable by the at least one processor to cause the UE to:

store a transmission configuration indicator state codepoint that comprises a first transmission configuration indicator state for the first transmission/reception point and a second transmission configuration indicator state for the second transmission/reception point; and determine the second network beam based at least in part on the first transmission configuration indicator state that corresponds to the first network beam and the second transmission configuration indicator state that corresponds to the second network beam.

29. The non-transitory computer-readable medium of claim 27, wherein the instructions are further executable by the at least one processor to cause the UE to:

output a third signal to indicate a plurality of network beam configurations that correspond to respective UE beam configurations supported by the UE, wherein the respective UE beam configurations comprise at least the UE beam configuration supported by the UE.

30. A non-transitory computer-readable medium storing code for wireless communication at a device in a wireless network, the code comprising instructions executable by at least one processor to cause the device in the wireless network to:

obtain a first signal comprising a beam failure recovery request that indicates a beam failure of a beam pair link between a user equipment (UE) and a first transmission/reception point, wherein the beam failure recovery request further indicates a first network beam at the first transmission/reception point based at least in part on the beam failure of the beam pair link between the UE and the first transmission/reception point, and the beam failure recovery request further indicates a second network beam at a second transmission/reception point based at least in part on the first network beam and a UE beam configuration supported by the UE that corresponds to the first network beam at the first transmission/reception point and the second network beam at the second transmission/reception point;

output, in response to the beam failure recovery request, a second signal that comprises a beam failure recovery response; and communicate via the first network beam or the second network beam or both based at least in part on the beam failure recovery response.

* * * * *